United States Patent [19]
Sawayama et al.

[11] Patent Number: 5,706,066
[45] Date of Patent: Jan. 6, 1998

[54] DEFLECTING DEVICE AND PROJECTION-TYPE DISPLAY UNIT USING SAME

[75] Inventors: Yutaka Sawayama, Tenri; Naofumi Kimura, Nabara, both of Japan

[73] Assignee: Sharp Kabushiki Kaisha, Osaka, Japan

[21] Appl. No.: 729,293

[22] Filed: Oct. 10, 1996

[30] Foreign Application Priority Data

| | | | |
|---|---|---|---|
| Oct. 16, 1995 | [JP] | Japan | 7-266858 |
| Mar. 25, 1996 | [JP] | Japan | 8-068772 |
| Apr. 24, 1996 | [JP] | Japan | 8-102956 |

[51] Int. Cl.$^6$ .................. G02F 1/1335; G02F 1/136
[52] U.S. Cl. ............... 349/113; 349/5; 349/63; 349/67; 349/42
[58] Field of Search ................ 349/9, 113, 42, 349/62, 63

[56] References Cited

U.S. PATENT DOCUMENTS

| 3,891,309 | 6/1975 | Bonne | 349/113 |
|---|---|---|---|
| 5,408,345 | 4/1995 | Mitsui et al. | 349/113 |
| 5,432,624 | 7/1995 | Black | 349/113 |

OTHER PUBLICATIONS

N. Sekimura, Japanese Laid–Open Patent Publication No. 59007337–A, Published Jan. 14, 1984.

M. Ishikawa, Japanese Laid–Open Patent Publication No. 6258672–A, Published Sep. 16, 1994.

S. Yutaka, "Reflection Type Optical Modulation Device", Japanese Laid–Open Patent Publication No. 9–15550, Laid Open on Jan. 17, 1997.

*Primary Examiner*—William L. Sikes
*Assistant Examiner*—Julie Ngo
*Attorney, Agent, or Firm*—David G. Conlin; William J. Daley, Jr.

[57] ABSTRACT

An object of the present invention iso attain switching at a high contrast ratio and a high light utilization factor. Incident light from a second surface of a prism is not reflected by the surface of a transmission substrate but guided to refractive index substance layers. The incident light is split into light reflected by the interface between the refractive index substance layers and light passing through the interface in accordance with the relationship between the refractive indices of the refractive index substance layers. The transmitted light is reflected by the surface of a reflecting electrode tilted by angle $\delta$ with respect to the surface of an insulating substrate. The light reflected by the interface goes out in a direction different from the direction of the light reflected by the surface of the reflecting electrode. The light intensities of the reflected light and the transmitted light at the interface can be controlled by applying a voltage across the reflecting electrode and the transparent electrode and by changing the refractive index of the variable refractive index substance layer.

26 Claims, 36 Drawing Sheets

CHANGE IN REFRACTIVE INDEX OF VARIABLE REFRACTIVE
INDEX SUBSTANCE LAYER DEPENDING ON INCREASE OF
APPLIED VOLTAGE : n1 (V)

CHANGED IN REFRACTIVE INDEX OF VARIABLE REFRACTIVE INDEX SUBSTANCE LAYER DEPENDING ON INCREASE OF APPLIED VOLTAGE: $n_1$ (V)

APPLIED VOLTAGE (V)

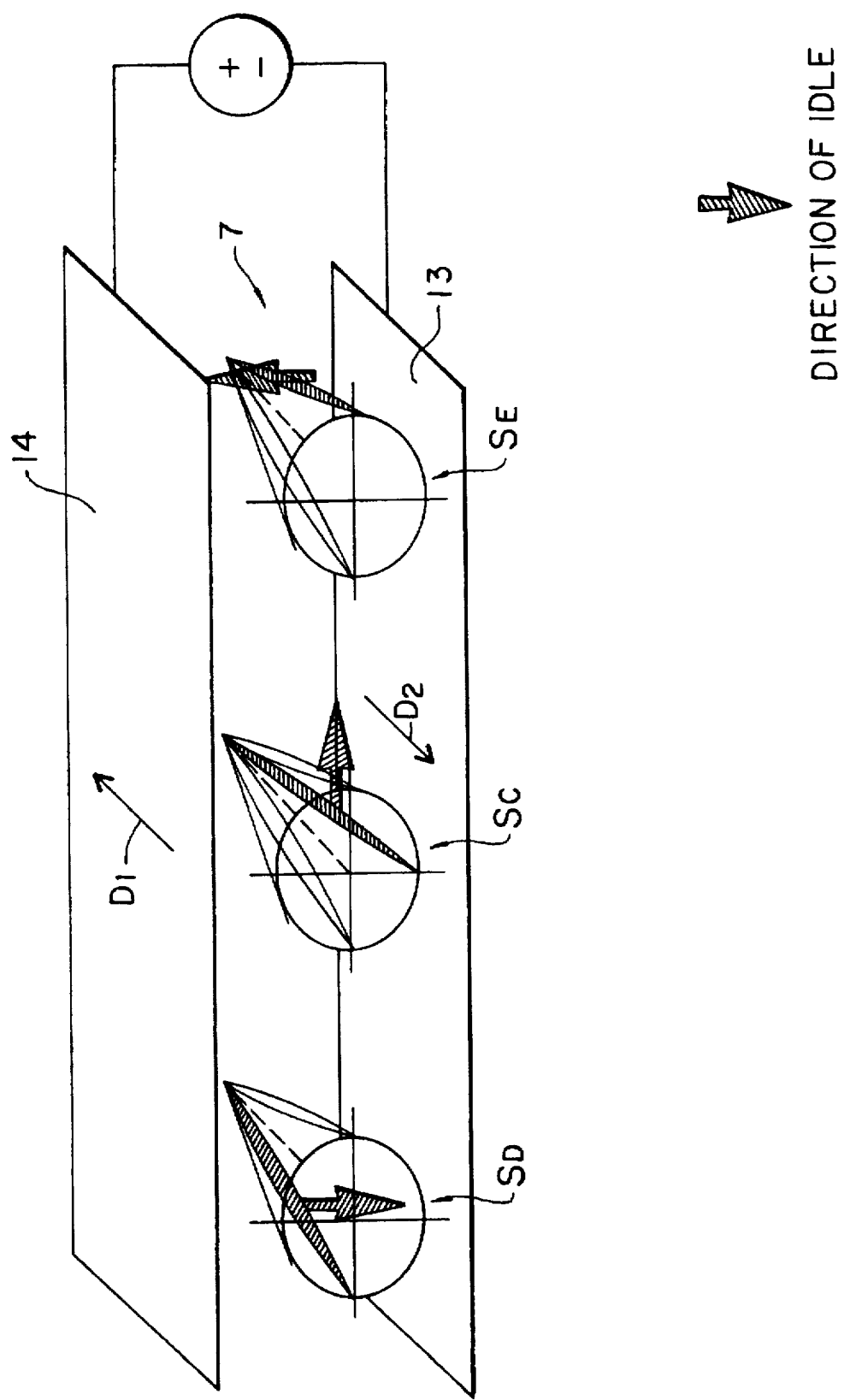

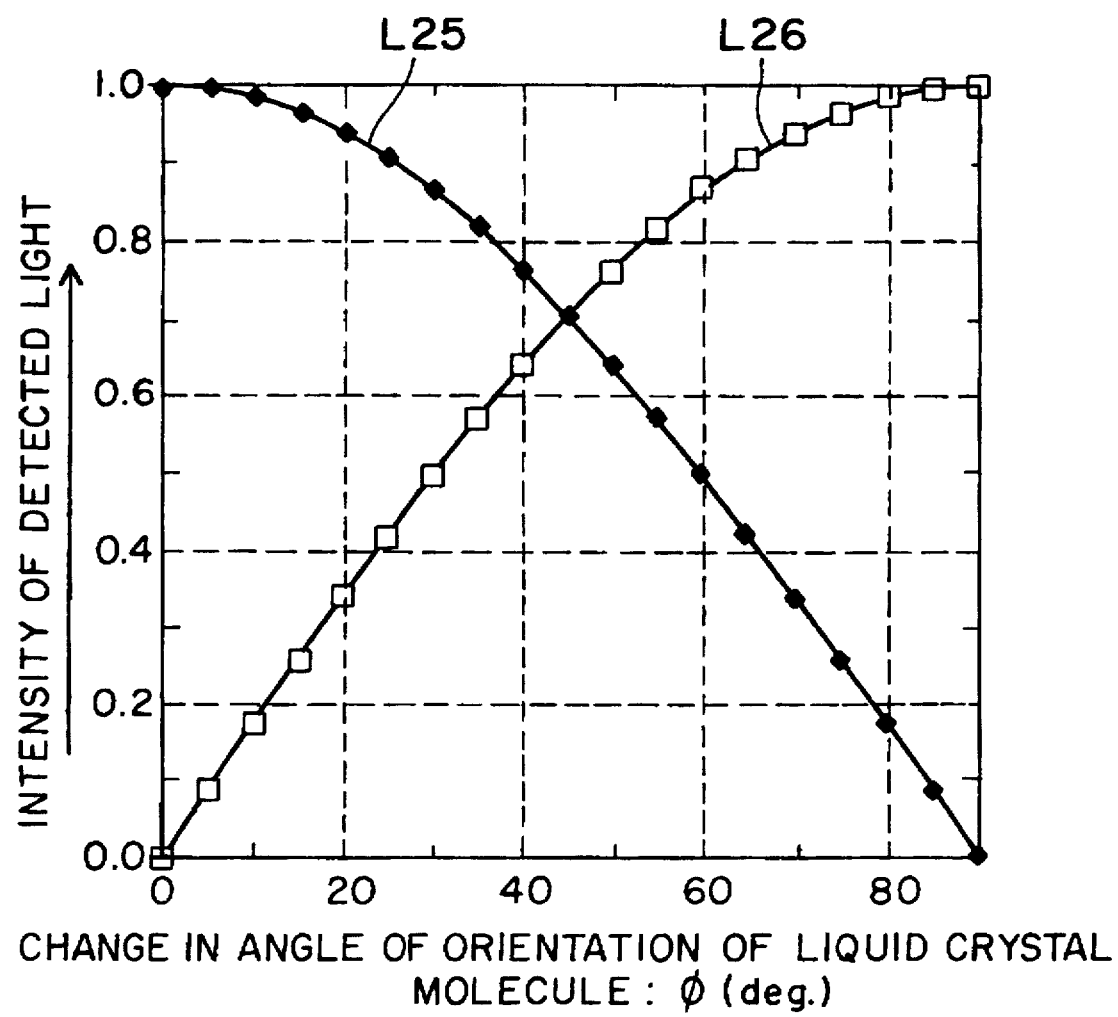

DEFLECTING DEVICE AND PROJECTION-TYPE DISPLAY UNIT USING SAME

BACKGROUND OF THE INVENTION

1. Field of the Invention

The present invention relates to a deflecting device suitably used for an optical switch, a spatial optical modulator, a projection-type display unit used as a light valve, etc. having an optical signal with a sufficiently high on/off ratio (hereinafter referred to as a contrast ratio), having a high utilization factor of incident light and being able to be driven by a relatively low voltage, and also relates to a projection-type display unit using the deflecting device.

2. Description of the Related Art

These days, optical communication plays an important role in information-oriented society because of a high communication speed and a large amount of transmitted information. Optical fibers having low optical loss are used as signal transmission paths in such optical communication. Signal converters used for the main lines of optical signal transmission paths are required to have a high speed, a high contrast ratio and a low signal attenuation. To meet the requirements, the signal processors for such main lines uses a phase changing method, a transmission mode converting method or a method of changing the traveling direction of guided wave light.

FIG. 41 is a plan view showing the structure of an optical switch 101 implemented by using an optical fiber. FIG. 42 is a perspective view showing the structure of the optical switch 101. The optical switch 101 comprises a clad portion 106 comprising LiNbO$_8$ (lithium niobate) which is an optical anisotropic crystal, core portions 102 and 103 which constitutes an optical wave guide, electrodes 104 and 105 and a power source 107. The optical fiber is formed by the clad portion 106 and the core portions 102 and 103.

The core portions 102 and 108 in the clad portion 108 are disposed in parallel with each other with a distance provided therebetween. The electrode 104 makes contact with one side surface of the core portion 102, and the electrode 105 also makes contact with one side surface of the core portion 103 in the longitudinal direction of the core portions 102 and 103 respectively, thereby each being formed in the shape of a strap. The power source 107 is connected between the electrodes 104 and 105. An electric field E is generated by applying a DC voltage between the electrodes 104 and 105. By changing the refractive index of the clad portion 106 made of optically anisotropic crystals, light 108 incident on the core portions 102 and 103 is transmitted between the core portions 102 and 103.

In addition to the optical communication using such an optical switch, the widespread use of personal handy information terminals is amazing as a feature of the information-oriented society. As display units for such handy information terminals, liquid crystal displays (hereinafter referred to as "LCD") featuring a light weight, a low profile and a low power consumption are used dominantly. Furthermore, in addition to handy information terminals, LCDs are also used for operation devices of optical logic operation units and spatial optical modulators, such as direct-viewing or projection-type light valves. The range of use of LEDs is very wide. As optical modulation modes for a variety of LCDs, a method using the birefringence of liquid crystal molecules has become mainstream. For example, the following methods are available.

(1) Interference Mode (Example) ECB (Electrically Controlled Birefringence) mode SSF-LC (Surface Stabilized Ferroelectric Liquid Crystal) mode (2) Optically Rotatory Power Mode (Example) TN (Twisted Nematic) mode (3) Light Scattering Mode (Example) Macromolecular dispersion (PDLC) mode Nematic-cholesteric phase transfer type (PCM) mode (4) Light Absorption Mode (Example) Nematic-cholesteric phase transfer type guest host mode (PCGH)

Two-layer type guest-host mode (DGH)

As an example of an optical switch implemented by using a liquid crystal, Japanese Unexamined Patent Publication JP-A 59-7337 (1984) discloses an optical switch for switching linearly polarized light incident at a critical angle or more by using a change in a refractive index generated at an interface between a liquid crystal layer and a substrate holding the liquid crystal layer. In addition, Japanese Unexamined Patent Publication JP-A 6-258672 (1994) discloses an optical switch for switching non-polarized light incident at a critical angle or more by using a change in a refractive indices generated at an interface between an optical waveguide and a liquid crystal layer. Furthermore, Japanese Patent Application 7-166448 (1995) applied by the applicants of the present invention, discloses a reflection-type optical switch and a display unit comprising an optical waveguide, a substance layer (a liquid layer, for example) whose refractive indices is changed by an external field, and a lightproof portion, and being capable of obtaining a high contrast ratio and a high luminance by using non-polarized light.

The optical switch, disclosed in the above-mentioned JP-A 59-7337 (1984) and adopting the interference mode and the optically rotatory power mode by using linearly polarized light, requires a polarizing plate since specific polarized light is used. Therefore, an optical signal having a high contrast ratio can be obtained. However, when incident light is nearly similar to non-polarized light, or when polarization of the incident light is apt to be canceled, the utilization factor of light is reduced to a half or lower. In addition, an analyzer such as a polarizing plate or the like for detecting modulation results is required, whereby the utilization factor of light is further lowered As a result, when an optical logic operation is performed, the utilization factor of light signals is reduced as the content of operation is more complicated, requiring means for amplification such as an optical amplifier or the like. In addition, the SN (Signal-to-Noise) ratio is lowered owing to the effect of noise which will be caused during the operation as a matter of course. Moreover, although a display unit such as a reflecting LCD display unit used for handy information terminals is required to have a high resolution and a high luminance in these days, the display unit cannot deliver the high contrast ratio and the high luminance, since the amount of light usable by the optical switch is half of the amount of light of light source theoretically, or half or less in actual practice owing to the loss of light.

Furthermore, in the optical switch, so-called stray light may occur, that is, the incident light to the liquid crystal layer is reflected by the interface between the liquid crystal layer and the substrate on the outgoing light side, and is incident on the liquid crystal layer again. This stray light is undesirable since the stray light is the cause of lowering the contrast ratio.

Since the optical switch proposed in the above-mentioned Japanese Patent Application 7-166448 (1995) and adopting the light scattering mode and the light absorption mode because of the use of non-polarized light performs switching between a lightproof condition gathering light at the lightproof layer and a transmission condition gathering no light, the switching characteristic is adversely affected by the temperature rise at the lightproof layer at the time of gathering light. Furthermore, since parallel light must be selected from slightly expanding light of the light source, the amount of usable light is reduced. When the switch is applied to a display unit, the luminance of the display unit is lowered. Like Japanese Patent Application 7-166448 (1995), Japanese Unexamined Patent Publication JP-A 6-258672 (1994) adopts the light scattering mode and the light absorption mode but does not disclose any specific method for performing switching capable of obtaining a high contrast ratio by actually using non-polarized light efficiently. Accordingly, the luminance of the display unit is low just as that of the display unit described above.

Furthermore, in the light scattering mode such as the above-mentioned PDLC mode or the PCM mode, hysteresis is apt to be generated in a voltage-transmission ratio curve, thereby making it difficult to continuously modulate incident light. Moreover, to obtain a sufficient scattering characteristic, some measures must be taken; such as increasing the thickness of the cell, or reducing the helical pitch of the twisting orientation of the liquid crystal, for example. However, these measures lead to increase in a drive voltage.

Besides, in the light absorption modes, such as the PCGH and DGH modes, a variety of methods are available, such as a gray-scale display method or a method for obtaining bright display without using a polarizing plate. However, when a coloring matter to be used has a light absorbing characteristic, the reliability of such a method is lowered because of the decomposition and deterioration of the coloring matter. Even when a highly light resistant coloring matter is used, the concentration of the coloring matter must be raised or the thickness of the cell must be increased to obtain a sufficiently high contrast ratio. However, these measures also cause a rise in a drive voltage.

In the optical switches in accordance with these various modes, the drive voltage is reduced and the band of transmission signals is expanded by changing the phase, by converting the transmission mode or by changing the traveling direction of the guided wave light, for example. However, since strictly optical design is still necessary, and highly crystalline materials are used, the device itself becomes fairly expensive. Because of the high price, such optical switches are impractical as signal processing optical switches to be used for signal transmission terminals (household transmission devices and transmission processing apparatuses, for example).

Furthermore, when optical switches are integrated for use in a display unit or the like, each device can be made very small and integrated by applying the LSI (Large Scale Integration) technology. However, to generate a sufficient optical modulation, a considerably long optical path is necessary, and each device must be integrated on the flat surface of a substrate by using the LSI technology. For these reasons, a two-dimensional large area is necessary for the substrate surface, thereby making it difficult to apply the technology to the production of dot-matrix display units.

SUMMARY OF THE INVENTION

An object of the present invention is to provide a deflecting device capable of being driven at low drive voltage, delivering optical output having a high contrast ratio, having a high utilization factor of optical signals, and offering superior display characteristics when used for a projection-type display unit such as a "projection," and another object is to provide a projection-type display unit using the deflecting device.

The invention provides a deflecting device comprising:

A deflecting device comprising:

an isotropic refractive index substance layer made of a light transmitting substance having a constant refractive index regardless of energy supplied from the outside;

a variable refractive index substance layer made of a light transmitting substance whose refractive index changes depending on the energy supplied from the outside;

a pair of energy transfer means with at least the variable refractive index substance layer interposed therebetween, for applying energy to the variable refractive index substance layer;

a light reflecting layer having a tilted reflecting surface for reflecting light which has passed through the isotropic refractive index substance layer and the variable refractive index substance layer; and light guiding means disposed on an outermost portion of the deflecting device on the light incident side.

In accordance with the invention, incident light from the light guiding means is guided to the isotropic and variable refractive index substance layers, and split into light reflected by an interface between the isotropic and variable refractive index substance layers and light passing through the interface, reaching the light reflecting layer and being reflected by the light reflecting layer. The light reflecting layer has the tilted reflection surface. By using the tilted reflection surface, an outgoing direction of the light reflected by the interface can be made different from that of the light reflected by the reflecting surface of the light reflecting layer. The intensity f the light reflected by the interface and the intensity of the transmitting light which has passed through the interface can be adjusted by supplying energy from the energy transfer means to the variable refractive index substance layer and by changing the refractive index of the variable refractive index substance layer. Consequently, switching for the gray-scale display or the like is made possible by using the light reflected by the interface or the reflecting surface of the light reflecting layer and by adjusting the intensity of the reflected light. The pair of energy transfer means are disposed with at least a variable refractive index substance layer disposed therebetween. One of the energy transfer means may be disposed on the side of the light reflecting layer opposite to the side on which the refractive index substance layer is positioned. Furthermore, one of the energy transfer means may be disposed between the light reflecting layer and the refractive index substance layer.

The invention is characterized in that the light reflecting layer also serves as either one of the pair of energy transfer means.

In accordance with the invention, the structure of the deflecting device is simplified since the light reflecting layer also serves as one of the pair of energy transfer means.

Furthermore, the present invention is characterized in that either one of the pair of energy transfer means comes into contact with one of the surfaces of the variable refractive index substance layer, and the other energy transfer means comes into contact with the other surface, namely the opposite surface, of the variable refractive index substance layer.

In accordance with the invention, since both of the pair of the energy transfer means directly comes into contact with the variable refractive index substance layer, a capacitance division does not occur. Therefore, a low voltage drive is made possible.

Furthermore, the invention is characterized in that the light reflecting layer and either one of the pair of energy transfer means are electrically connected to each other.

In accordance with the invention, the light reflecting layer and either one of the pair of energy transfer means are electrically connected to each other. This kind of structure is adopted preferably when the deflecting device is driven with an active matrix drive method using a switching device.

Furthermore, the invention is characterized in that a plurality of isotropic and variable refractive index substances are both provided in the deflecting device, and the isotropic and variable refractive index substances are disposed in parallel to the energy transfer means.

In accordance with the invention, the plurality of isotropic and variable refractive index substances are both provided in the deflecting device, and the isotropic and variable refractive index substances are disposed in parallel to the energy transfer means. When the plural variable refractive index substance layers have different polarization axes, for example, natural light comprising light beams having different polarization directions can be reflected by the interfaces of the variable refractive index substance layers, by reflecting a light beam by the interface of one of the variable refractive index substance layers, whose polarization axis direction coincides with the polarization direction of the light beam. Therefore, the reflectivity of the incident light can be enhanced. In addition, since the plurality of variable refractive index substance layers are interposed between the pair of energy transfer means, no parallax is generated.

Furthermore, the invention is characterized in that at least two of the optical axes of the plural variable refractive index substance layers are perpendicular to each other.

In accordance with the invention, at least two of the optical axes of the variable refractive index substance layers are selected in a direction perpendicular to each other. Therefore, natural light comprising a mixture of light beams having different polarization directions can be split into two light beams having two directions perpendicular to each other, and the light beams can be reflected by one of the interfaces of the two variable refractive index substance layers. Consequently, almost 100% of the incident light can be reflected, thereby offering an on/off ratio sufficient for use as an optical switch.

Furthermore, the invention is characterized in that at least one isotropic refractive index substance layer is disposed among the plurality of variable refractive index substance layers.

In accordance with the invention, by selecting a proper material for the isotropic refractive index substance layer disposed among the plurality of variable refractive index substance layers, a mutual close contact at the plurality of variable refractive index substance layers can be enhanced when the layers are solid. Furthermore, by selectively determining the number of the isotropic refractive index substance layers disposed among the plurality of variable refractive index substance layers and the refractive indices of the isotropic refractive index substance layers, refractive indices can be adjusted more precisely.

Furthermore, the invention is characterized in that the tilting angle $\delta$ of the reflection surface of the light reflecting layer and the incident angle $\theta_1$ formed between the incident light and the normal line of the interface between the isotropic and variable refractive index substance layers satisfy a relationship described below.

$$\theta_1 / 2 \leq \delta \leq \theta_1 \quad (1)$$

In accordance with the invention, light reflected by the interface between the isotropic refractive index substance layer and, for example, a liquid crystal layer constituting the variable refractive index substance layer is delivered in a direction not perpendicular to the light passing through the interface. As a result, the light is split completely. When the deflecting device is used as a display device for example, display with a high contrast can be attained. Incidentally, in the case of $\delta = \frac{1}{2}$, the light reflected by the interface goes out in the direction perpendicular to the interface. Accordingly, when a plurality of the deflecting devices having the structure as described above are disposed to form a display unit, outgoing light beams from adjacent deflecting devices are not mixed, whereby a fine display can be attained.

Furthermore, the invention is characterized in that in the case where the refractive index of either one of the isotropic and variable refractive index substance layers is set to $n_2$, and the refractive index of the other refractive index substance layer is set to $n_1$, when the one of the refractive index substance layers is implemented by the isotropic refractive index substance layer and the other refractive index substance layer is implemented by the variable refractive index substance layer made of a uniaxial light transmitting substance having a normal refractive index no and an abnormal refractive index ne, the refractive indices $n_1$, $n_2$, no and ne satisfy the following relationships;

$$no \leq n_1 \leq ne \quad (2)$$

$$no \leq n_2 \leq ne \quad (3)$$

$$\theta_1 \geq \arcsin(n_2/ne) \quad (4)$$

and when the one of the refractive index substance layers is implemented by the variable refractive index substance layer made of a uniaxial light transmitting substance having the normal refractive index no and the abnormal refractive index ne, and the other refractive index substance layer is implemented by the isotropic refractive index substance layer, the refractive indices $n_1$, $n_2$, no and ne satisfy the following relationships;

$$no \leq n_2 \leq ne \quad (5)$$

$$no \leq n_1 \sin\theta_1 \quad (6)$$

$$ne \geq n_1 \quad (7)$$

In accordance with the invention, the refractive indices of the refractive index substance layers satisfy the relationships of the formulae (2) to (4) or the formulae (5) to (7). Therefore, even when the variable refractive index substance layer comprises a uniaxial light transmitting substance, proper switching can be attained by the action described above.

Furthermore, the invention is characterized in that in the case where the refractive index of either one of the isotropic and variable refractive index substance layers is set to $n_2$, and the refractive index of the other refractive index substance layer is set to $n_1$; and, on the other hand, when the one of the refractive index substance layers is implemented by the isotropic refractive index substance layer and the other refractive index substance layer is implemented by the variable refractive index substance layer made of the isotropic light transmitting substance having a maximum refractive index nmax and a minimum refractive index nmin, the refractive indices n1, n2, nmax and nmin satisfy the following relationships:

$$nmin \leq n1 \leq nmax \quad (8)$$

$$nmin \leq n2 \leq nmax \quad (9)$$

$$\theta 1 \leq \arcsin(n2/nmax) \quad (10)$$

and when the one of the refractive index substance layers is implemented by the variable refractive index substance layer made of the isotropic light transmitting substance having a maximum refractive index nmax and a minimum refractive index nmin, and the other refractive index substance layer is implemented by the isotropic refractive index substance layer, the refractive indices n1, n2, nmax and nmin satisfy the following relationships;

$$nmin \leq n2 \leq nmax \quad (11)$$

$$nmin \leq n1 \leq \sin\theta 1 \quad (12)$$

$$nmax \geq n1 \quad (13)$$

In accordance with the invention, the refractive indices of the refractive index substance layers satisfy the relationships of the formulae (8) to (10) or the formulae (11) to (13). Therefore, even when the variable refractive index substance layer comprises the isotropic light transmitting substance, proper switching can be attained by the action described above.

Furthermore, the invention is characterized in that the light guiding means comprises a prism having at least a first surface disposed nearly parallel with the interface between the isotropic and variable refractive index substance layers and a second surface intersecting with the first surface so as to guide light incident on the second surface in an angle range of ±20° with respect to the normal direction of the second surface to the isotropic and variable refractive index substance layers.

In accordance with the invention, polarized light from the polarizing means is allowed to be incident on the incident surface of the prism at an incident angle of −20° to 20°. When light is allowed to be incident on the prism from the air layer as shown in FIG. 12A at an incident angle in the above-mentioned range, the light is hardly reflected but passes through an interface between the air layer and the prism. When light is allowed to be incident on the air layer from the prism as shown in FIG. 12B at an angle in the above-mentioned range, the light is hardly reflected but passes through the interface between the prism and the air layer. Consequently, even when the light from the light source expands, the loss of light incident on the prism or outgoing from the prism can be restricted, whereby the utilization factor of light can be enhanced.

Furthermore, the invention is characterized in that the angle formed between the first and second surfaces of the prism is set in the range of 50° or more to less than 90°.

In accordance with the invention, in the above-mentioned structure, the incident angle of light incident on the prism in the direction perpendicular to the incident surface of the prism, measured with respect to the base surface of the prism, is equal to an angle formed between the base surface and the incident surface. Therefore, when the prism is placed over the isotropic refractive index substance layer so that the bottom surface of the prism is parallel with the isotropic refractive index substance layer, light is allowed to be incident on the interface between the isotropic refractive index substance layer and the variable refractive index substance layer such as a liquid crystal layer at the critical angle thereof by using a structure wherein the critical angle is equal to the angle formed by the bottom surface and the incident surface of the prism. FIG. 9 is a graph showing the relationship between the refractive index of the variable refractive index substance layer and the critical angle of the interface between the isotropic refractive index substance layer (having a refractive index of 1.5) and the variable refractive index substance layer. Although various substances can be used to comprise the variable refractive index substance layer, the maximum refractive index of the variable refractive index substance layer is conceived to have a limit of about 1.9. While keeping this in mind, by setting the angle formed between the bottom surface and the incident surface of the prism at a value in the range of 50° or more to less than 90°, light is allowed to be incident on the interface between the variable and isotropic refractive index substance layers at the critical angle.

Furthermore, the invention is characterized in that the projection area of the second surface projected to the first surface by the incident light from the second surface of the prism is larger than an actual switching area contributing to the switching.

In accordance with the invention, since the projection area of the second surface of the prism is larger than an actual switching area, light is allowed to be incident on the entire area of the actual switching area, whereby proper switching characteristics can be obtained.

Furthermore, the invention is characterized in that the prism has a third surface which is disposed in parallel with the first surface and outside the first surface and has an area larger than an actual switching area contributing to the switching.

In accordance with the invention, the light reflected by the interface or the reflecting surface of the light reflecting layer goes out from the third surface of the prism. The third surface is larger than an actual switching area. Therefore, no stray light is generated and the entire reflected light can be delivered from the third surface, whereby proper switching characteristics can be obtained.

The invention is characterized in that the variable refractive index substance layer comprises a liquid crystal.

In accordance with the invention, when the variable refractive index substance layer comprises a liquid crystal, a proper switching is enabled with the operations described above.

Furthermore, the invention is characterized in that the liquid crystal molecules forming the variable refractive index substance layer are oriented irregularly.

In accordance with the invention, the liquid crystal molecules are oriented irregularly. At this time, light is shut off and the intensity of the outgoing light becomes zero. At the time of energy application, the liquid crystal molecules are oriented regularly in accordance with the energy application, and the liquid crystal molecules transmit light. Proper switching can be performed by selectively determining a relationship between the two orientation states of the liquid crystal molecules and the refractive index of the refractive index substance layer.

Furthermore, the invention is characterized in that a plurality of pixel areas are set which are arranged in a matrix form, and the pair of energy transfer means are located opposite to each other in each pixel area.

In accordance with the invention, a plurality of pixel areas are set for performing the switching by the above-mentioned operations, and, for example, an image display can be performed by combining the states of the pixels.

Furthermore, the invention is characterized by comprising:

a light source for applying light to the light guiding means; and a light receiving means for receiving light going out from the light guiding means.

In accordance with the invention, the light coming from the light source is allowed to be incident on the isotropic and variable refractive index substance layers, and the reflected light from the interface or the reflecting surface of the light reflecting layer is received with the light receiving means. Therefore, a projection-type display unit wherein a deflecting device is used as a light valve can be implemented.

Furthermore, the invention is characterized in that light incident on the light guiding means is non-polarized light.

In accordance with the invention, the utilization factor of light is enhanced since the non-polarized light is allowed to be incident on the isotropic and variable refractive index substance layers.

Furthermore, the invention is characterized in that light incident on the light guiding means is polarized light.

In accordance with the invention, the utilization factor of light decreases since polarized light is allowed to be incident on isotropic and variable refractive index substance layers. However, switching is possible at a high contrast ratio.

Furthermore, the invention is characterized in that the light reflecting layer has a shape of a triangular prism with one side surface of the layer being parallel with the interface between the isotropic and variable refractive index substance layers, a cross section of the light reflecting layer is formed in a shape of an isosceles triangle in a direction perpendicular to the interface between the isotropic and the variable refractive index surface layers and to a direction in which the triangular prism extends, and when the tilt angle of the reflecting surface of the light reflecting layer is $\delta$ and the incident angle formed between incident light and the normal direction of the interface is $\theta 1$, a relationship of:

$$\theta\frac{1}{2} \leq \delta \leq \theta 1 \quad (1)$$

is satisfied.

In accordance with the invention, by using this kind of light reflecting layer, light reflected by the light reflecting layer can be delivered from the third surface of the prism in the direction nearly perpendicular to the surface.

Furthermore, the invention is characterized in that the deflecting device includes a polarizing means for polarizing the light to the light guiding means, either of the ordinary and extraordinary light components of the anisotropic refractive index of the liquid crystal molecules and the vibration direction of the polarized light incident on the liquid crystal molecules from the polarizing means are included in the same plane in a predetermined orientation state the liquid crystal molecules constituting the above-mentioned variable refractive index substance layer can take, and the following relationships are satisfied;

$N_1 \leq N/\sin\theta c$ $N_2 = N$ $\theta 1 \leq \theta c$ wherein $N_1$ represents one of the ordinary and extraordinary light components included in the same plane as that of the vibration direction of the polarized light, $N_2$ represents the other component, N represents the refractive index of the isotropic refractive index substance layer, $\theta 1$ represents the incident angle of the polarized light to the variable refractive index substance layer, and $\theta c$ represents the critical angle at the interface between the variable and isotropic refractive index substance layers.

In accordance with the invention, the polarized incident light incident on the variable refractive index substance layer from the polarizing means is included in the same plane as that for one of the ordinary and extraordinary components of the anisotropic refractive index of the liquid crystal molecules, namely $N_1$, in a predetermined orientation state (referred to as "state A") which the liquid crystal molecules constituting the variable refractive index substance layer can take, and, at the same time, the following relationships are satisfied:

$N_1 \leq N/\sin\theta c$ $N_2 = N$ $\theta 1 \leq \theta c$

Accordingly, the polarized light is totally reflected by the interface between the variable and isotropic refractive index substance layers. On the other hand, when the orientation state of the liquid crystal molecules is changed from the state A to another state (referred to as "state B") indicating the other component (the normal or abnormal component) of the anisotropic refractive index, namely $N_2$, the polarized light incident on the variable refractive index substance layer passes through the variable refractive index substance layer having the refractive index of $N_2$ followed by being incident on the isotropic refractive index substance layer having the refractive index N. At this time, the incident light passes through the interface between the variable and isotropic refractive index substance layers without receiving any actions at the interface between the variable refractive index substance layer and the isotropic refractive index substance layer because of the relationship of $N_2 = N$. In other words, by switching the orientation of the liquid crystal molecules between the states A and B, the polarized light incident on the variable refractive index substance layer can be modulated so that the light is either reflected at the layer or passes through the layer.

Furthermore, when the orientation state of the liquid crystal molecules takes a state between the states A and light having an intensity of $I \cdot \sin\phi$ portion (wherein I represents the intensity of the incident light, and $\phi$ represents an angle formed between the vibration direction of the incident light and the major axis of the liquid crystal molecule) passes through the variable refractive index substance layer having the refractive index of $N_2$ and is allowed to be incident on the isotropic refractive index substance layer and then passes through the interface without receiving any actions at the interface. At this time, when both the reflected and transmitted components are generated at the interface, the gray-scale display can be attained by linearly changing the above-mentioned $\phi$.

Furthermore, since the variable refractive index substance layer causes an orientation change in a plane parallel with the surface of the isotropic refractive index substance layer, a margin for the expansion of the incident light is wide. Moreover, since in the variable refractive index substance layer, the anchoring energy for the orientation change in a plane parallel with the variable refractive index substance layer is generally smaller than the anchoring energy for the orientation change in the normal direction of the variable refractive index substance layer, the orientation change of the liquid crystal molecules in a plane parallel with the isotropic refractive index substance layer can be generated by a relatively low drive voltage. In other words, light modulation can be attained by applying a relatively low drive voltage.

Furthermore, the invention is characterized in that the liquid crystal forming the variable refractive index substance layer comprises a liquid crystal having a bistable mode, and the vibration direction of the polarized light incident on the variable refractive index substance layer and the orientation direction of the liquid crystal molecules in one of two stable states are included in the same plane.

In accordance with the invention, since the vibration direction of the polarized light incident on the variable refractive index substance layer and one of two stable states of the liquid crystal molecules are included in the same plane, the polarized light is totally reflected by the interface between the variable and isotropic refractive index substance layers. Furthermore, when the orientation state of the liquid crystal molecules is changed to the other stable state, light having an intensity of I·sin φ (part of the incident light) (wherein I represents the intensity of light, and φ represents the cone angle of the liquid crystal) passes through the variable refractive index substance layer. Consequently, light modulation can be attained by driving the liquid crystal and by switching the liquid crystal molecules between the two stable states.

Furthermore, the invention is characterized in that the cone angle formed between two stable states of the liquid crystal molecules is about 90°.

In accordance with the invention, the polarized incident light is totally reflected by the interface between the variable and isotropic refractive index substance layers when the cone angle of the liquid crystal is set at about 90° and the liquid crystal molecules are at one stable state. On the other hand, when the state of the liquid crystal molecules is switched to the other stable state, the intensity of the light passing through the variable refractive index substance layer is represented by I·sin φ wherein I represents the intensity of the incident light and φ represents the cone angle of the liquid crystal. Since φ is about 90°, the polarized incident light almost totally passes through the variable refractive index substance layer. Consequently, modulated light having a high contrast ratio can be obtained.

Furthermore, the invention is characterized in that the liquid crystal constituting the variable refractive index substance layer is a monostable mode liquid crystal.

In accordance with the invention, the orientation state of the liquid crystal molecules changes depending on the drive voltage while the drive voltage is applied, and returns to a stable state when the drive voltage is not applied. When the orientation direction of the liquid crystal molecules and the vibration direction of the polarized incident light are arranged so as to be included in the same plane for example, the polarized incident light is totally reflected by the interface between the variable and isotropic refractive index substance layers when the liquid crystal molecules are in a monostable mode, that is, when the drive voltage is not applied. When the orientation direction of the liquid crystal molecules is changed by applying the drive voltage, the intensity of the light passing through the variable refractive index substance layer changes continuously depending on the drive voltage. As a result, the intensity of the modulated light can be changed continuously in scale levels. A gray scale display can thus be attained by applying the deflecting device to a display unit or the like for example.

Furthermore, the invention is characterized in that the deflecting device is provided as a light valve.

In accordance with the invention, since the deflecting device is provided as a light valve, a projection-type display unit including a deflecting device and capable of delivering display at a high contrast ratio by applying a relatively low drive voltage can be attained.

BRIEF DESCRIPTION OF THE DRAWINGS

Other and further objects, features, and advantages of the invention will be more explicit from the following detailed description taken with reference to the drawings wherein:

FIG. 5 is a step view showing a method for producing a metal mold 28 used to generate the tilting means 3, 3a;

FIG. 17 is a graph showing a relationship between applied voltage and intensities of outgoing light beams 36 and 37 from the deflecting device 1a;

FIG. 35A is a perspective view seen from diagonally above the variable refractive index substance layer; FIG. 35B is a plan view seen from above in the normal direction of the variable refractive index substance layer.

FIG. 38 is a schematic view of a deflecting device in accordance with an eleventh embodiment of the invention, the view showing a condition in which the orientation of the liquid crystal molecules is changed depending on applied drive voltage;

FIG. 39 is a graph showing the reflectivity and transmittance rate of the deflecting device when the orientation of the liquid crystal molecules is changed.

DETAILED DESCRIPTION OF THE PREFERRED EMBODIMENTS

Figure 1:
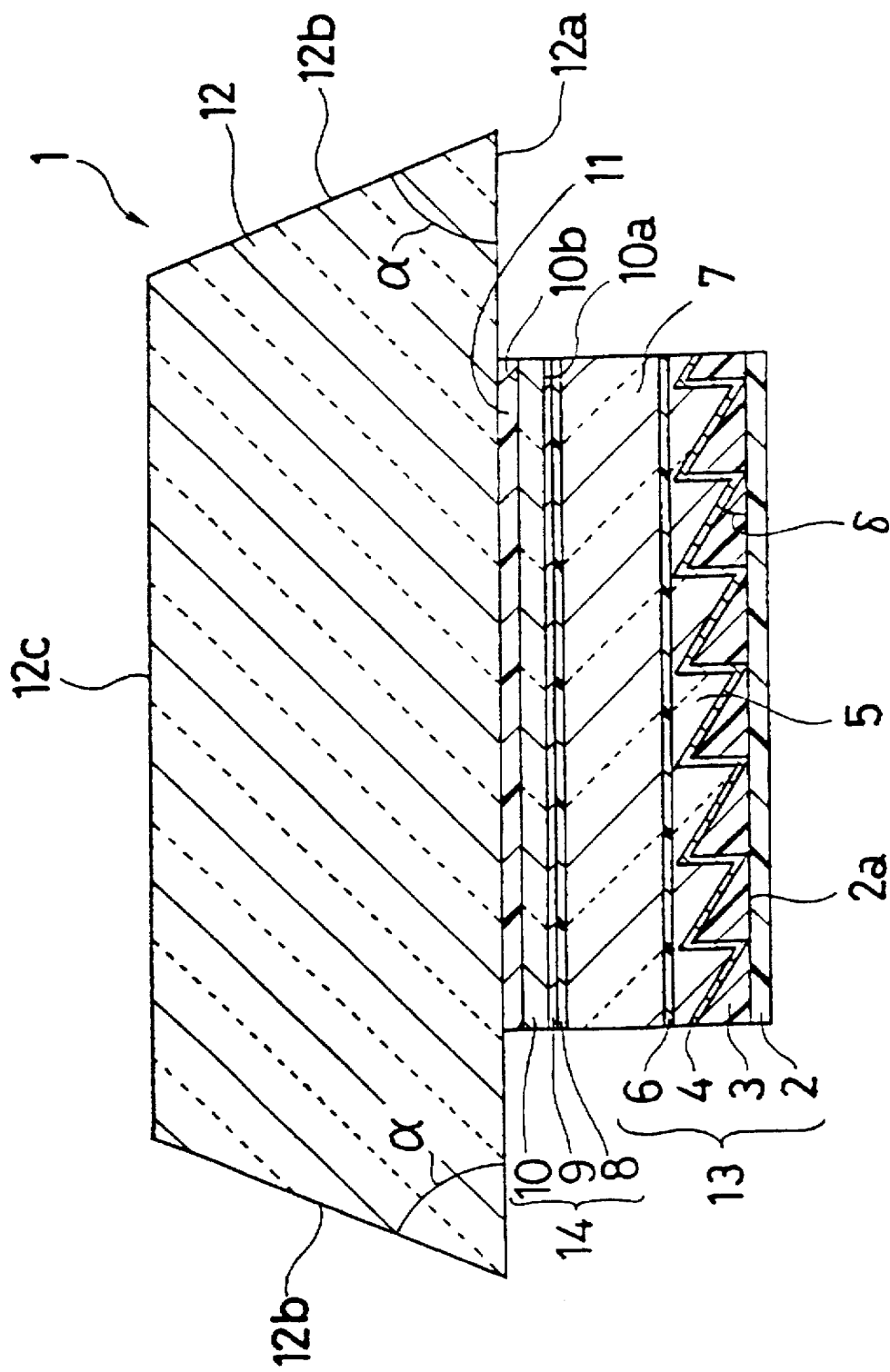
FIG. 1 is a sectional view showing a structure of a deflecting device 1 in accordance with a first embodiment of the invention.

Now referring to the drawings, preferred embodiments of the invention are described below.

FIG. 1 is a sectional view showing a structure of a deflecting device 1 in accordance with a first embodiment of the present invention. The deflecting device 1 comprises an insulating substrate 2, tilting means 3, a light reflecting electrode 4, an isotropic refractive index substance layer 5, orientation films 6 and 8, a variable refractive index substance layer 7, a transparent electrode 9, a light transmitting substrate 10, an adhesion layer 11 and a prism 12. The deflecting device 1 uses a liquid crystal as a variable refractive index substance, and also uses an electric field as energy supplied from the outside. The light reflecting electrode 4 functions as a light reflecting layer and one of a pair of energy transfer means. One of the energy application means and the light reflecting layer are integrated together by including the insulating substrate 2, the tilting means 3 and the light reflecting electrode 4. Furthermore, the other energy application means is constituted by including the transparent electrode 9 used as the other energy transfer means and the light transmitting substrate 10. The prism 12 is used as light guiding means.

Since a polymer film which is a solid, is used as the isotropic refractive index substance layer 5, and a liquid crystal is used as the variable refractive index substance layer 7 in the embodiment, one substrate member 13 and the other substrate member 14, which are used to hold the liquid crystal therebetween, are explained below separately. While the substrate member 13 constituted by including the insulating substrate 2, the tilting means 3, the light reflecting electrode 4, the isotropic refractive index substance layer 5 and the orientation film 6, the other substrate member 14 is constituted by including the orientation film 8, the transparent electrode 9 and the light transmitting substrate 10.

For example, on the surface 2a of the insulating substrate 2 implemented by using a glass substrate marketed under the trade name of 7059 and manufactured by Corning Inc., the tilting means 3, the surface of which is tilted by a predetermined angle δ (δ≠0°) from the surface 2a of the insulating substrate 2, is formed by using a metal mold made as described below. Furthermore, the light reflecting electrode 4 is formed over the surface of the tilting means 3. The light reflecting electrode 4 is implemented by using aluminum and is formed by the sputtering method. The angle δ is set to, for example, 35°.

The isotropic refractive index substance layer 5 implemented by using polyvinyl alcohol (PVA) having a refractive index of about 1.54, for example, is formed on the light reflecting electrode 4. The VA layer is formed by applying 5 wt % of an aqueous solution of PVA with the spin coat method followed by sintering the layer at 180° C. for 30 minutes. The isotropic refractive index substance layer 5 made in this manner functions as a film for smoothing the uneven surface of the tilting means 3 and also functions as a film for controlling the orientation of the liquid crystal used as the variable refractive index substance layer 7.

The surface of the PVA layer used as the isotropic refractive index substance layer 5 is provided with such a function as an orientation control film when the surface of the PVA layer is subjected to an orientation treatment by the rubbing method or the like. As a result, one substrate member 13 is completed. Instead of the PVA, polyvinylidene chloride having a refractive index of about 1.6, for example, can also be used. In this case, polyvinylidene chloride is dissolved in an appropriate solvent and applied as a film having a thickness of 0.5 μm to 1.0 μm to form the isotropic refractive index substance layer 5.

For example, the transparent electrode 9 implemented by using, for example, ITO (indium tin oxide) is formed by the sputtering method on the surface 10a of the light transmitting substrate 10 implemented by using the same glass substrate as that used for the insulating substrate 2. Furthermore, the orientation film 8 is formed so as to cover the transparent electrode 9 in the same way as the orientation film 6. As a result, the other substrate member 14 is completed.

The substrate members 13 and 14 are disposed so that the respective orientation films 6 and 8 thereof are disposed opposite to each other. The orientation treatment directions (rubbing treatment directions) are determined so as to be parallel and to be opposite to each other. addition, spacers implemented by using glass beads having a particle diameter of 10 μm are disposed between the substrate members 13 and 14, and the substrate members 13 and 14 are allowed to adhere to each other with an adhesive. Consequently, a space of 10 μm is formed between the substrate members 13 and 14. In the space, a liquid crystal having an abnormal light refractive index of ne=1.820 and normal light refractive index of no=1.533 marketed under the trade name of BL007 and manufactured by Merck Inc. is injected by the vacuum degassing method. A liquid crystal injection hole is sealed to form the variable refractive index substance layer 7. The injected liquid crystal molecules are homogeneously oriented by the orientation control forces of the orientation films 6 and 8, thereby forming the variable refractive index substance layer 7 formed of a uniaxial liquid crystal material.

The prism 12 made of glass is allowed to adhere to the other surface 10b of the light transmitting substrate 10 via the adhesion layer 11, the surface 10b being located opposite to the surface 10a of the light transmitting substrate 10, the surface 10a thereof being located opposite to the variable refractive index substance layer 7 of the substrate member 14. The prism 12 prevents the incident light from the substrate member 14 from being reflected by the surface of the light transmitting substrate 10. Furthermore, the prism 12 guides the incident light coming in an angle range of ±20° on the basis of the normal direction of the second surface 12b of the prism 12 out of the incident light coming from the second surface 12b toward the isotropic and variable refractive index substance layers 5 and 7. The prism 12 is implemented by using the same material having the same refractive index as that of the light transmitting substrate 10. Moreover, the adhesion layer 11 is implemented by using a material having almost the same refractive index and transmission spectrum as those of the light transmitting substrate 10 and the prism 12, for example, Locked 365 (trade name, manufactured by Locked Inc.).

A trapezoid is selected as a cross section configuration of the prism 12 as shown in FIG. 1. The prism 12 has a first surface 12a which is allowed to adhere to the light transmitting substrate 10 via the adhesive 11, a second surfaces 12b which intersects the first surface 12a to serve as a light incoming or a light outgoing surface, and a third surface 12c which is disposed in parallel with and outside of the first surface 12a to serve as a light outgoing surface. An angle α formed between the first surface 12a and the second surface 12b is set to a range of 50° or more to less than 90° with the result that the incident light coming from the second surface 12b is securely guided to the isotropic and variable refractive index substance layers 5, 7. The angle α is set to, for example, 70°.

Figure 2:
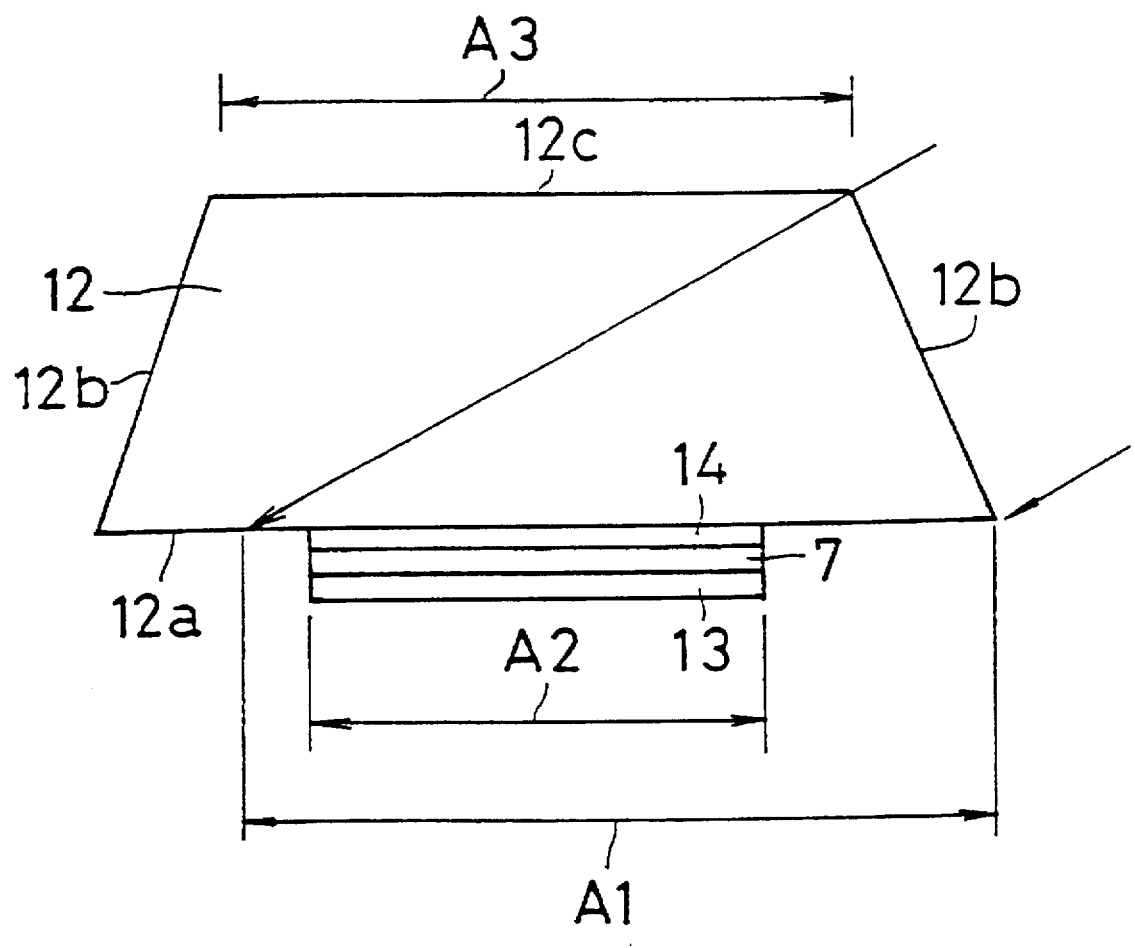
FIG. 2 is a view illustrating a size of a prism 12.

FIG. 2 is a view for illustrating a size of the prism 12. An area A3 of the third surface 12c is set to be larger than an actual display area A2 used for an actual display when the deflecting device 1 is used, for example, as a display unit. When the deflecting device 1 is used as a switching device, the area A3 of the third surface 12c is set to be larger than an actual switching area A2 used for an actual switching. The reflected light can thus be totally delivered from the third surface 12c. Furthermore, a projection area A1 of the second surface 12b projected by incident light coming from the second surface 12b to the first surface 12a is also set to be larger than the actual switching area A2. This allows light to be incident on the whole of the actual switching area A2.

Figure 3:
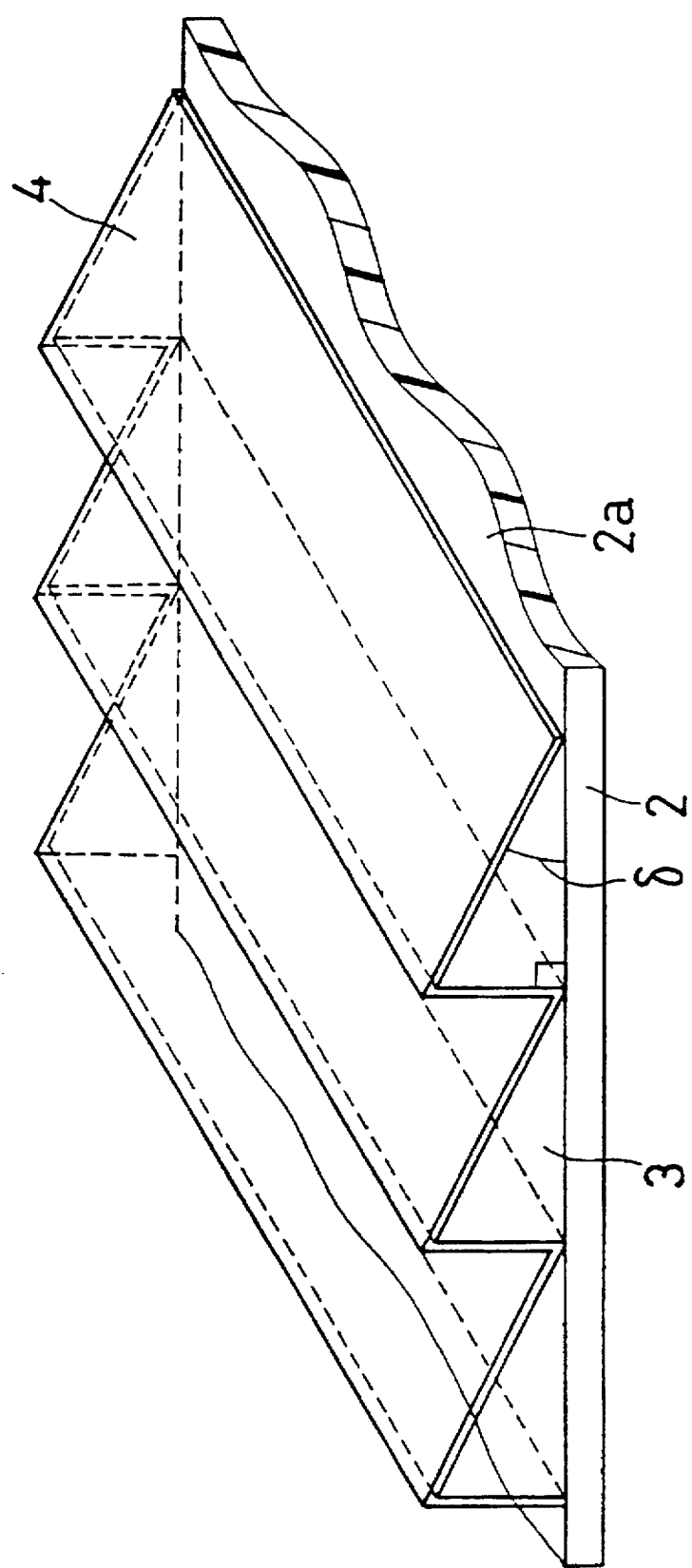
FIG. 3 is a vertical perspective view showing a structure of an insulating substrate 2 on which tilting means 3 and light reflecting electrodes 4 are formed.

FIG. 3 is a vertical perspective view showing a structure of the insulating substrate 2 on which the tilting means 3 and the light reflecting electrode 4 are formed. The tilting means 3 has a triangular pillar-like configuration. The tilting means 3 is disposed regularly so that one side of the triangular pillar comes into contact with one surface 2a of the surface of the insulating substrate 2. A right triangle is selected as a cross section configuration of the tilting means 3 at a cutting surface perpendicular to the surface of the insulating substrate 2, the cutting surface passing through a side at which two side surfaces of the triangular pillar other than the side surface contacting the surface 2a of the insulating substrate 2 converge, the cutting surface extending in a direction perpendicular to a direction in which the triangular pillar extends. One angle formed between the surface 2a of the insulating substrate 2 and one of the two side surfaces of the cross section right triangle is set to a right angle while the other angle formed between the surface 2a of the insulating substrate 2 and the rest of the two surfaces of the cross section right triangle is set to δ. The angle δ is determined to satisfy the relationship described below when the incident angle of the incident light to the isotropic and variable refractive index substance layers 5 and 7 is θ1, that is, when the angle between the incident direction of the incident light and the normal direction of the interface of the isotropic and variable refractive index substance layers 5 and 7 is θ1.

$$\tfrac{1}{2} \le \delta \le \theta_1 \qquad (1)$$

Figure 4:
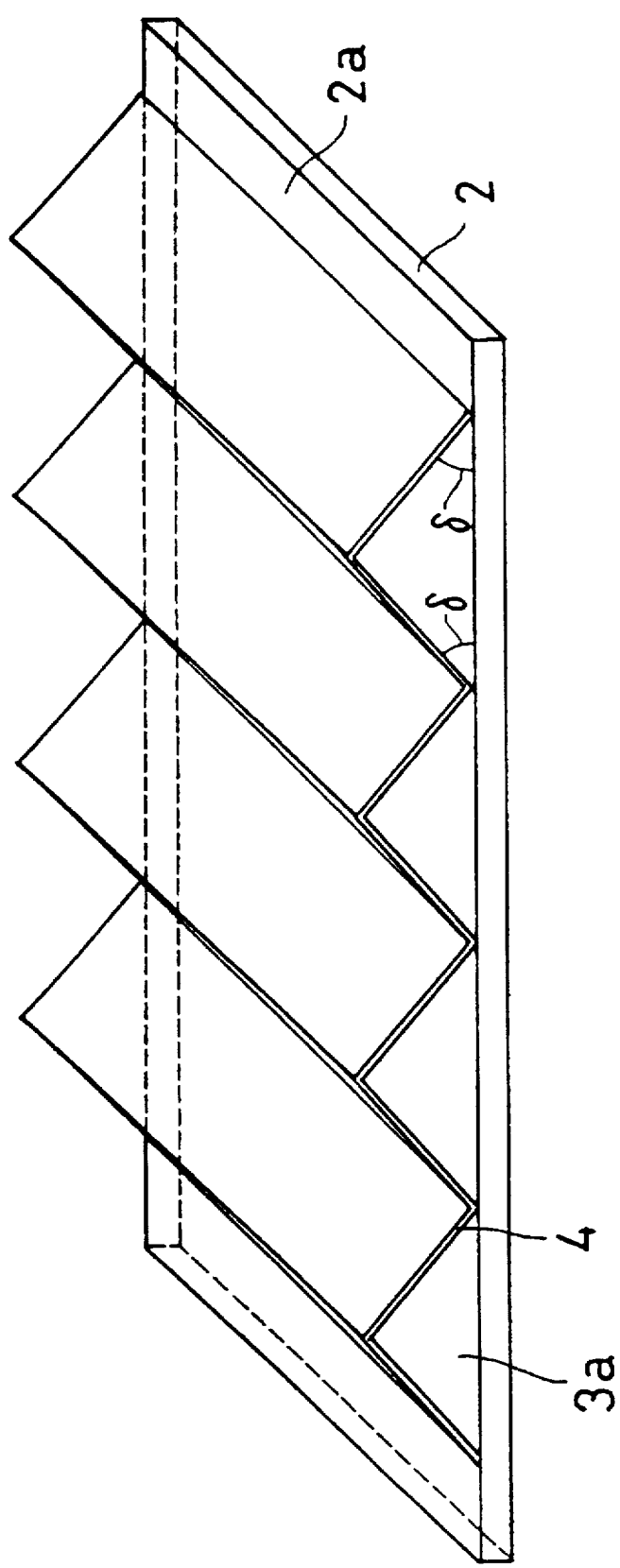
FIG. 4 a perspective view showing a structure of an insulating substrate 2 on which the tilting means 3a having another shape and light reflecting electrodes 4 are formed.

FIG. 4 is a perspective view showing a structure of the insulating substrate 2 on which tilting means 3a having a different shape and light reflecting electrodes 4 are formed. The tilting means 3a has a triangular pillar-like configuration. The tilting means 3 is disposed regularly so that one side of the triangular pillar comes into contact with one surface 2a of the surface of the insulating substrate 2. An isosceles triangle is selected as a cross section configuration of the tilting means at a cutting surface perpendicular to the surface of the insulating substrate, the cutting surface passing through a side at which two side surfaces of the triangular pillar other than one side surface contacting the surface 2a of the insulating substrate converge, the cutting surface extending in a direction perpendicular to a direction in which the triangular pillar extends. Two angles formed between the surface 2a of the insulating substrate and two side surfaces of the cross section right triangle are set to δ. The angle δ and the incident angle θ1 are determined to satisfy the relationship of the formula (1).

Figure 5:
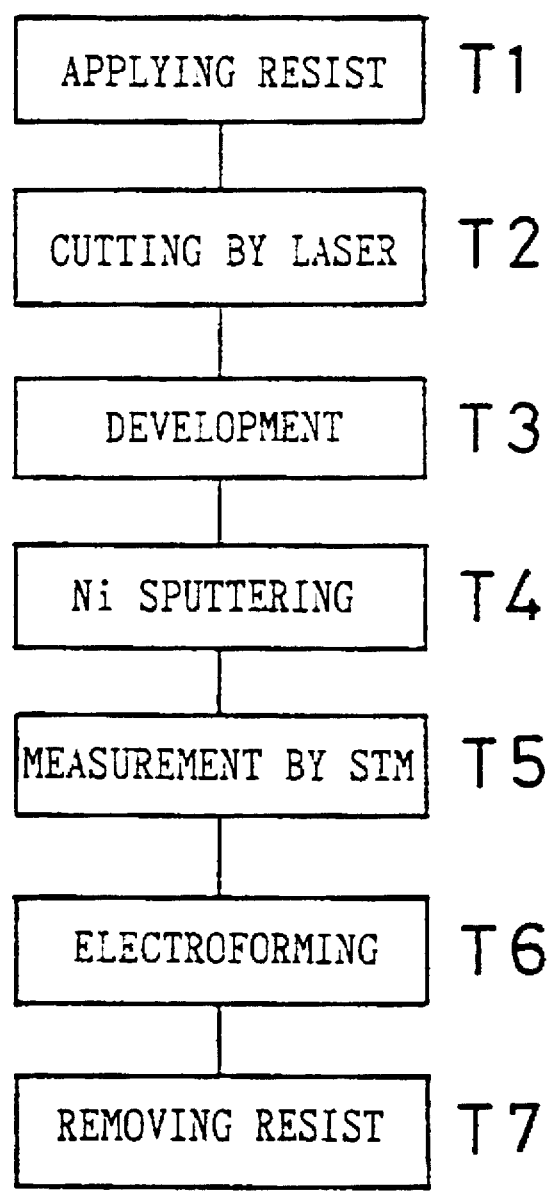
Figure 6A:
FIGS. 6A to 6G are sectional views illustrating a method for producing the above-mentioned metal mold 28 step by step.

FIG. 5 is a step view showing a method for producing a metal mold 28 used to produce the tilting means 3 and 3a. FIGS. 6A to 6G are sectional views illustrating the method for producing the above-mentioned metal mold 28 step by step. At step T1, as shown in FIG. 6A, a photoresist marketed under the trade name of OFPR-800 and manufactured by Tokyo Applied Chemical Co., Ltd. is applied onto a smooth substrate 21 made of glass for example by the spin coating method to form a photoresist film 22. It is preferable that the thickness of the photoresist film 22 is not less than the height of each right triangle or each isosceles triangle of the sectional shape of the tilting means 3, 3a. For example, the film is formed to a thickness of 1 μm to 50 μm.

Figure 6B:
Figure 6C:

At step T2, as shown in FIG. 6B, laser light 23 such as Ar (argon) laser light is applied to the photoresist film 22 so that the photoresist film 22 is processed. At step T3, the film is developed so that the photoresist film 24 having a sawtooth shape as shown in FIG. 6C is formed.

Figure 6D:
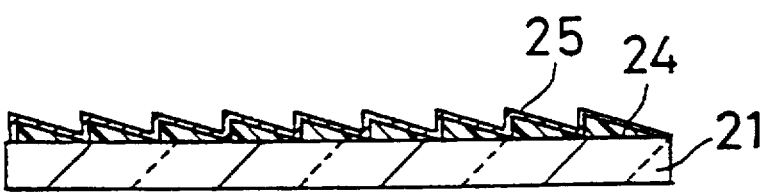
Figure 6E:
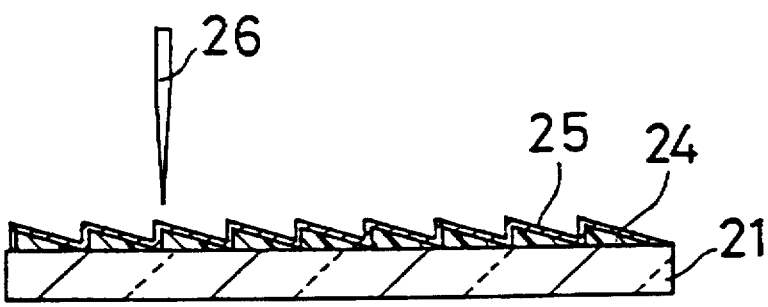
Figure 6F:
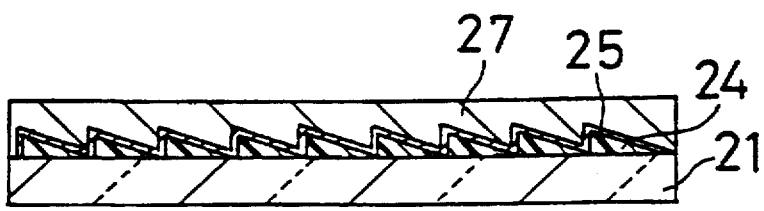

At step T4, Ni (nickel) is deposited on the photoresist film 24 as shown in FIG. 6D by the sputtering method so that a Ni film 25 is formed. At step T5, as shown in FIG. 6E, the surface shape is examined by the probe 26 of a scanning tunnel microscope (STM). At step T6, a Ni film 27 is further formed on the Ni film 25 as shown in FIG. 6F by electroforming. The electroforming is carried out at 30° C. and a current of 1 A/dm$^2$ by using electrolytic nickel for the anode and by using Ni—SO$_4$—NH$_4$Cl—H$_3$BO$_3$ for a plating bath.

Figure 6G:

At step T7, the substrate 21 and the photoresist film 24 are removed, thereby completing the metal mold 28 comprising the Ni films 25, 27 as shown in FIG. 6G. The tilting means 3, 3a are formed by the injection molding method on the surface 2a of the insulating substrate 2 by using the metal mold 28 produced in this manner.

Figure 7:
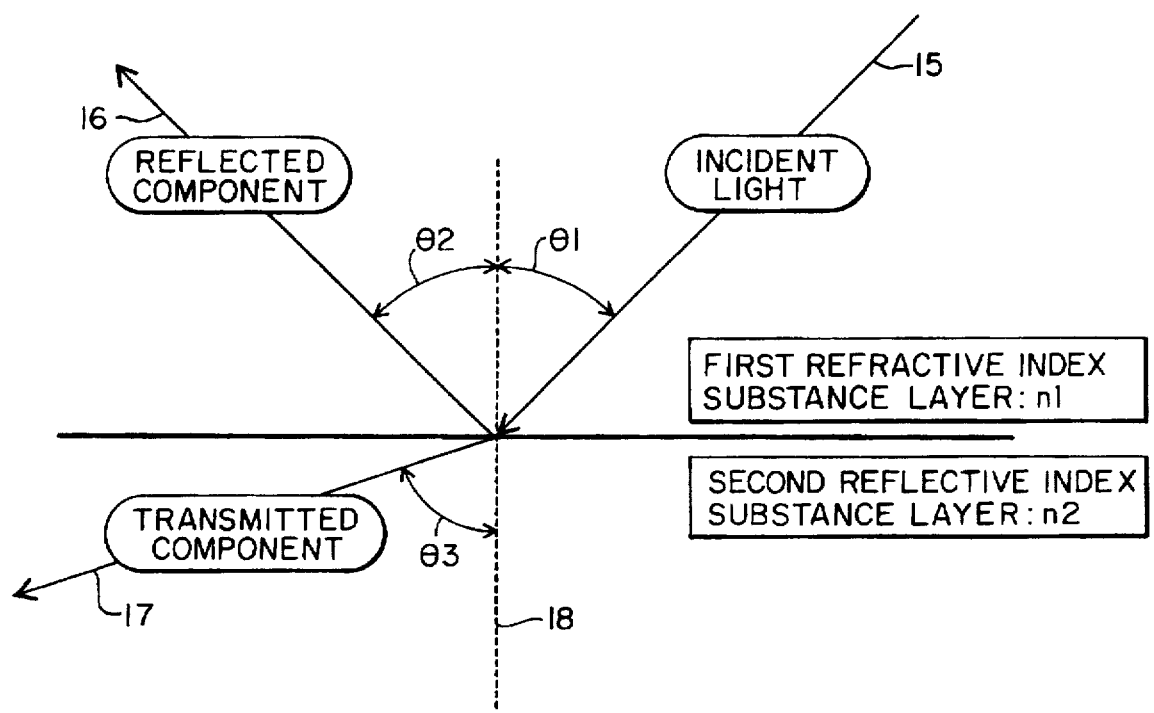
FIG. 7 is a view illustrating a basic operation principle of the deflecting device 1.

FIG. 7 is a view illustrating the basic operation principle of the deflecting device 1. One of the two refractive index substance layers of the deflecting device 1, namely one of the isotropic and variable refractive index substance layers, is described as the first refractive index substance layer having a refractive index of n1, and the other is described as the second refractive index substance layer having a refractive index of n2.

The incident light 15 to the first refractive index substance layer is allowed to be incident on the layer at the incident angle θ1 which is an angle formed with the normal direction 18 of the interface between the first and second refractive index substance layers, and is subjected to an action at the interface. As a result, the light is split into the reflected light 16, which is reflected by the interface and travels in the first refractive index substance layer, and the transmitted light 17 which passes through the interface and travels to the second refractive index substance layer. θ2 designates the outgoing angle formed between the reflection direction of the reflected light 16 and the normal direction 18, and θ3 designates the outgoing angle formed between the transmission direction of the transmitted light 17 and the normal direction 18. The light intensities of the reflected light 16 and the transmitted light 17 are represented as follows on the basis of Fresnel's formula.

$Rp=(n2\cdot\cos\theta1-n1\cdot\cos\theta3)/(n2\cdot\cos\theta1+n1\cdot\cos\theta3)$ $Rs=(n1\cdot\cos\theta1-n2\cdot\cos\theta3)/(n1\cdot\cos\theta1+n2\cdot\cos\theta3)$ $Tp=(2\cdot n1\cdot\cos\theta1)/(n2\cdot\cos\theta1+n1\cdot\cos\theta3)$ $Ts=(2\cdot n1\cdot\cos\theta1)/(n1\cdot\cos\theta1+n2\cdot\cos\theta3)$ wherein R and T designate the intensities of the reflected light 16 and the transmitted light 17, respectively, and subscripts p and s designate the intensities of the polarized light parallel to the incident surface (P polarized light) and the polarized light perpendicular to the incident surface (S polarized light), respectively.

Furthermore, the outgoing angle θ3 of the transmitted light 17 is calculated on the basis of Snell's law.

$n1\cdot\sin\theta1=n2\cdot\sin\theta3$

The absolute value of the outgoing angle θ2 of the reflected light 16 is equal to that of the incident angle θ1.

Figure 8:
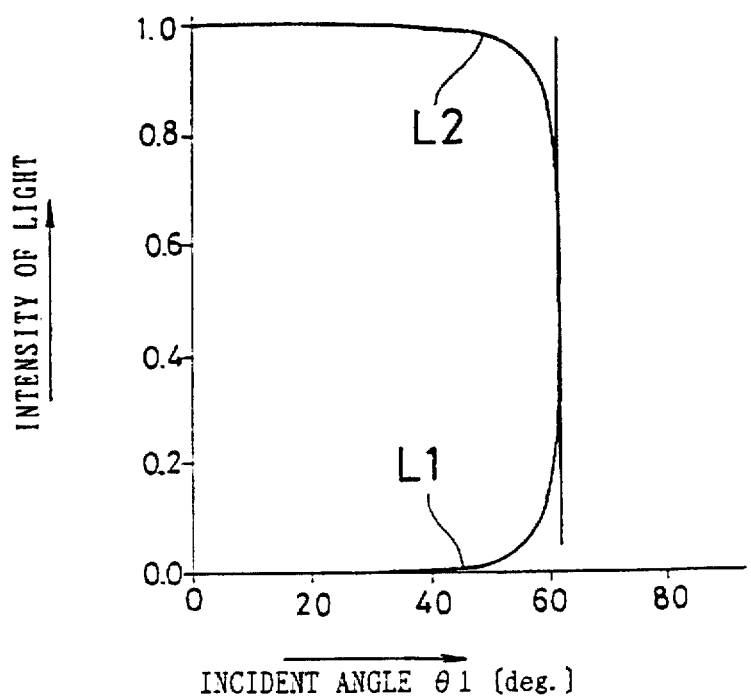
FIG. 8 is a graph showing changes in intensity of reflected light 16 and transmitted light 17 at an incident angle Θ1 of incident light 15 when refractive indices n1, n2 has a relationship of n1>n2.

FIG. 8 is a graph showing changes in the light intensities of the reflected light 16 and the transmitted light 17 at the incident angle θ1 of the incident light 15 when the refractive indices n1, n2 has a relationship of n1>n2. Curves L1 and L2 designate a change in the optical intensity of the reflected light 16 and a change in the optical intensity of the transmitted light 17, respectively. In an actual practice, the refractive indices n1 and n2 are set to 1.7 and 1.5, respectively.

When the incident angle θ1 becomes larger than 60°, the optical intensity of the transmitted light 17 becomes zero. It is thus found that the incident light 15 is totally reflected and goes out as the reflected light 16. The minimum incident angle value at which such total reflection is generated is referred to as an critical angle θc.

Figure 9:
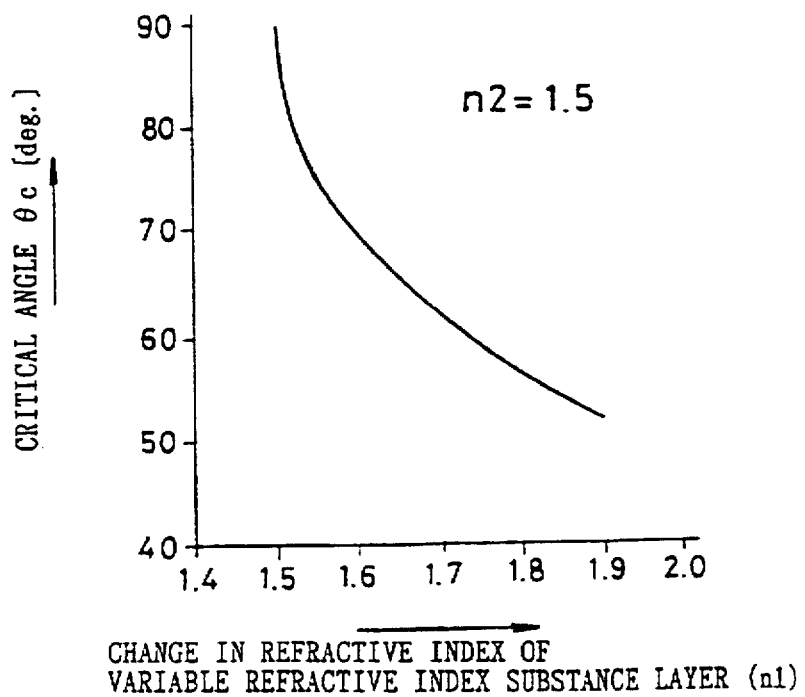
FIG. 9 is a graph showing a critical angle θc when the refractive index n2 is set to 1.5 and a refractive index n1 is changed.

FIG. 9 is a graph showing a critical angle θc when the refractive index n2 is set to 1.5 and the refractive index n1 is changed. It can be seen that the critical angle θc becomes smaller as the difference between the refractive indices n1 and n2 increases. Therefore, the incident angle θ1 can be reduced by increasing the difference between the refractive indices of the refractive index substance layers.

Furthermore, one of the two refractive index substance layers is made of a variable refractive index substance having a refractive index changing depending on the external field. When the refractive index of the variable refractive index substance layer is represented by n1 and the refractive index of the isotropic refractive index substance layer is represented by n2, the maximum and minimum refractive indices n1max and n1min of the refractive index n1 of the variable refractive index substance layer satisfy the following relationships.

$$n1max \geq n2/\sin\theta c \qquad (14)$$

$$n1min = n2 \qquad (15)$$

In other words, the refractive index n1 of the variable refractive index substance layer changes within a range from a value represented by the equation (14) to a value represented by the equation (15). At the value represented by the equation (14), the incident light 15 is totally reflected by the interface. At the value represented by the equation (15), the refractive indices of the two refractive index substance layers becomes equal to each other. The same results can also be obtained when the maximum refractive indices n1max is replaced with the abnormal refractive index n1ne and when the minimum refractive index n1min is replaced with the normal refractive index n1no.

In the range in which the refractive index n1 of the variable refractive index substance layer changes, namely in the range of n2<n1<n2/sin θc, the transmitted light 17 passing through the interface is generated. The optical intensity of the reflected light 16 can thus be changed. The state wherein the refractive index is n1max (n1ne) can be set as the ON state, and the state wherein the refractive index is n1min (n1no) can be set as the OFF state. Furthermore, when the refractive indices satisfy the relationship of n2<n1<n2/sin θc, a gradation display state can be obtained.

Figure 10A:
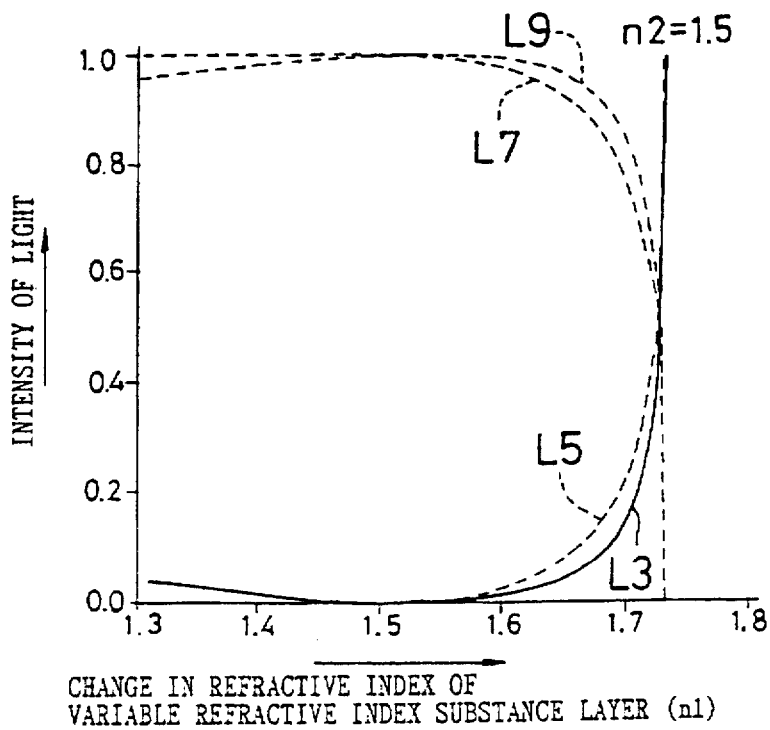
FIGS. 10A and 10B are graphs showing intensities when refractive index n1 is changed.
Figure 10B:
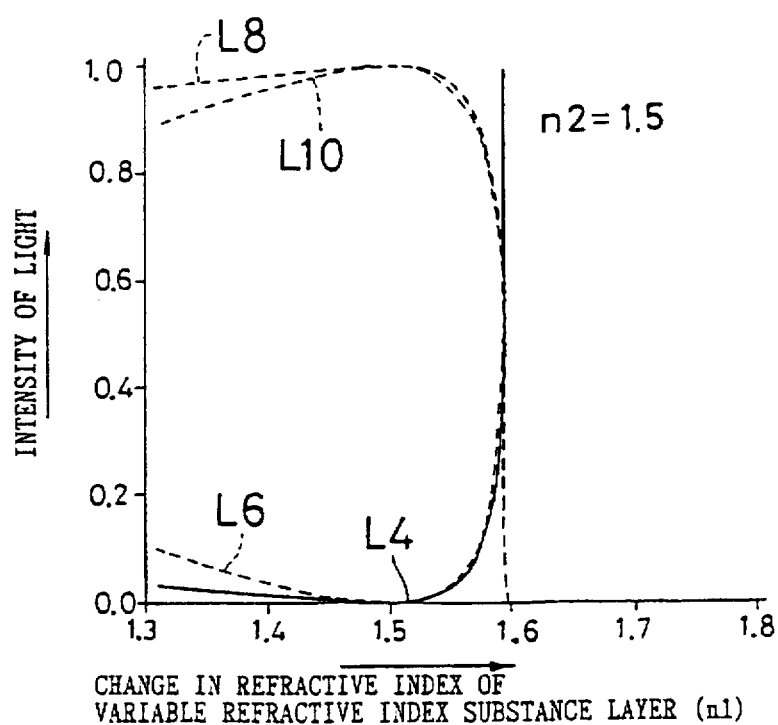

FIG. 10A is a graph showing the optical intensity when the refractive index n1 is changed while the refractive index n2 is fixed at 1.5 when the incident angle 1 is 60° FIG. 10B is a graph showing the optical intensity when the refractive index n1 is changed while the refractive index n2 is fixed at 1.5 when the incident angle θ1 is 70. Curves L3 and L4 represent the light intensities of the P-polarized reflected light 16, curves L5 and L6 represent the light intensities of the S-polarized reflected light 16, curves L7 and L8 represent the light intensities of the P-polarized transmitted light 17. and curves L9 and L10 represent the light intensities of the S-polarized transmitted light 17, respectively. It is can be seen that the amount of the reflected light can be changed continuously by changing the refractive index of the variable refractive index substance layer.

The basic operation principle of the deflecting device 1 is described above. More specifically, the incident light coming into the deflecting device via the prism 12 is split into the light reflected by the interface between the variable and isotropic refractive index substance layers 7 and 5 and the transmitted light passing through the interface. By changing the refractive index of the variable refractive index substance layer 7, the light intensities of the reflected light and the transmitted light can be changed. Furthermore, the transmitted light is reflected by the surface of the light reflecting electrode 4. By delivering the light reflected by the interface between the refractive index substance layers 7 and 5 and the light reflected by the surface of the reflecting electrode 4 in the directions different from each other, switching can be performed without causing an optical interference. Therefore, the surface of the reflecting electrode 4 is tilted by the tilting means 3 having an angle of δ (a tilt angle of δ).

Since the variable refractive index substance layer 7 is formed with a liquid crystal and switching is performed by using a specific polarization in the embodiment, the orientation films 6 and 8 are required. Therefore, it is necessary to consider the effect of the orientation film 6 on the reflection and transmission at the interface between the variable refractive index substance layer 7 and the isotropic refractive index substance layer 5. However, the orientation film is used almost generally for devices using liquid crystals, and the refractive index of the orientation film is almost the same as that of the liquid crystal. Therefore, it is regarded that the refraction by the orientation film can be neglected.

In the deflecting device 1, part of the incident light coming into the deflecting device at the incident angle +θ1 is reflected by the interface between the refractive index substance layers 7 and 5, and the reflected light goes out at the outgoing angle −θ2, the absolute value of which is equal to that of the incident angle θ1. The light which has passed through the interface is allowed to be incident on the isotropic refractive index substance layer 5 at the outgoing angle θ3 and is reflected by the surface of the reflecting electrode 4. The reflected light is reflected at the angle of −(θ3±2·δ) with respect to the surface 2a of the insulating substrate 2 and goes out. With this kind of structure, the light split at the interface is not composed again, thereby preventing adverse effects resulting from the interference.

Figure 11A:
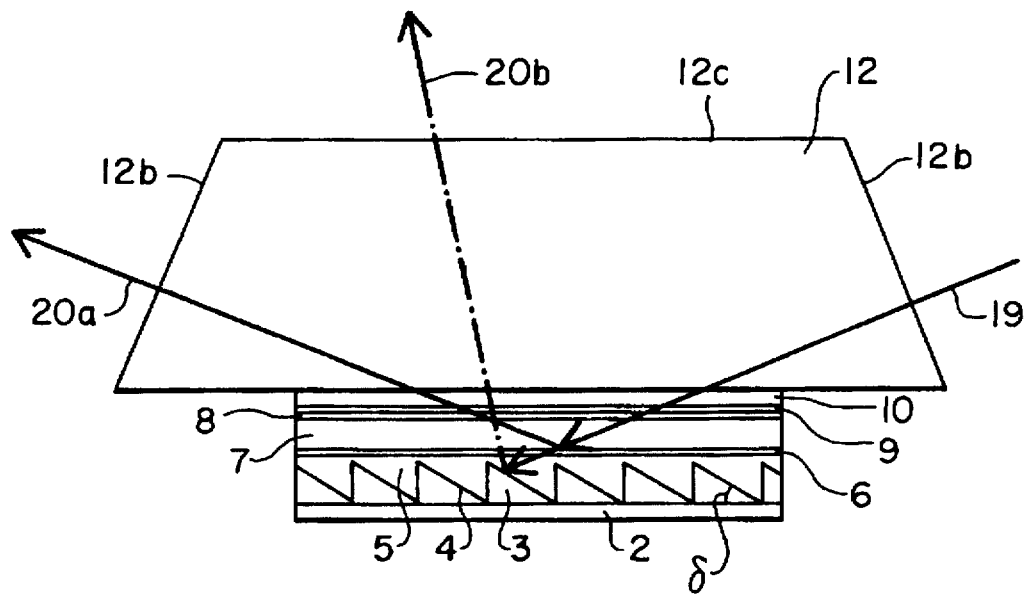
FIGS. 11A and 11B are views showing the tilt angle of the tilting means 3 and outgoing light beams 20a and 20b.
Figure 11B:
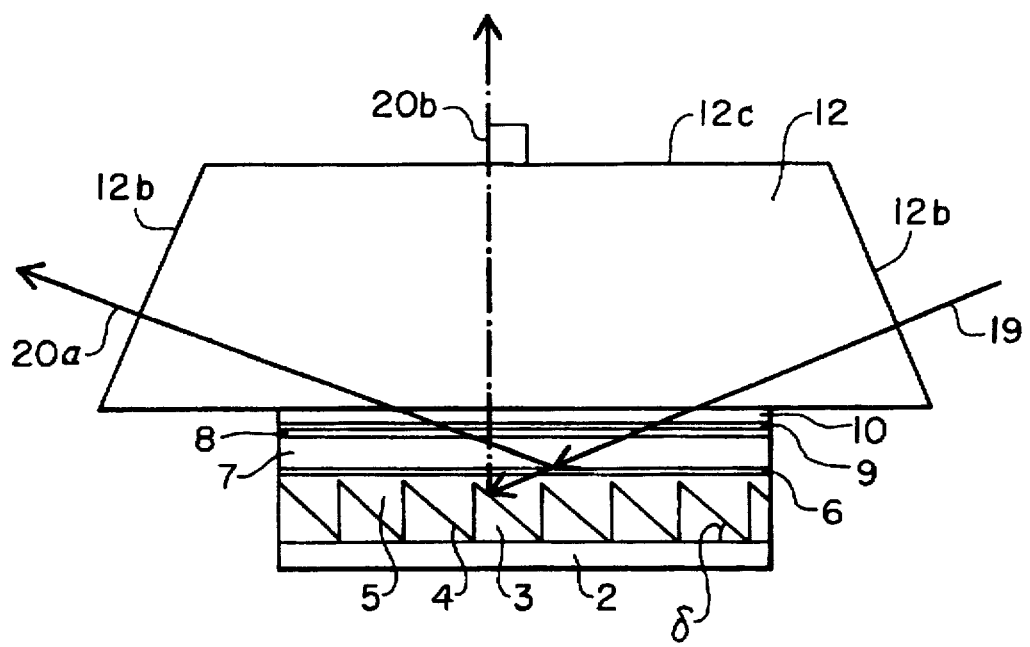

FIG. 11A is a view showing outgoing light beams 20a and 20b when the tilt angle of the tilting means 3 are set to ≠0 and ≠0½. FIG. 11B is a view showing outgoing light beams 20a, 20b when the tilt angle δ of the tilting means is set to =0½.

The incident light 19 coming into the prism 12 is perpendicular to, for example, the second surface 12b on the light incident side of the prism 12. The incident angle θ1 is determined by the angle α of the prism 12. The light (the ON state light) 20a reflected by the interface between the refractive index substance layers 7 and 5 goes out at the outgoing angle θ2, instead of the tilt angle of the tilting means 3, the absolute angle of the outgoing angle being equal to that of the incident angle θ1. In other words, the light goes out in a direction perpendicular to the second surface 12b on the light outgoing side of the prism 12.

The light 20b (the OFF state light) which has passed through the interface between the refractive index substance layers 7 and 5 and reflected by the surface of the reflecting electrode 4 goes out at an angle other than a right angle with respect to the third surface 12c of the prism 12 when the tilt angle is set to δ≠0 and δ≠0½. When the tilt angle δ=0½, the light goes out in a direction perpendicular to the third surface 12c of the prism 12.

The light 20a can be replaced with the OFF state light, and the light 20b can be replaced with the ON state light.

The angle α of the prism 12 is set in the range of 50° or more to less than 90° in consideration of the light reflection at the surface 10b of the light transmitting substrate 10. As a consequence, the allowable incident range of the deflecting device 1 is set to about ±10°. The prism 12 is disposed for the following reasons. It is not possible to think out a combination of materials for forming the refractive index substance layers 5 and 7 having a refractive index exceeding 0.4 from the currently used materials. Neither can it be possible to think of constituting the variable refractive index substance layers out of currently used materials such as anisotropic optical crystals, liquid crystals and polymers, the variable refractive index substance layers having a refractive index which is subject to change by the external field and satisfies the relationship of the equations (14) and (15). However, a difference in the refractive index between the air and glass exceeds 0.4. This means that an interface of the air and the light transmitting substance 10 completely reflects light at an incident angle at which the interface of the refractive index substance layers 5 and 7 completely reflects light.

Figure 12A:
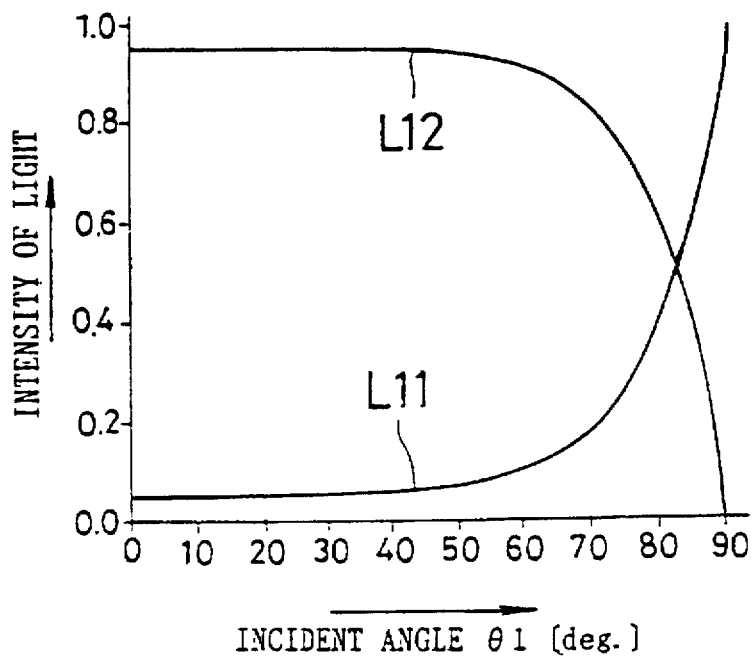
FIGS. 12A and 12B are graphs showing intensities of the reflected light 16 and the transmitted light 17 depending on the incident angle θ1 between the air layer and glass.
Figure 12B:
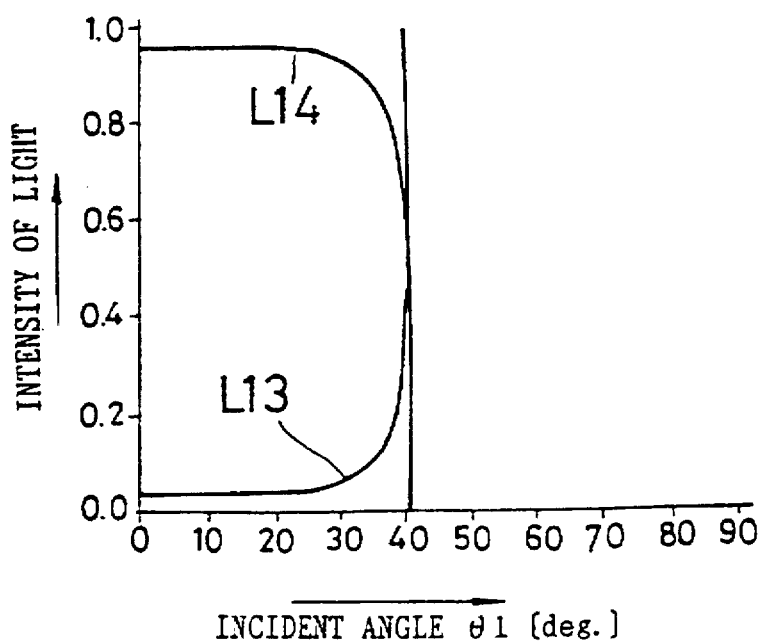

FIG. 12A is a graph showing the light intensities of the reflected light 16 and the transmitted light 17 at the incident angle θ1 at the time of the application of the light from the air layer to the glass. FIG. 12B is a graph showing the light intensities of the reflected light 16 and the transmitted light 17 at the incident angle of θ1 at the time of the application of light from the glass to the air layer. Curves L11 and L13 represent the intensities of the reflected light 16 while curves L12 and L14 represent the intensities the transmitted light 17. Referring to these graphs, it can be seen that a loss of the incident light 15 is large, and the amount of the outgoing light is reduced when the incident surface is disposed in parallel with the interface between the refractive index substance layers 5 and 7.

In the embodiment, the prism 12 is disposed to solve such a disadvantage. By using the incident light from the second surface 12b of the prism 12, the incident surface is not parallel with the interface between the refractive index substance layers 5 and 7, thereby reducing the loss in the incident light 15 and increasing the amount of the outgoing light.

Figure 13A:
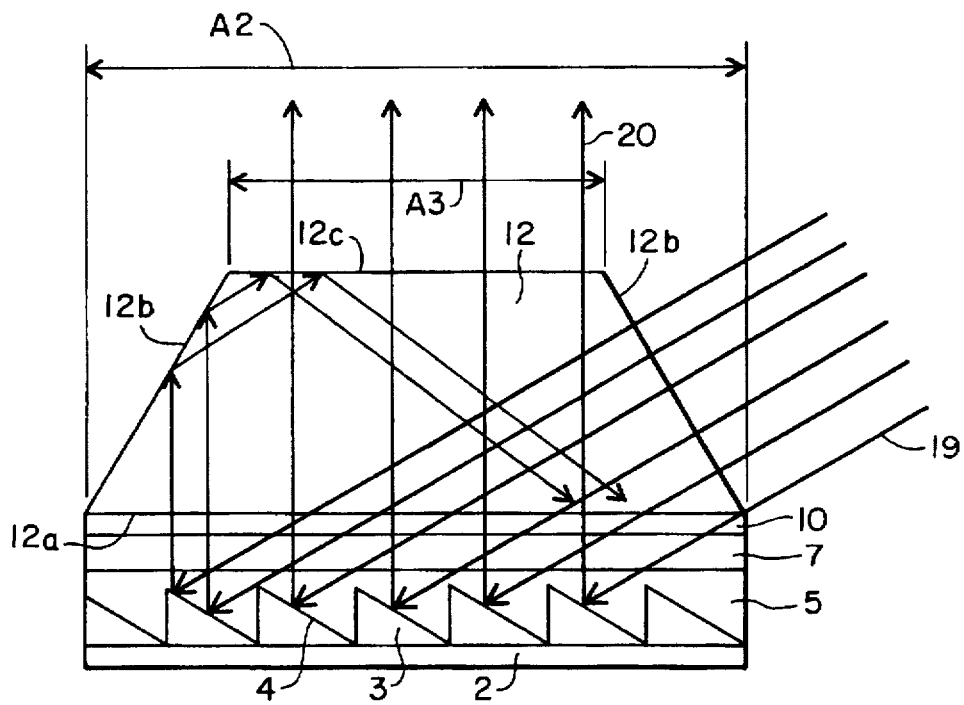
FIGS. 13A and 13B are views illustrating the relationship between a size of an area A2 of a third surface 12c of a prism 12 and an actual switching area A1.
Figure 13B:
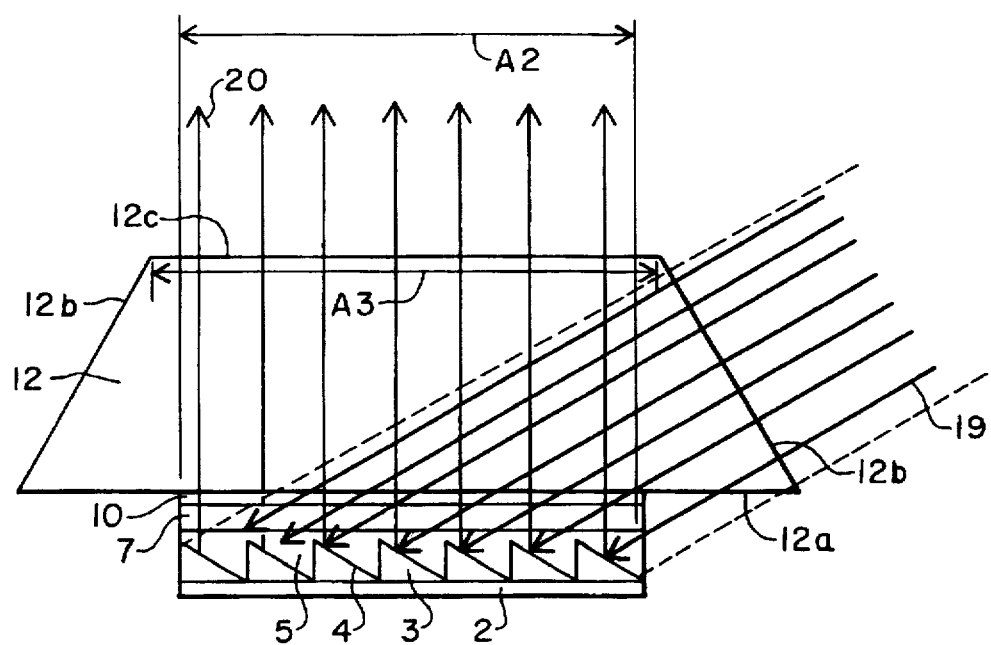

FIGS. 13A and 13B are views showing optical paths of a light inside the prism 12. FIG. 13A shows a case in which the area A3 of the third surface 12c is equal to or smaller than the actual switching area A2. In this case, part of the light incident on the prism 12 from the side of the refractive index substance layers 5 and 7 reaches the second surface 12b of the prism 12 and is reflected by the surface 12b, and then travels again toward the refractive index substance layers 5 and 7. Consequently, light is generated which is confined in the prism 12 so that a proper switching cannot be provided.

FIG. 13B shows a case in which the area A3 of the third surface 12c is larger than the actual switching area A2. In this case, the light incident on the prism 12 from the side of the refractive index substance layers 5 and 7 totally reaches the third surface 12c of the prism 12 and goes out from the surface 12c. Consequently, no light is confined in the prism 12 so that a proper switching is provided.

It is therefore preferable that the area A3 of the third surface 12c of the prism 12 is larger than the actual switching area A2.

Furthermore, the projection area A1 of the second surface 12b to be projected onto the first surface 12a by the incident light from the second surface 12b on the incident surface side of the prism 12 should be preferably equal to or larger than the actual switching area A2. This is because when the projection area A1 of the second surface 12b is smaller than the actual switching area A2, the incident light is not applied to the entire area of the actual switching area A2 so that a proper switching cannot be provided.

Figure 14:
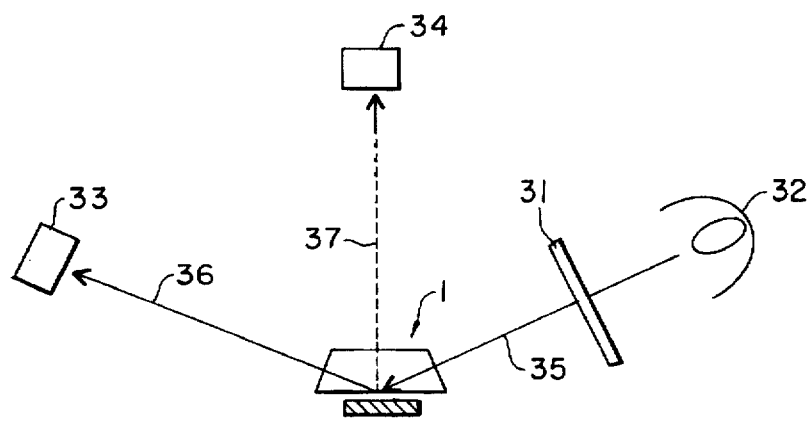
FIG. 14 is a view illustrating a method of detecting the intensity of outgoing light from the deflecting device 1.

FIG. 14 is a view illustrating a method of detecting the optical intensity of the outgoing light from the deflecting device 1. Light 35 coming from a light source 32 is incident on the second surface 12b on the light incident side of the prism 12 of the deflecting device 1 at an incident angle θ1 via the polarizing plate 31. Light (ON-state light) 36 outgoing after being reflected at the interface between the refractive index substance layers 5 and 7 is delivered from the second surface 12b on the light outgoing side of the prism 12, and the intensity of the light is detected by a detector 33. Light (OFF-state light) 37 outgoing after being reflected at the reflecting electrode 4 goes out from the third surface 12c on the light outgoing side of the prism 12, and the intensity of the light is detected by a detector 34.

Figure 15:
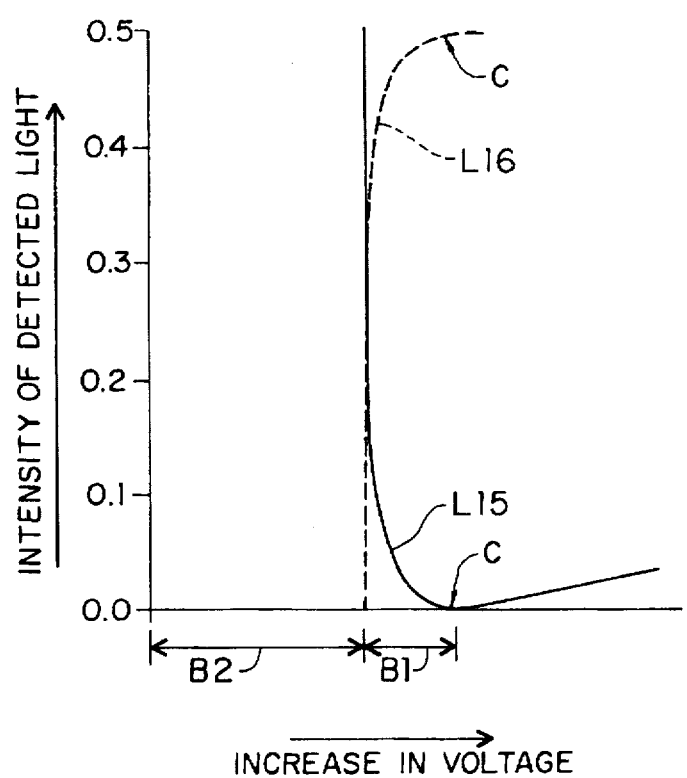
FIG. 15 is a graph showing a relationship between applied voltage and intensities of outgoing light beams 36 and 37 from the deflecting device 1.

FIG. 15 is a graph showing the relationship between applied voltage and the light intensities of outgoing light beams 36 and 37 from the deflecting device 1. As the applied voltage increases, the refractive index n1 of the variable refractive index substance layer 7 changes. Since a p-type nematic liquid crystal is used for the variable refractive index substance layer 7 in the embodiment, the refractive index n1 reduces as the applied voltage increases. Curve L15 represents the optical intensity of the ON-state light 36, and curve L16 represents the optical intensity of the OFF-state light 37. Displayable area B1 in the graph corresponds to the voltage application range represented by n2<n1<n2/sin θc, wherein n1 is the refractive index of the variable refractive index substance layer 7 and n2 is the refractive index of the isotropic variable refractive index substance layer 5. At point c in the graph, the refractive index n1 is equal to n2. The area in which the applied voltage is not more than the lowest voltage in the displayable area B1 is a total reflection area B2 wherein only the ON-state light 36 can be obtained. In the embodiment, n1 changes within a range of 1.6 and 1.71.

According to a first embodiment, the incident light specifically polarized is split into light which is reflected by the interface between the refractive index substance layers 5 and 7 and goes out, and light which passes through the interface is reflected by the reflecting electrode 4 and goes out in a direction different from the direction of the above-mentioned outgoing light. This kind of deflecting device 1 can have a sufficient ON/OFF ratio as an optical switch.

Incidentally, a liquid crystal is used as the variable refractive index substance layer 7 in the first embodiment, but an anisotropic crystal such as a crystal of lithium niobium can be also used instead of the liquid crystal. In this case, the variable refractive index substance layer 7 made of the anisotropic crystal can be also used as the light transmitting substrate 10.

In addition, the liquid crystal molecule orientation control method is not limited to the rubbing method, but the oblique deposition method can be also used. The orientation method is not limited to the homogeneous orientation method, but any orientation methods can be used as long as the refractive index of the liquid crystal continuously changes.

Furthermore, the methods for producing the tilting means 3 and the metal mold are not limited to those described above, but any methods can be used as long as the predetermined shapes can be formed.

Moreover, an electric field is used as energy to be applied from the outside, but any energy can be used as long as the energy is capable of changing the refractive index of the variable refractive index substance layer 7.

Besides, the light transmitting substrate 10 can also be used as the prism 12.

In the embodiment, the isotropic refractive index substance layer 5 is disposed on the side of the tilting means 3, and the variable refractive index substance layer 7 is disposed on the side of the prism 12. The variable refractive index substance layer 7 is made of a uniaxial liquid crystal material. Therefore, the refractive index n2 of the isotropic refractive index substance layer 5, the refractive index n1 of the variable refractive index substance layer 7, the normal light refractive index no and the abnormal refractive index ne of the refractive index substance layer 7 can satisfy the relationships represented by the formulae (2) to (4).

Furthermore, the variable refractive index substance layer 7 can be disposed at a position where the isotropic refractive index substance layer 5 is disposed, and the isotropic refractive index substance layer can be disposed at a position where the variable refractive index substance layer 7 is disposed. In this case, however, the refractive indices n1, n2, no and ne satisfy the formulae (5) to (7), and the formulae (14) and (15) are modified as follows:

$$n2min \leq n1 \cdot sin\theta 1 \quad (16)$$

$$n2max = n1 \quad (17)$$

In the formulae (5) to (7), (16) and (17), n1 represents the refractive index of the isotropic refractive index substance layer 5, and n2 represents the refractive index of the variable refractive index substance layer 7.

A deflecting device 1a capable of controlling non-polarized light can be implemented as a second embodiment of the invention by using the same structure as that of the deflecting device 1 according to the first embodiment wherein only specifically polarized light can be controlled. More specifically, the orientation films 6 and 8 for sandwiching the variable refractive index substance layer 7 of the deflecting device 1 are made by wintering at 80° C. resin films made of 6, 6-nylon produced by the spin coating method so as to provide spherical crystallization. Because of the orientation films having the spherical crystallization characteristic, the orientation of the liquid crystal molecules can be axially symmetrical. By reducing a size of the spherical crystal, liquid molecules can be oriented seemingly isotropic at random in two dimensions. The refractive index of the variable refractive index substance layer 7 at the time of the random orientation can be calculated by using the formula described below.

$$nave=((ne^2+no^2)/2)^{0.5}$$

By using such orientation films, switching can be carried out in the same way as that described in the explanation of the first embodiment, even when non-polarized light enters.

Incidentally, the variable refractive index substance layer 7 according to the second embodiment is implemented by a liquid crystal having an abnormal refractive index of ne=1.6826 and a normal refractive index of no=1.533, and the isotropic refractive index substance layer 5 is implemented by polyvinyl alcohol having a refractive index of 1.55. In addition, the incident angle θ1 is set to 70°, the tilt angle δ is set to 35°, and angle is see to 70°.

Figure 16:
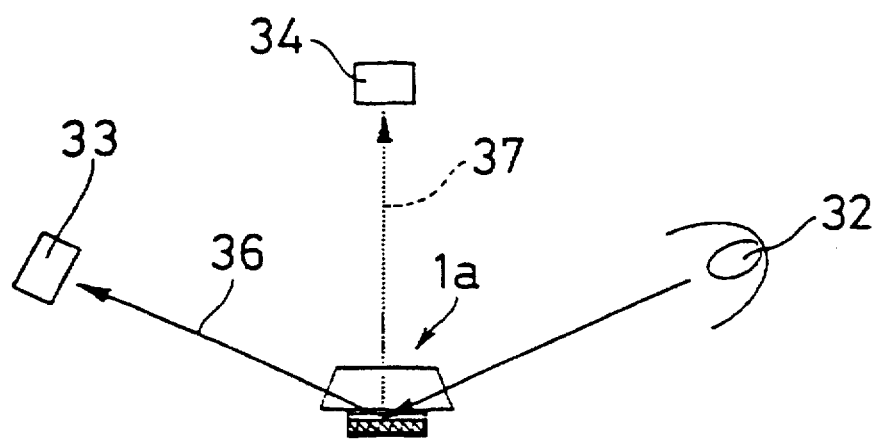
FIG. 16 is a view illustrating a method for detecting the intensity of outgoing light from a deflecting device 1a in accordance with a second embodiment of the invention.

FIG. 16 is a view illustrating a method for detecting the optical intensity of the outgoing light from the deflecting device 1a. Light 35 from the light source 32 is incident on the second surface 12b on the light incident side of the prism 12 of the deflecting device 1a at an incident angle θ1. The light (ON-state light) 36 reflected at the interface between the refractive index substance layers 5 and 7 goes out from the second surface 12b on the light outgoing side of the prism 12, and the optical intensity is detected by the detector 33 which is light receiving means. The light (OFF-state light) 37 reflected by the reflecting electrode 4 goes out from the third surface 12c on the light outgoing side of the prism 12, and the optical intensity is detected by the detector 34.

Figure 17:
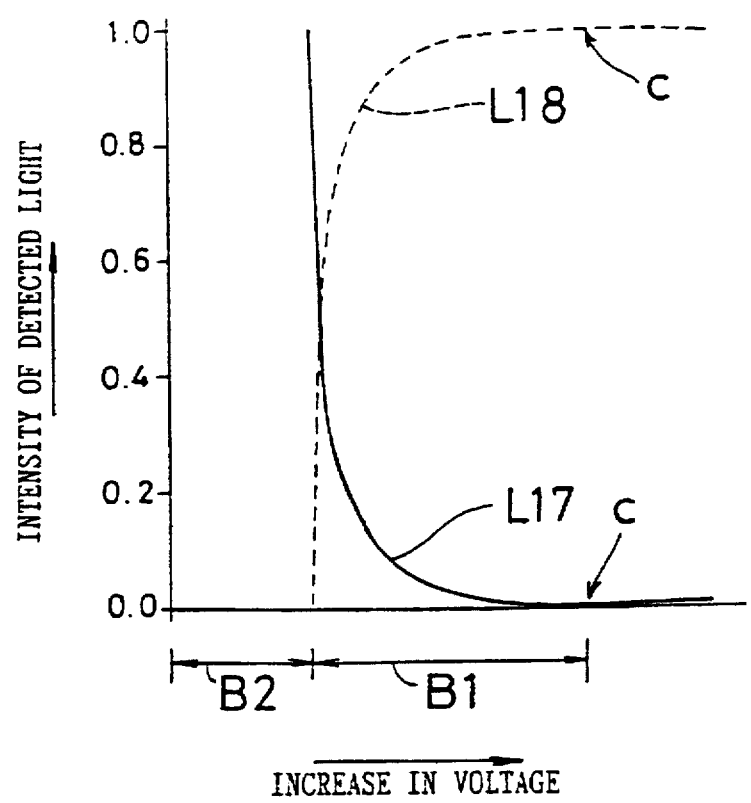

FIG. 17 is a graph showing the relationship between applied voltage and the intensities of the outgoing light 36 and 37 from the deflecting device 1a. As the applied voltage rises, the refractive index n1 of the variable refractive index substance layer 7 changes. Curve L17 represents the intensity of the ON-state light 36, and curve L18 represents the intensity of the OFF-state light 37. Displayable area B1 corresponds to the voltage application range represented by n2<n1 (nave)<n2/sin θc, wherein n1 is the refractive index of the variable refractive index substance layer 7 and n2 is the refractive index of the isotropic variable refractive index substance layer 5. At point c in the graph, the refractive index n1 is equal to n2. The area wherein the applied voltage is not more than the lowest voltage of the displayable area B1 is total reflection area B2 wherein only the ON-state light 36 can be obtained. In the embodiment, nave changes within a range of 1.55 to 1.65.

According to the second embodiment, the non-polarized incident light is split into light which is reflected by the interface between the refractive index substance layers 5 and 7 and goes out, and light which passes through the interface to be reflected by the reflecting electrode 4 thereby going out in a direction different from the direction of the above-mentioned outgoing light. This kind of deflecting device 1a can have a sufficient ON/OFF ratio as an optical switch.

In the embodiment, the isotropic refractive index substance layer 5 is disposed on the side of the tilting means 3 and the variable refractive index substance layer 7 is disposed on the side of the prism 12. The variable refractive index substance layer 7 is made of isotropic liquid crystal material. Therefore, the refractive index n2 of the isotropic refractive index substance layer 5, the refractive index n1 of the variable refractive index substance layer 7, the maximum refractive index n1max and the minimum refractive index n1min of the refractive index substance layer 7 satisfy the relationships represented by the formulae (8) to (10). The same refractive indices also satisfy the formulae (14) and (15).

Furthermore, the variable refractive index substance layer 7 can be disposed at a position where the isotropic refractive index substance layer 5 is disposed, and the isotropic refractive index substance layer can be disposed at a position where the variable refractive index substance layer 7 is disposed. In this case, however, the refractive indices n1, n2, n1max and n1min satisfy the formulae (11) to (13), (16) and (17).

Figure 18:
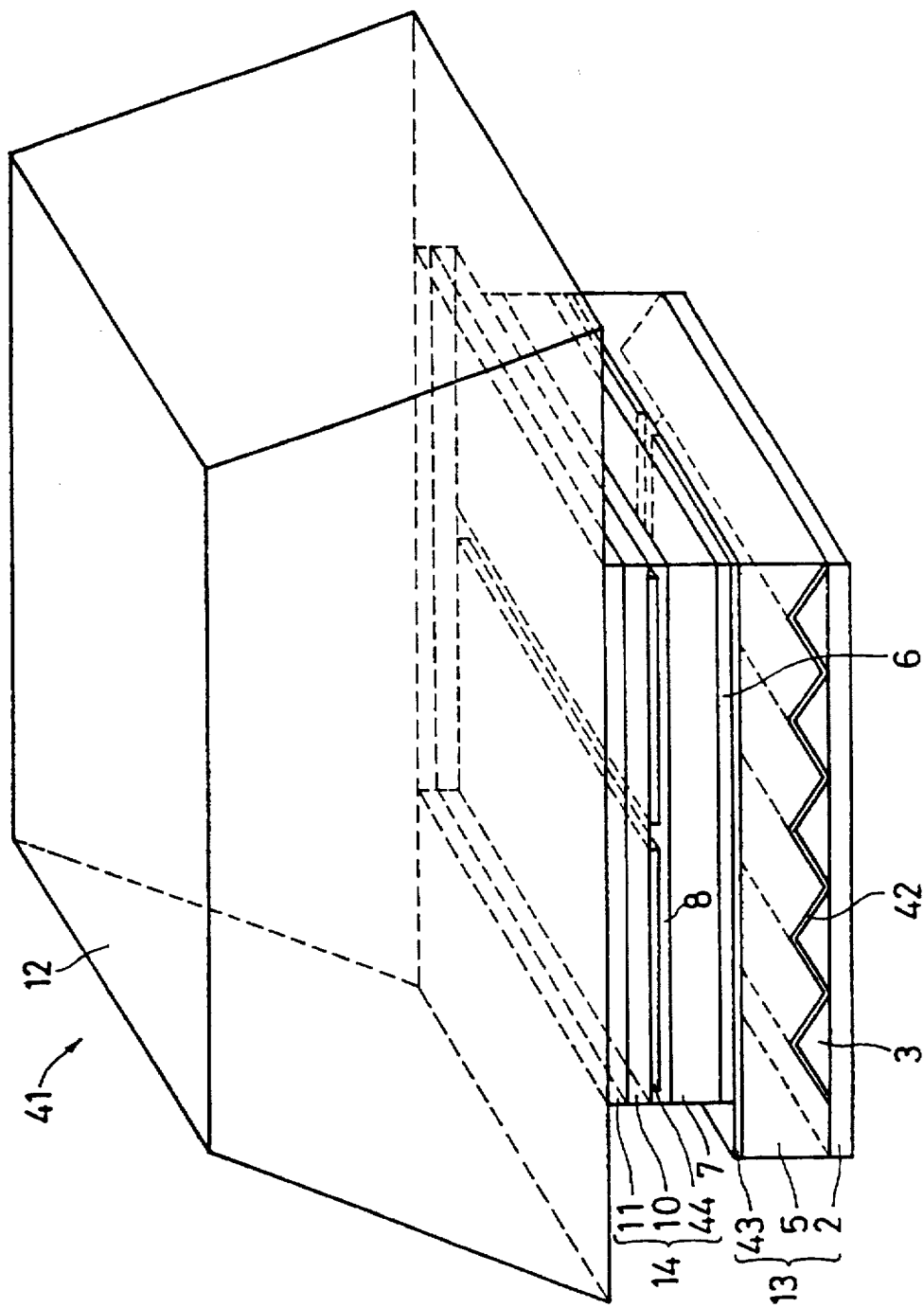
FIG. 18 is a perspective view showing a structure of a deflecting device 41 in accordance with a third embodiment of the invention.

FIG. 18 is a perspective view showing a structure of a deflecting device 41 in accordance with a third embodiment of the invention. The deflecting device 41 in accordance with the third embodiment is almost identical to the deflecting device 1 according to the first embodiment except that the reflecting electrode 4 and the transparent electrode 9 according to the first embodiment are replaced with a reflecting layer 42 and transparent electrodes 43 and 44. Accordingly, similar members are designated by the same reference codes, and only different members will be explained below. The deflecting device 41 has matrix-shaped electrode structure for applying a voltage to the variable refractive index substance layer 7. In the following explanation of the embodiment, a 2-by-2 matrix is taken as an example. The transparent electrodes 43 and 44 are a pair of energy transfer members.

Instead of the reflecting electrode 4 of the deflecting device 1, the light reflecting layer 42 is disposed so as to cover the surface of the tilting means 3. The light reflecting layer 42 does not function as an electrode but functions only to reflect the light which has passed through the interface between the refractive index substance layers 5 and 7.

The transparent electrodes 43 and 44 are made of the ITO which is used for forming the transparent electrode 9. The transparent electrode 43 is formed spaced apart in parallel to each other in a strap-like configuration on the isotropic refractive index substance layer 5. Furthermore, except for terminal portions, an orientation film 6 is formed. The transparent electrode 44 is formed spaced apart in parallel to each other on the light transmitting substance 10. In addition, for except terminal portions, an orientation film 8 is formed. The transparent electrodes 43 and 44 are made by cutting ITO film prepared by the sputtering method, for example, into the above-mentioned strap shape by the photolithography method.

The substrates 13 and 14 are disposed opposite to each other so that the orientation treatment directions of the orientation films 6 and 8 are either set in unparallel or in parallel to each other and the strap-shaped transparent electrodes 43 and 44 are set perpendicular to each other. Since the deflecting device 41 adopts the direct matrix drive method, a drive voltage ratio Von/Voff (duty ratio) is obtained by the following formula.

$$Von/Voff=(N^{0.5}+1/N^{0.5}-1)^{0.5} \qquad (18)$$

N represents a duty number (1/N: duty ratio) and is set usually to a value equal to the number of scanning lines.

The refractive index n1 of the variable refractive index substance layer 7 and the refractive index n2 of the isotropic refractive index substance layer 5 is preferably set in the range of n2<n1<n2/sin θc. Since n2=1.6 and θc=70° in the deflecting device 41, n1 must change in the range of 1.6 to 1.71. In order to change the abnormal refractive index ne of the liquid crystal constituting the variable refractive index substance layer 7 of the deflecting device 41 in the above-mentioned range, applied voltage in the range of 1 V (threshold voltage) to 2.4 V is required. In accordance with the formula (18), it is found that the number of scanning lines required to obtain the above-mentioned Von/Voff ratio is two. One to several hundreds of the tilting portions of the tilting means 3 can be formed so as to be used with a single strap electrode. The number of the tilting portions of the tilting means 3 is determined from the angle and height of the tilting portion.

As described above, in accordance with the third embodiment, a direct matrix drive can be achieved by using the deflecting device 41. A structure in which the deflecting device 1a according to the second embodiment is constituted just as the deflecting device 41 according to the third embodiment can also be included within the range of the present invention.

Figure 19:
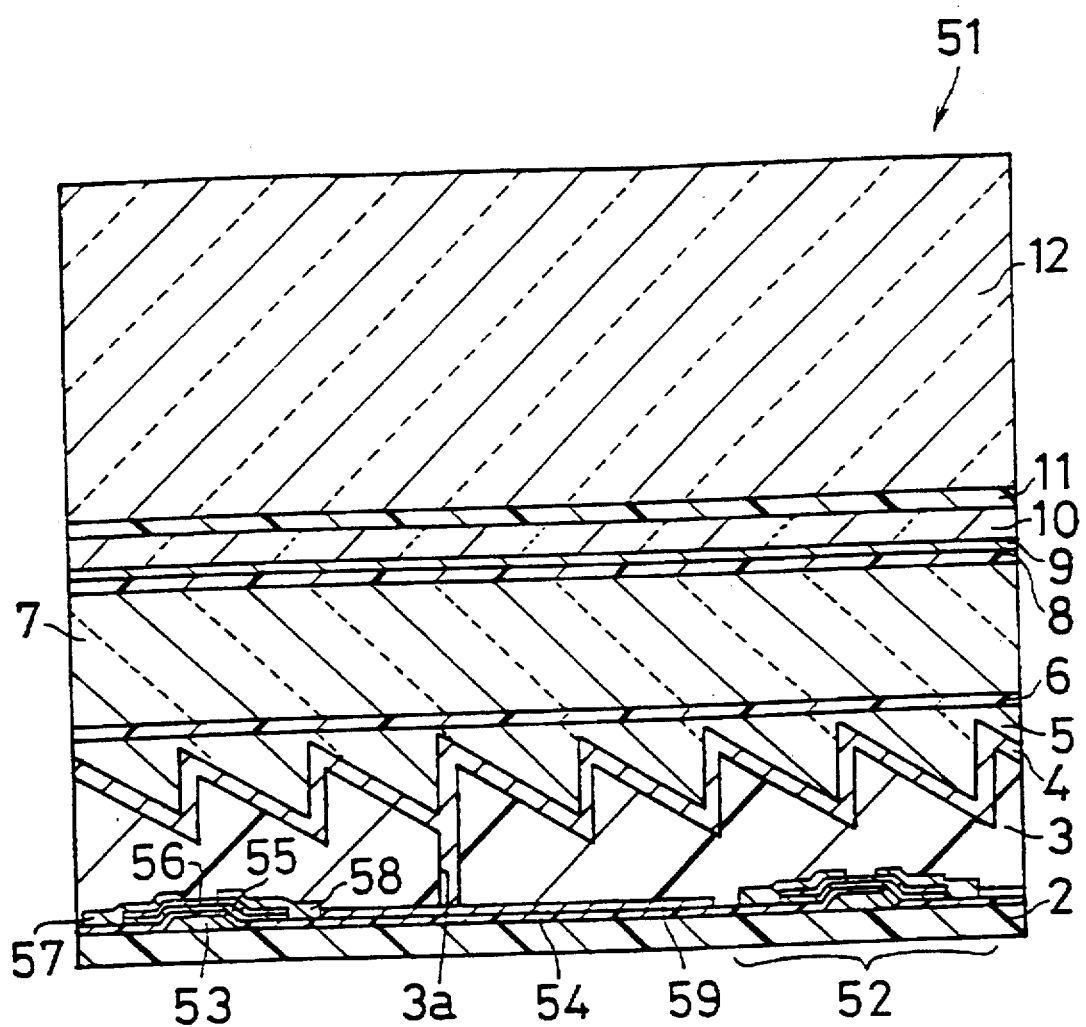
FIG. 19 is a sectional view showing a structure of a deflecting device 51 in accordance with a fourth embodiment of the invention.

FIG. 19 is a sectional view showing a structure of a deflecting device 51 according to a fourth embodiment of the invention. The deflecting device 51 is an active matrix drive device using TFT devices 52. The deflecting device 51 has almost the same structure as that of the deflecting device 1 except that the deflecting device 51 has the TFT devices 52.

In the direct matrix drive method, as the number of scanning lines increases, the Von/Voff ratio of the applied voltage decreases. Therefore, it is difficult to attain a high definition, and the voltage difference between gradations becomes very small at the time of gray-scale display. As a result, the display is seriously affected by electric noise. In the case of the deflecting device 51 of the embodiment, the problem can be solved by forming the TFT device 52 used as a switching device at a position corresponding to each pixel wherein the reflecting electrode and the transparent electrode 9 are disposed opposite to each other. Thus, the drive voltage ratio is not dominated by the formula (18). The method for preparing the TFT device 52 will be explained below.

Figure 20:
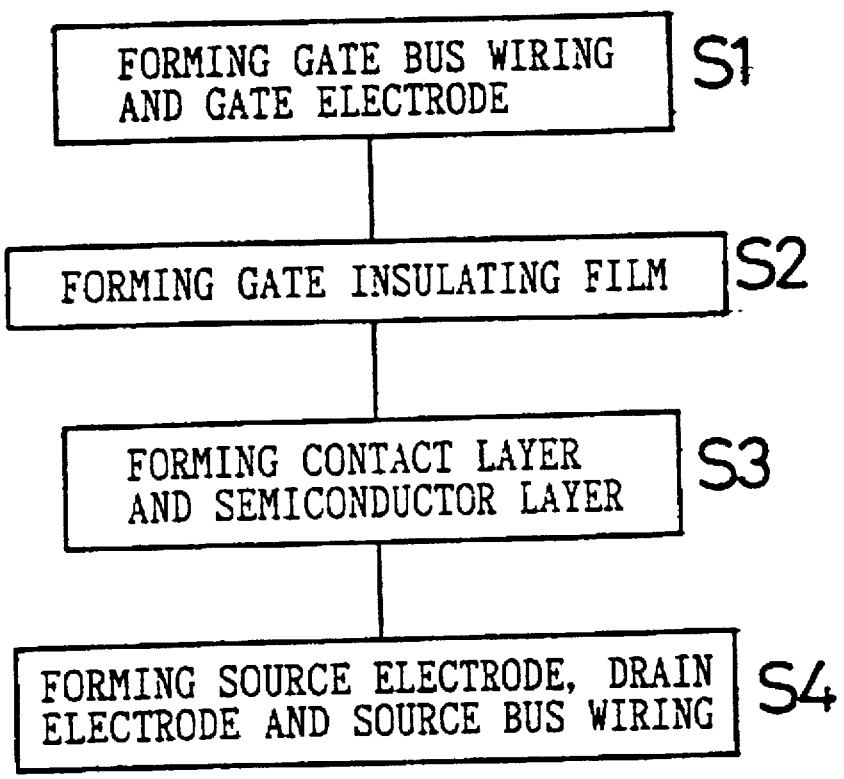
FIG. 20 is a step view showing a method for producing a TFT device 52.

FIG. 20 is a step view showing a method for producing the TFT device 52. At step S1, gate bus wires and gate electrode 53 are formed. The TFT device 52 is formed on the insulating substrate 2 on the reflection side. First, a Ta metal layer having a thickness of 300 nm is formed on the insulating substrate 2 by the sputtering method. The Ta metal layer is formed as a pattern by using the photolithography method or the etching method, thereby forming the gate bus wires and the gate electrode 53.

At step S2, a gate insulating film 54 is formed. The gate insulating film 54 is produced by forming SiNx having a thickness of 400 nm on the insulating substrate 2 so as to cover the gate bus wires and the gate electrode 53 by the plasma CVD (Chemical Vapor Deposition) method, for example.

At step S3, a contact layer 56 and a semiconductor layer 55 are formed. In the beginning, an a-Si layer having a thickness of 100 nm and used for the semiconductor layer 55 and an n⁺ a-Si layer having a thickness of 40 nm and used for the contact layer 56 are formed on the gate insulating film 54 in this sequence continuously. The two layers are then formed as patterns simultaneously, whereby the contact layer 56 and the semiconductor layer 55 are formed.

At step S4, a source electrode 57, a drain electrode 58 and source bus wires are formed. First, a Mo metal layer having a thickness of 200 nm is formed by the sputtering method on a substrate on which the contact layer 56 and the semiconductor 55 having been formed. The Mo metal layer is then formed as a pattern so as to form the source electrode 57, the drain electrode 58 and the source bus wires. A conductor layer 59 is connected to the drain electrode 58. In this way, the TFT device 52 is completed.

On the substrate on which the TFT device 52 has been formed, the tilting means 3 made of an insulating material is formed in the same method as that for the first embodiment. The tilting means 3 has a contact hole 3a formed by the photolithography method in the conductor layer 59 extending from the drain electrode 58 of the TFT device 52.

Furthermore, the reflecting electrode 4 is formed so as to cover the tilting means 3. The reflecting electrode 4 is obtained by forming aluminum by the sputtering method.

As described above, in accordance with the fourth embodiment, the active matrix drive can be achieved by the deflecting device 51. The structure in which the deflecting device 1a according to the second embodiment is used as the deflecting device 51 according to the fourth embodiment can also be included in the range of the invention. In addition, since the deflecting device 51 is of a reflection type, a miniaturization and a high definition can be attained by using a silicon substrate as the insulating substrate 2 on which the TFT device 52 is formed. Furthermore, although an example using the TFT device 52 as a switching device is explained in this embodiment, it is possible to use an MIM (Metal-Insulator-Metal) device, a varistor or the like having the nonlinear characteristic of a two-terminal device.

Figure 21:
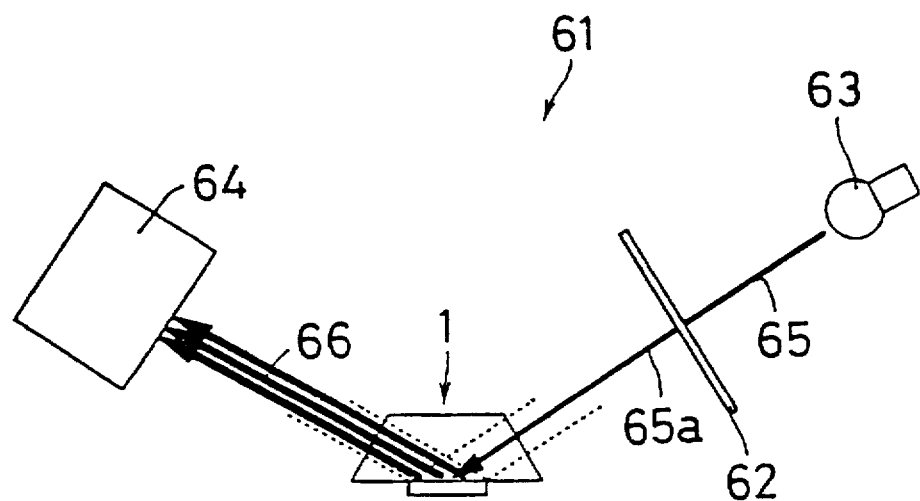
FIG. 21 is a view showing a structure of a projection-type display unit 61 in accordance with a fifth embodiment of the invention.

FIG. 21 is a view showing the structure of a projection-type display unit 61 in accordance with a fifth embodiment of the invention. The projection-type display unit 61 comprises the deflecting device 1, a polarizing plate 62, a light source 63 and a projection lens 64.

Light 65 coming from the light source 63 is allowed to be incident on the second surface 12b on the light incident side of the prism 12 of the deflecting device 1 at incident angle θ1 as polarized light 65a via a deflecting device 62. Light 66 (ON-state light) reflected by the interface between the refractive index substance layers 5 and 7 goes out from the second surface 12b on the light outgoing side of the prism 12, and is projected via the projection lens 64. In this case, the light (OFF-state light) reflected by the reflecting electrode 4 is not used for the display.

As described above, in accordance with the fifth embodiment, the projection-type display unit 61 can be implemented by using the deflecting device 1 as a light valve. Instead of the ON-state light 66, the OFF-state light can also be used for the display. The projection-type display unit 61 implemented by using the deflecting device 1 structured as in the case of the third or the fourth embodiment can also be included in the range of the invention.

Figure 22:
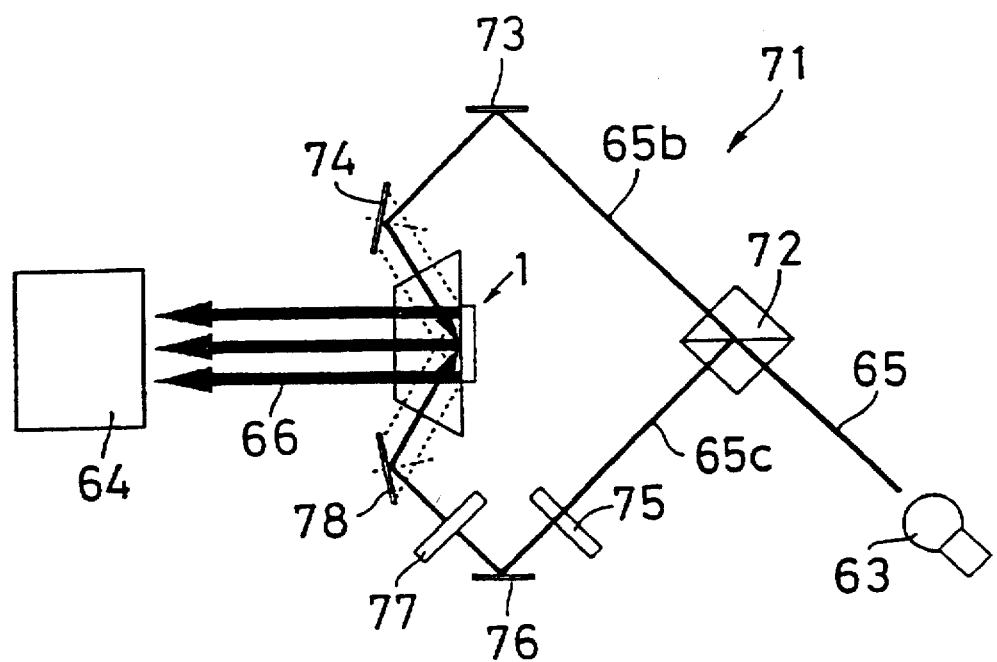
FIG. 22 is a view showing the structure of a projection-type display unit 71 in accordance with a sixth embodiment in accordance with the invention.

FIG. 22 is a view showing a structure of a projection-type display unit 71 according to a sixth embodiment of the invention. The projection-type display unit 71 comprises the deflecting device 1, a polarized light beam splitter 72, reflecting plates 73, 74, 76 and 78, phase difference plates 75 and 77, the light source 63, and the projection lens 64. Light 65 coming from the light source 63 is split into P-polarized light 65b and S-polarized light 65c by the polarized light beam splitter 72. The P-polarized light 65b is reflected by the reflecting plates 73 and 74 and is allowed to be incident on the second surface 12b on one of the light incident sides of the prism 12 at incident angle θ1. S-polarized light 65c passes through the phase difference plate 75 to be reflected by the reflection plate 76 thereby passing through the phase difference plate 77. As a result, the light becomes P-polarized light and is allowed to be incident on the second surface 12b on the other light incident side of the prism 12 at incident angle θ1. Light (OFF-state light) 66 reflected by the reflecting electrode 4 goes out from the third surface 12c on the light outgoing side of the prism 12 and is projected via the projection lens 64 which is light receiving means. In this case, the light (OFF-state light) reflected by the refractive index substance layers 5 and 7 is not used for the display.

As described above, in accordance with the sixth embodiment, the projection-type display unit 71 can be structured by using the deflecting device 1. The light utilization factor of the projection-type display unit 61 is 50% in principle due to use of the polarizing plate 62. In the case of the projection-type display unit 71, non-polarized light is split once into P-polarized light and S-polarized light by the polarized light beam splitter 72, and the S-polarized light is reconverted into P-polarized light, thereby allowing P-polarized light to be incident on the deflecting device 1. For this reason, the projection-type display unit 71 can use 100% of light in principle. It is thus possible to attain the projection-type display unit 71 having a very high utilization factor of the light which comes from the light source and also having a high contrast ratio in the outgoing light.

Instead of the OFF-state light 66, the ON-state light can be used for display. The projection-type display unit 71 implemented by using the deflecting device 1 structured as in the case of the third or the fourth embodiment can also be included in the range of the invention.

Figure 23:
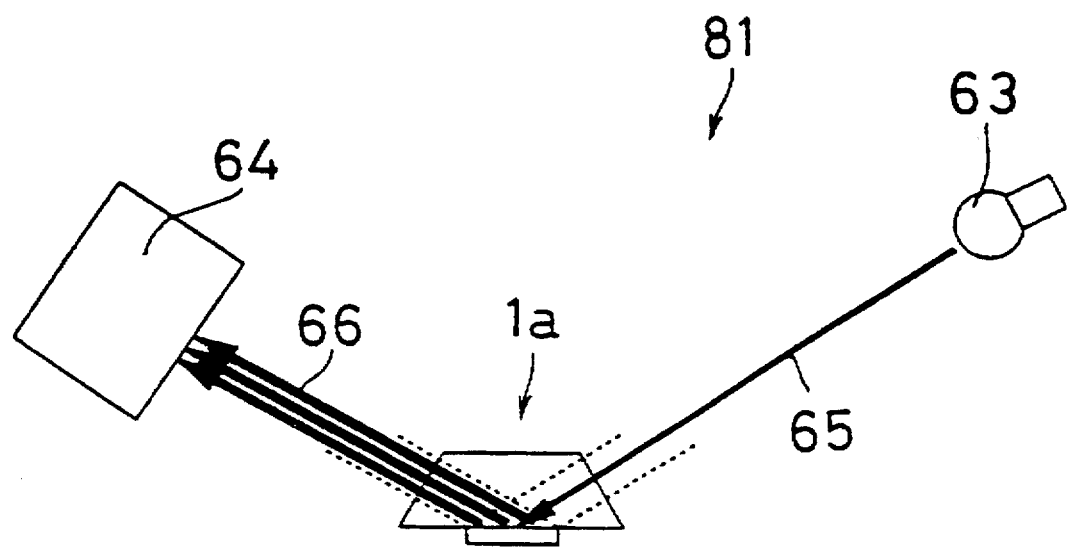
FIG. 23 is a view showing a structure of a projection-type display unit 81 of a seventh embodiment of the invention.

FIG. 23 is a view showing a structure of a projection-type display unit 81 according to a seventh embodiment of the invention. The projection-type display unit 81 comprises the deflecting device 1a, the light source 63 and the projection lens 64. Light 65 coming from the light source 68 is allowed to be incident on the second surface 12b on the light incident side of the prism 12 of the deflecting device 1a at incident angle θ1. Light 66 (ON-state light) reflected by the interface between the refractive index substance layers 5 and 7 goes out from the second surface 12b on the light outgoing side of the prism 12 to be projected via the projection lens 64 which is light receiving means. In this case, the light (OFF-state light) reflected by the reflecting electrode 4 is not used for the display.

As described above, in accordance with the seventh embodiment, the projection-type display unit 81 can be implemented by using the deflecting device 1a which uses non-polarized light as incident light. Instead of the ON-state light 66, the OFF-state light can be used for the display. Furthermore, the projection-type display unit 81 implemented by using the deflecting device 1a structured as in the case of the third or the fourth embodiment can also be included in the range of the invention.

Figure 24:
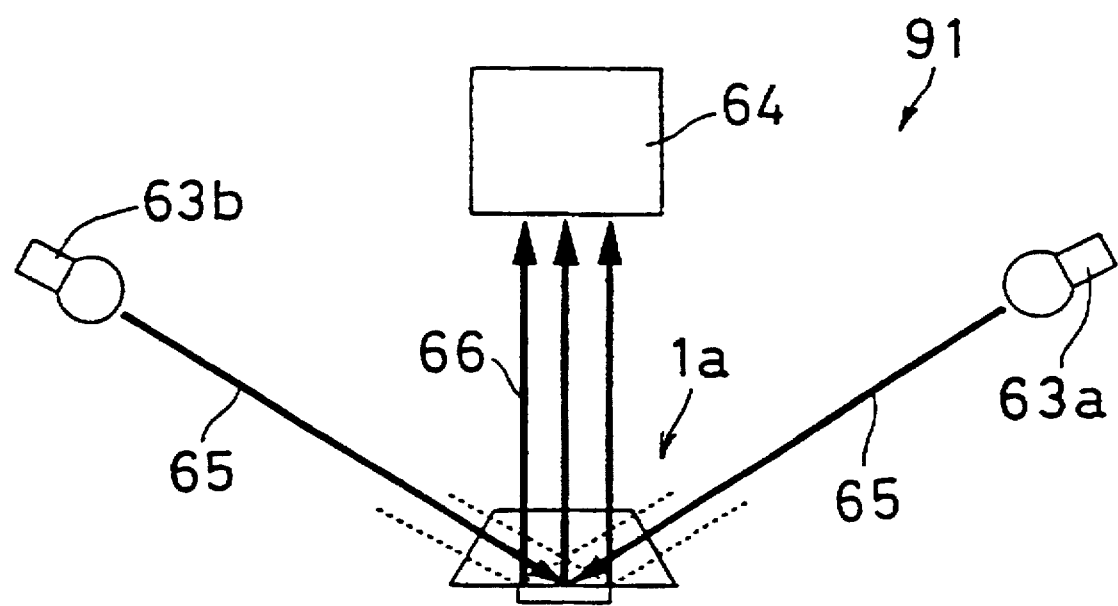
FIG. 24 is a view showing a structure of a projection-type display unit 91 in accordance with an eighth embodiment of the invention.

FIG. 24 is a view showing a structure of a projection-type display unit 91 according to an eighth embodiment of the invention. The projection-type display unit 91 comprises the deflecting device 1a, light sources 63a and 63b and a projection lens 64. Beams of light 65 from the light sources 63a and 63b is allowed to be incident on the second surfaces 12b on the two light incident sides of the prism 12 at incident angle θ1. Beams of light 66 (OFF-state light) reflected by the reflecting electrode 4 go out from the third surface 12c on the light outgoing side of the prism 12, and are projected via the projection lens 64 which is light receiving means. In this case, the light (ON-state light) reflected by the interface between the refractive index substance layers 5 and 7 is not used for the display.

As described above, in accordance with the eighth embodiment, the projection-type display unit 91 can be implemented by using the deflecting device 1a which uses non-polarized light as incident light and the two light sources 63a and 68b. Instead of the ON-state light 66, the OFF-state light can be used for the display. The projection-type display unit 91 implemented by using the deflecting device 1a structured as in the case of the third or the fourth embodiment can also be included in the range of the invention.

Figure 25A:
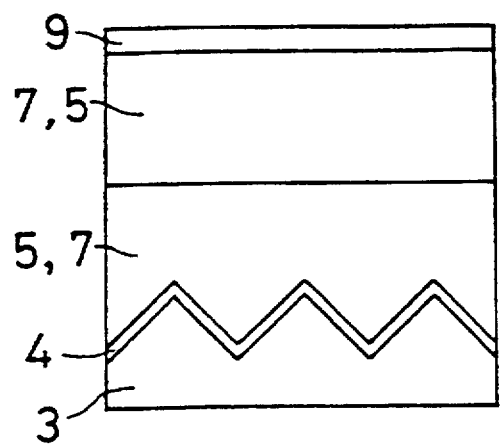
FIGS. 25A to 25D are views showing broadly classified deflecting devices in accordance with the invention.
Figure 25B:
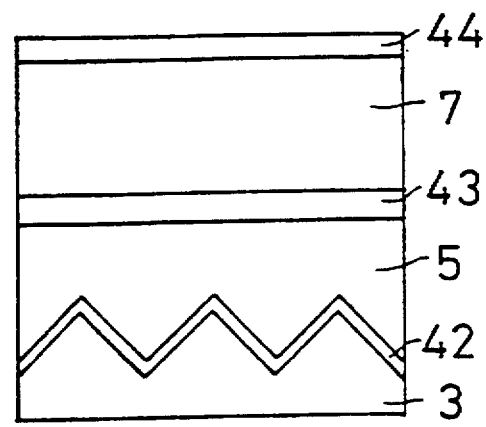
Figure 25C:
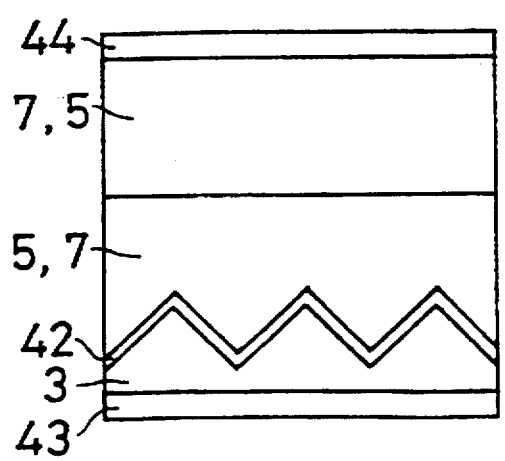
Figure 25D:
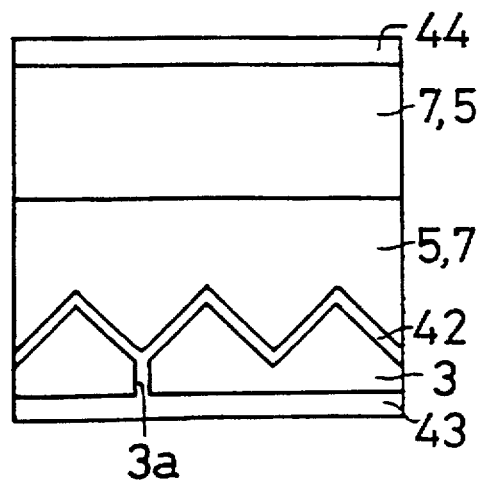

FIGS. 25A through 25D are views showing broadly classified deflecting devices in accordance with the invention. As described in the explanation of the first embodiment shown in FIG. 25A, a pair of energy transfer means can be composed of the reflecting electrode 4 and the transparent electrode 9. In this case, since the light reflecting layer 4 can also function as an energy transfer means, the structure of the deflecting device can be simplified. In addition, as described in the explanation of the third embodiment shown in FIG. 25B, it is possible to dispose the pair of energy transfer means with only the variable refractive index substance layer 7 sandwiched therebetween. In this case, since the energy transfer means directly comes into contact with the variable refractive index substance layer 7, no capacitance division does not occur, whereby the deflecting device can be driven at a low voltage. Furthermore, as shown in FIG. 25C, the transparent electrode 43 can be disposed as one of the energy transfer means on the tilting means 3 on the opposite side of the refractive index substance layers 5 and 7. Moreover, in this case, as shown in FIG. 25D, the light reflecting layer 42 can be connected electrically to the transparent electrode 43 via the contact hole 3a of the tilting means 3. This kind of connection is carried out when an active matrix drive system having such a switching device explained in the explanation of the fourth embodiment is used.

Figure 26:
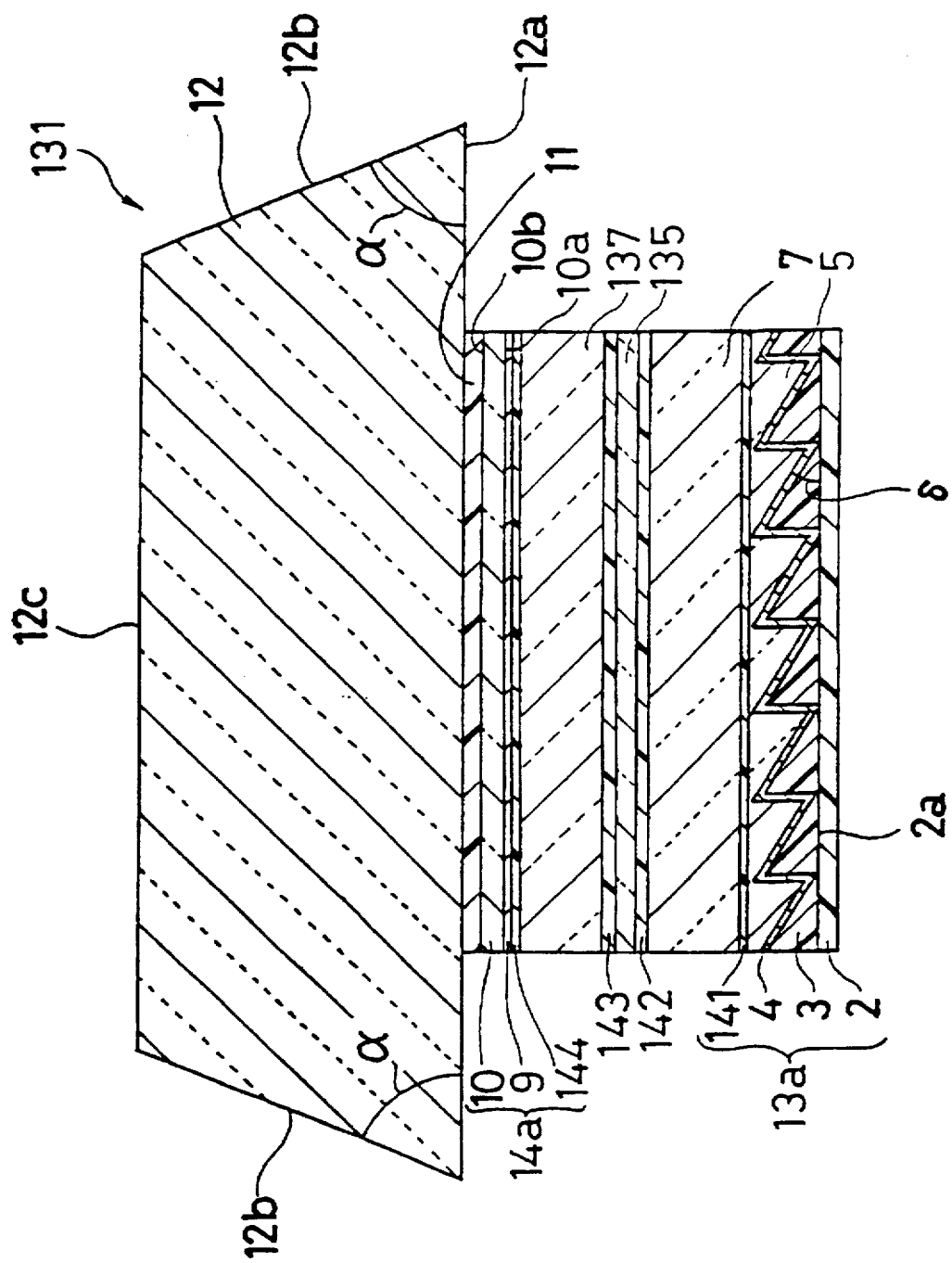
FIG. 26 is a sectional view showing a structure of a deflecting device 131 in accordance with a ninth embodiment of the invention.

FIG. 26 is a sectional view showing a structure of a deflecting device 131 according to a ninth embodiment of the invention. The deflecting device 131 according to the ninth embodiment has a structure similar to that of the deflecting device 1 according to the first embodiment. The same components are designated by the same reference numerals, and are not explained here.

In the deflecting device 131 according to the ninth embodiment, a plurality (two in the embodiment) of isotropic refractive index substance layers 5 and 135 and a plurality (two in the embodiment) of variable refractive index substance layers 7 and 137 are interposed between the reflecting electrode 4 and the transmission substrate 10. In the embodiment, an equal number of the isotropic refractive index substance layers and the variable refractive index substance layers are disposed alternatively. The variable refractive index substance layers 7 and 137 are made of a liquid crystal of the same material, for example. Orientation films 141 and 142; 143 and 144 are formed with the variable refractive index substance layers 7 and 137 interposed therebetween.

The orientation directions of the orientation films 141 and 142 are set in parallel with and opposite to each other. The orientation directions of the orientation films 143 and 144 are also set in parallel with and opposite to each other. Furthermore, the orientation directions of the orientation films 141 and 143 are set perpendicular to the major-axis directions of the liquid crystal molecules of the refractive index substance layers 7 and 137 regulated by the orientation films. The polarization axis directions parallel with the major axis directions of the liquid crystal molecules constituting the variable refractive index substance layers 7 and 137 are set perpendicular to each other. When a plurality of variable refractive index substance layers are disposed, the polarization axes of at least two variable refractive index substance layers are set perpendicular to each other.

In the embodiment, an equal number of the isotropic refractive index substance layers and the variable refractive index substance layers are disposed alternatively. However, the isotropic refractive index substance layers and the variable refractive index substance layers are not limited to be equal in number or disposed alternatively. It is possible to overlap isotropic refractive index substance layers having different refractive indices, for example, thereby making the number of the isotropic refractive index substance layers different from the number of the variable refractive index substance layers and thereby not disposing them alternatively. By disposing the isotropic refractive index substance layers having different refractive indices in this way, the refractive indices can be adjusted more precisely. In addition, by disposing an isotropic refractive index substance layer between two variable refractive index substance layers and by selectively determining the material of the isotropic refractive index substance layer just as in the case of the embodiment, the adhesion of the two variable refractive index substance layers can be improved.

The behavior of light at the deflecting device 131 according to the ninth embodiment is explained below in comparison with the behavior of light at the deflecting device 1 according to the first embodiment.

Figure 27A:
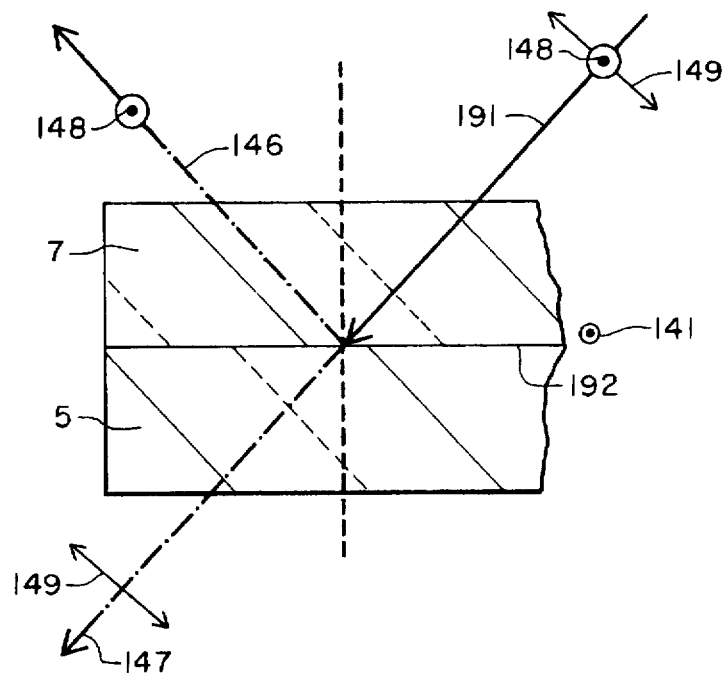
FIGS. 27A and 27B are schematic views illustrating a behaviors of light at the deflecting device 1 in accordance with the first embodiment.
Figure 27B:
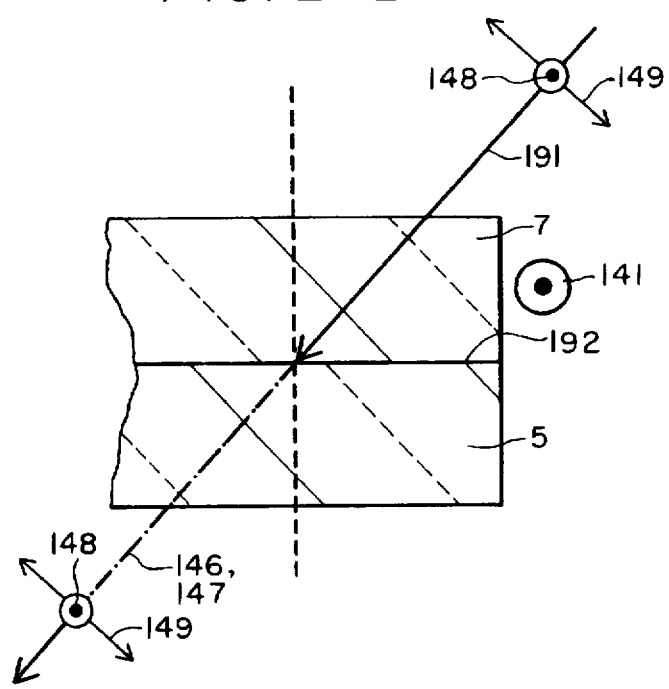

FIGS. 27A and 27B are schematic views illustrating the behaviors of light at the deflecting device 1. The refractive index n1 of the variable refractive index substance layer 7 of the deflecting device 1 changes depending on the voltage applied across the reflecting electrode 4 and the transparent electrode 9. For example, the refractive index n1 decreases as the application voltage increases for example. When a voltage less than a predetermined voltage is applied, a total reflection occurs at an interface 192 between the refractive index substance layers 5 and 7. Since liquid crystal molecules have an anisotropy in refractive index, they can be used for the variable refractive index substance layer 7 of the deflecting device. However, the effect of the change in the refractive index of the refractive index substance layer 7 is exerted on only the polarized light vibrating in parallel with the major axis direction of the liquid crystal molecules. It is thought that non-polarized light and natural light including a plurality of light beams polarized in the direction different from the variable refractive index substance layer having a single polarization axis are split into two components: parallel and perpendicular components. The parallel component corresponds to the light vibrating in the major axis direction of liquid crystal molecules, that is, the direction in parallel with the polarization axis of the refractive index substance layer 7. The perpendicular component corresponds to the light vibrating in the direction perpendicular to the polarization axis of the refractive index substance layer 7. In FIGS. 27A and 27B, the polarization axis of the refractive index substance layer 7 is set in parallel with the direction perpendicular to the paper surface, and is represented by reference numeral 141.

It is supposed that incident light 191, which is natural light or non-polarized light, is allowed to be incident on the deflecting device 1 as described below. When a voltage less than a predetermined voltage is applied across the electrodes 4 and 9, only the parallel component 146 of the incident light 191 is reflected by the interface 192 and the perpendicular component 147 passes through as shown in FIG. 27A. Reference numerals 148 and 149 represent the polarization directions of the parallel component 146 and the perpendicular component 147 of the incident light 191, respectively. When a voltage more than the predetermined voltage is applied across the electrodes 4 and 9, both the parallel and perpendicular components 146 and 147 of the incident light 191 pass through the interface 192 as shown in FIG. 27B. As a result, the deflecting device 1 according to the first embodiment cannot control the perpendicular component 147 of the incident light 191.

Figure 28A:
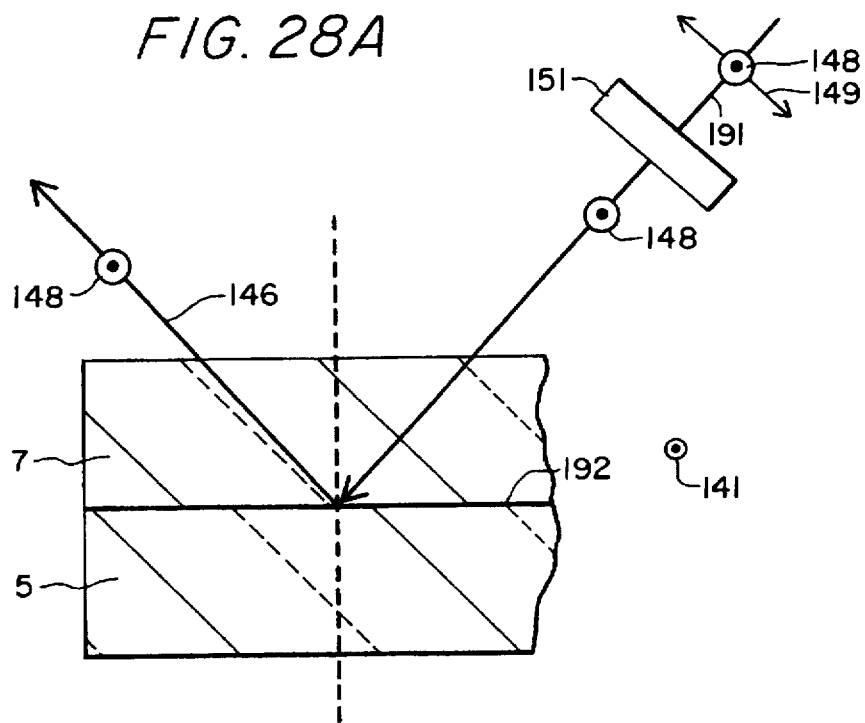
FIGS. 28A and 28B are schematic views illustrating conditions wherein the deflecting device 1 in accordance with the first embodiment is used.
Figure 28B:
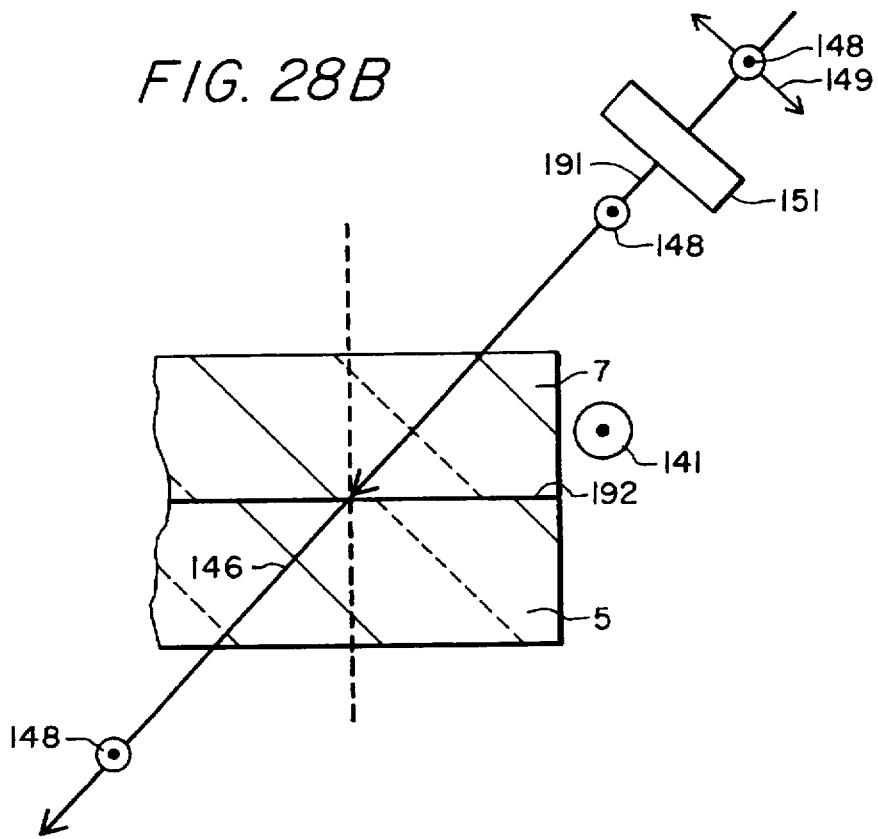

Accordingly, when the deflecting device i is used, the incident light 191 is allowed to pass through a polarizing plate 151 whose polarization axis is parallel with that of the horizontal component 146 as shown in FIGS. 28A and 28B before the incident light 191 is allowed to be incident on the deflecting device 1. Therefore, when a voltage less than the predetermined voltage is applied across the electrodes 4 and 9, the incident light is totally reflected by the interface 192 as shown in FIG. 28A. When a voltage more than the predetermined voltage is applied across the electrodes 4 and 9, the incident light totally passes through the interface 192 as shown in FIG. 28B.

Figure 29:
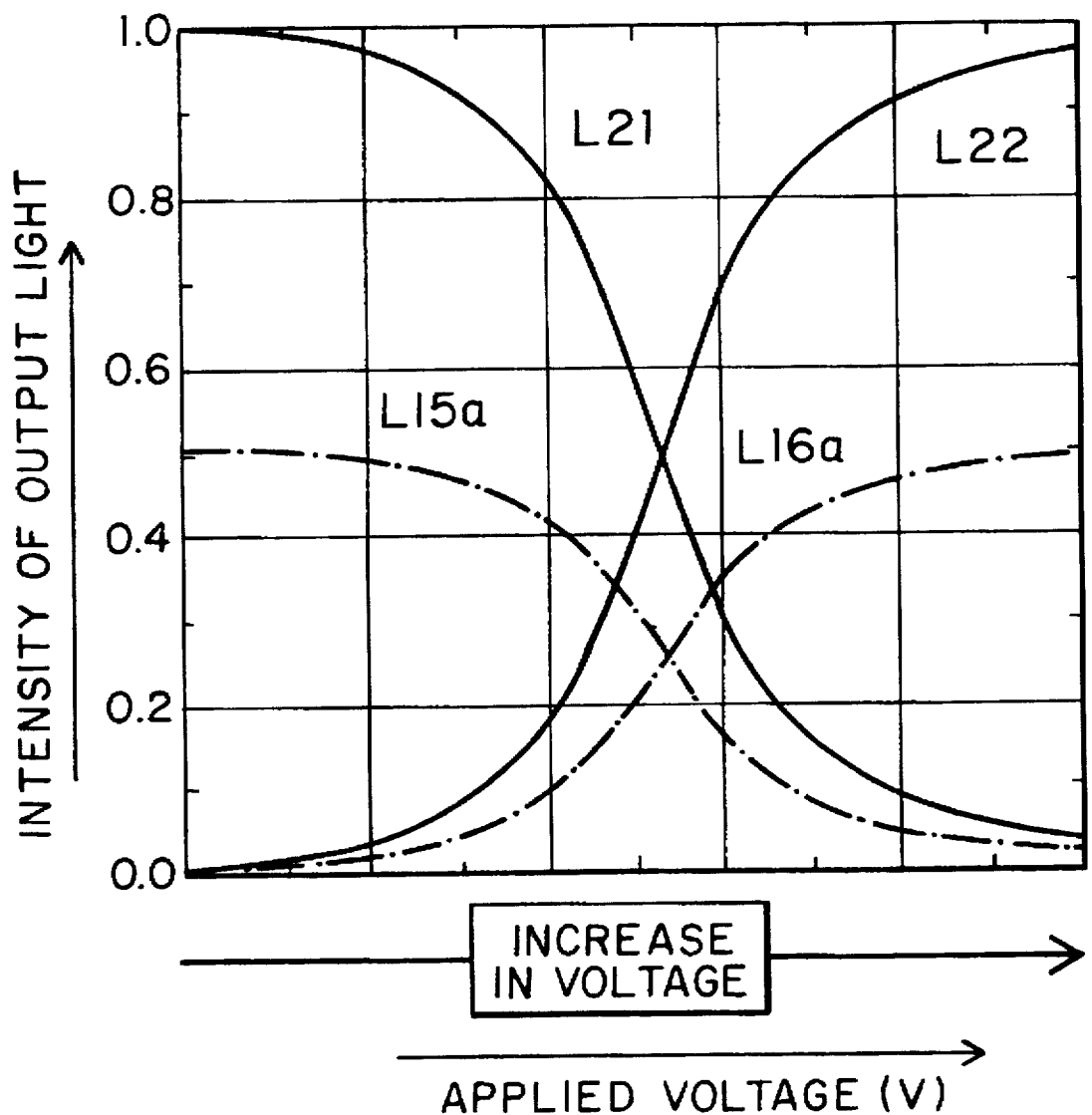
FIG. 29 is a graph showing a relationship between applied voltage across electrodes 4 and 9 and intensities of ON-state light and OFF-state light going out from the deflecting devices 1 and 131.

FIG. 29 is a graph showing the relationship between the applied voltage across the electrodes 4 and 9 and the light intensities of the ON-state light and the OFF-state light going out from the deflecting devices 1. The light intensities of the ON-state light and the OFF-state light are measured by the detection method shown in FIG. 14. Curve L15a represents the optical intensity of the ON-state light. Curve L16a represents the optical intensity of the OFF-state light. The deflecting device 1 controls only the parallel component of the light delivered from the light source 32. Therefore, when the optical intensity of the light of the light source is 1, the maximum optical intensity of the ON-state light is 0.5. In other words, the utilization factor of the light of the light source is halved (½) in the case of the deflecting device 1 according to the first embodiment.

Figure 30A:
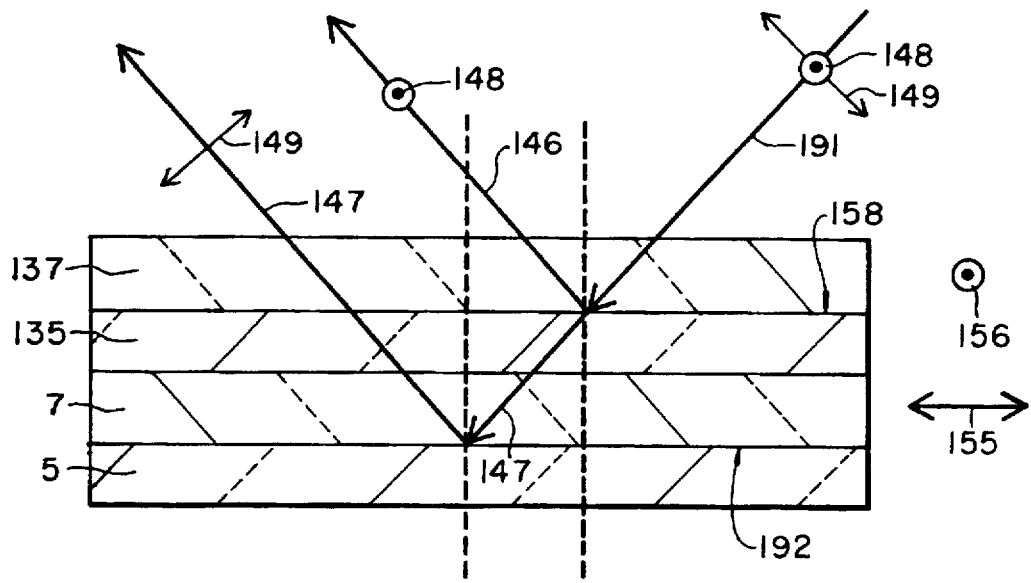
FIGS. 30A and 30B are schematic views illustrating behaviors of light at the deflecting device 131 in accordance with the ninth embodiment.
Figure 30B:
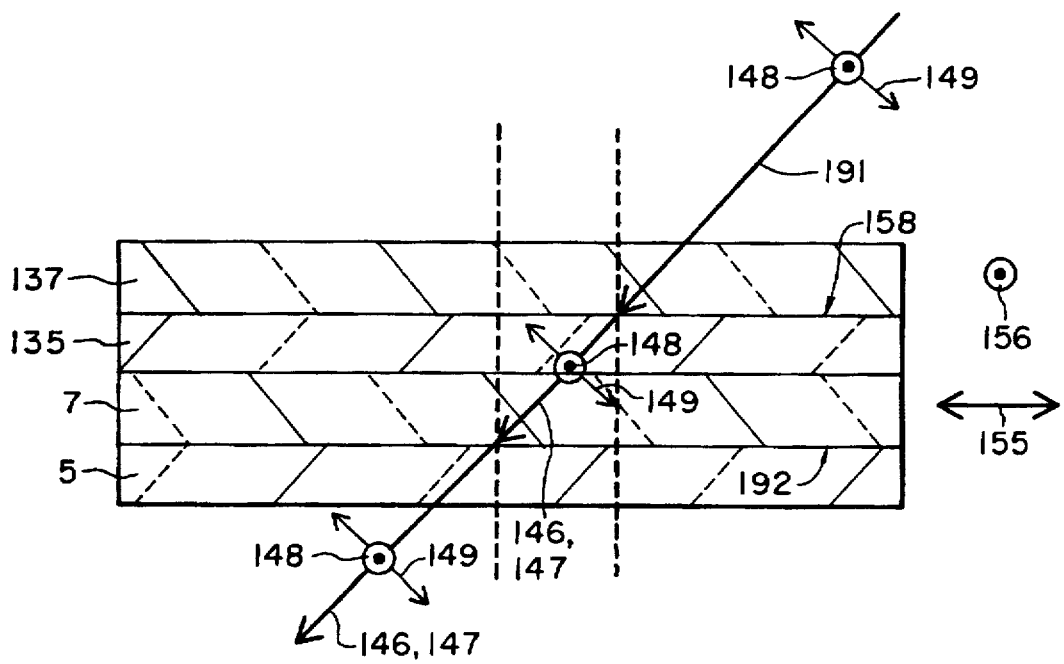

FIGS. 30A and 30B are schematic views illustrating the behaviors of light at the deflecting device 131. The variable refractive index substance layers 7 and 137 of the deflecting device 131 are made of the same liquid crystal material as that used for the deflecting device 1 of the first embodiment. Therefore, the refractive indices n1a, n1b of the layers 7 and 137 are supposed to decrease as the voltage applied across the reflecting electrode 4 and the transparent electrode 9 increases. When a voltage less than the predetermined voltage is applied across the electrodes 4 and 9, total reflection occurs at the interface 192 between the refractive index substance layers 5 and 7 and the interface 158 between the refractive index substance layers 135 and 137. The polarization axes of the refractive index substance layers 7 and 137 are perpendicular to each other, and their directions are designated by reference numerals 155 and 156.

Suppose that the incident light 191 is allowed to be incident on the deflecting device 131 as described below. When a voltage less than the predetermined voltage is applied across the electrodes 4 and 9, the parallel component 146 of the incident light 191 is reflected by the interface 158 of the refractive index substance layers 135 and 137 as shown in FIG. 30A. The perpendicular component 147 passes through the interface 158 and is reflected by the interface 192 of the refractive index substance layers 5 and 7. When a voltage more than the predetermined voltage is applied across the electrodes 4 and 9, both the parallel and perpendicular components 146 and 147 of the incident light 191 pass through the interfaces 158 and 192 as shown in FIG. 30B. As a result, the deflecting device 131 of the embodiment can control both the parallel component 146 and the perpendicular component 147 of the incident light 191.

The optical characteristic of the deflecting device 131 was measured by using the detection method shown in FIG. 16. The results of the measurement are also shown in the graph of FIG. 29. Curve L21 represents the optical intensity of the ON-state light. Curve L22 represents the optical intensity of the OFF-state light. The deflecting device 131 controls the entire light delivered from the light source 32. Therefore, the maximum optical intensity of the ONstate light is equal to the optical intensity of the light of he light source, namely 1.0. In this manner, the utilization factor of the light coming from the light source of the deflecting device 131 of the embodiment is higher than that of the deflecting device 1 according to the first embodiment.

As described above, the incident light 191 is split into two components: parallel component 146 and perpendicular component 147, depending on the direction of the polarization axis of the variable refractive index substance layer 137 on which the light 191 is allowed to be incident first. It is thus preferable that, among the polarization axes of a plurality of variable refractive index substance layers overlapped between the substrates 2 and 10, the axes of at least two refractive index substance layers are set perpendicular to each other. By this setting of the polarization axes, the utilization factor of the incident light can be raised to nearly 100%.

Figure 31A:
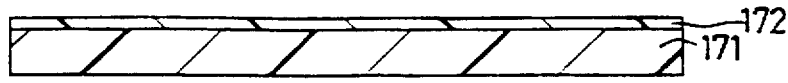
FIGS. 31A to 31E are sectional views showing a method for producing the deflecting device 131 in accordance with the ninth embodiment step by step.

FIGS. 31A through 3ZE and FIGS. 32A through 32D are sectional views showing the method for producing the deflecting device 131 in accordance with the ninth embodiment step by step. The deflecting device 131 can be produced in accordance with steps similar to that for the deflecting device 1.

Figure 31B:
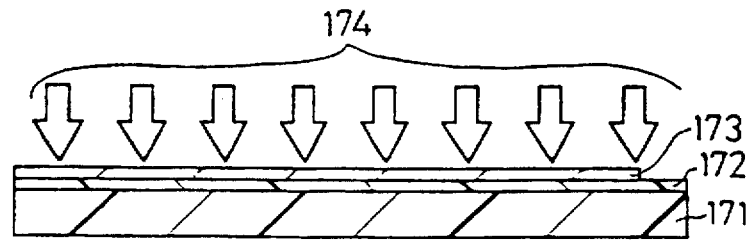

In the beginning, the method for producing another substrate member 14a and the first substrate member including the variable refractive index substance layer 137 of the deflecting device 131 is described below. As shown in FIG. 31A, a release member is first applied to one surface of the opposite substrate 171 to form a release member film 172. A ground substrate having a thickness of, for example, 2.0 mm is used as the opposite substrate 171. For example, a fluorine-based material marketed under the trade name of SITOP manufactured by Asahi Glass Co., Ltd. is used as the release member. Next, as shown in FIG. 31B, a polymer material is applied to the release material film 172 to form a thin film 173 having a uniform thickness. A mixture material of photo-polymers formed by mixing trimethylolpropant acrylate and isobonyl acrylate at a weight ratio of 2:17 is used as the polymer material. Ultraviolet light 174 is applied to the thin film 173 of the polymer material. Consequently, the isotropic refractive index substance layer 135 can be formed as a polymer material layer.

Figure 31C:
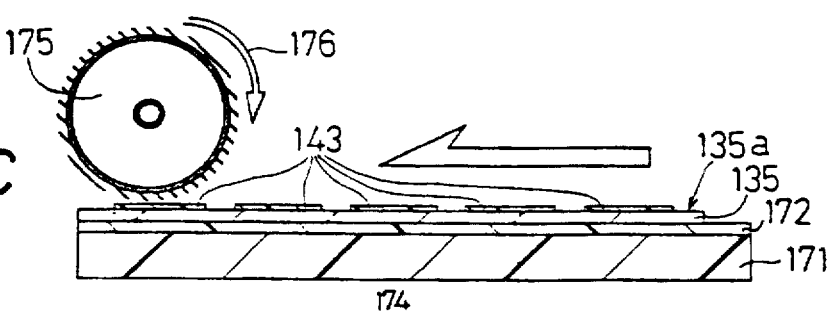

The transparent electrode 9 is formed on the surface 10a of the transmission substrate 10. An orientation film 144 is formed on the surface 9a of the transparent electrode 9, and an orientation film 143 is formed on the surface 135a of the isotropic refractive index substance layer 135. This state is shown in FIG. 31C. These orientation films 144 and 143 are formed as follows. First, a thin film having a thickness of about 1000 Å is formed on each of the above-mentioned surfaces by the offset printing method, and the film is sintered at 180° C. for one hour, and then subjected to an orientation treatment by the rubbing method. The orientation treatment is performed by rotating a roller 175 in the direction designated by arrow 176 while coming into contact with the thin film. A thin film marketed under the trade name of RN-1024 and made by Nissan Chemical Co., Ltd. is used as the thin film material.

Next, the transmission substrate 10 and the isotropic refractive index substance layer 135, on which the orientation films 144 and 143 are formed respectively, are overlapped so as to face each other with a plastic spacer interposed therebetween. The grain diameter of the spacer material is, for example, 5 µm. In this condition, the transmission substrate 10 and the isotropic refractive index substance layer 135 are attached by adhesion via an adhesion layer 177 therebetween, whereby a cell having an almost uniform space equal to the grain diameter of the spacer material is formed between the orientation films 144 and 143.

Figure 31D:
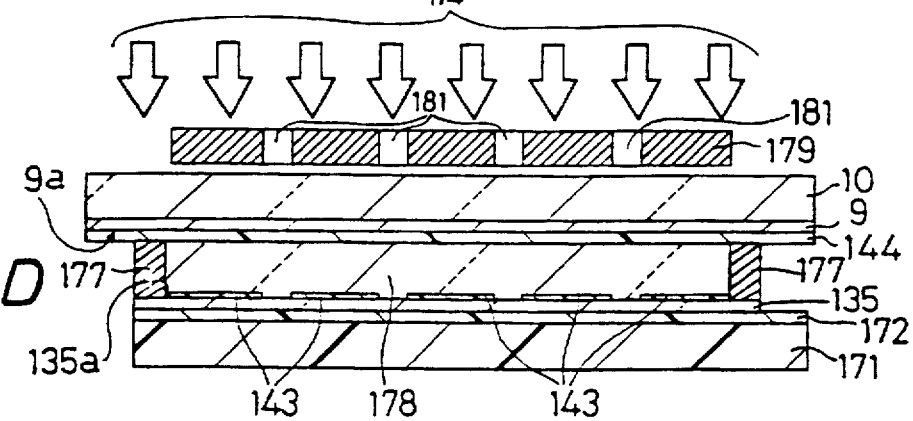

A mixture material of a liquid crystal material and a polymer material is introduced into the space of the cell while the phase of the liquid crystal material 178 is shifted to the isotropic phase. This condition is shown in FIG. 31D. A product marketed under the trade name of ZII-4792 and made by Merck Inc. is used as the liquid crystal material. A mixture material of photo-polymers: trimethylolpropant acrylate and isobonyl acrylate, is used as the polymer material. The liquid crystal material and the polymer material are mixed, that is, for example, 0.02 g of trimethylolpropant acrylate and 0.17 g of isobonyl acrylate are mixed with 0.78 g of ZII-4792. The vacuum degassing method is used to introduce the mixture material.

Figure 31E:
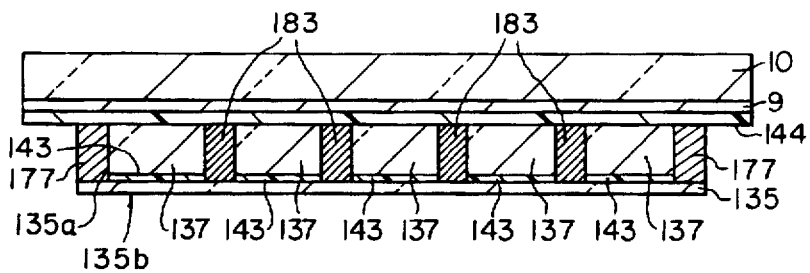
Figure 33:
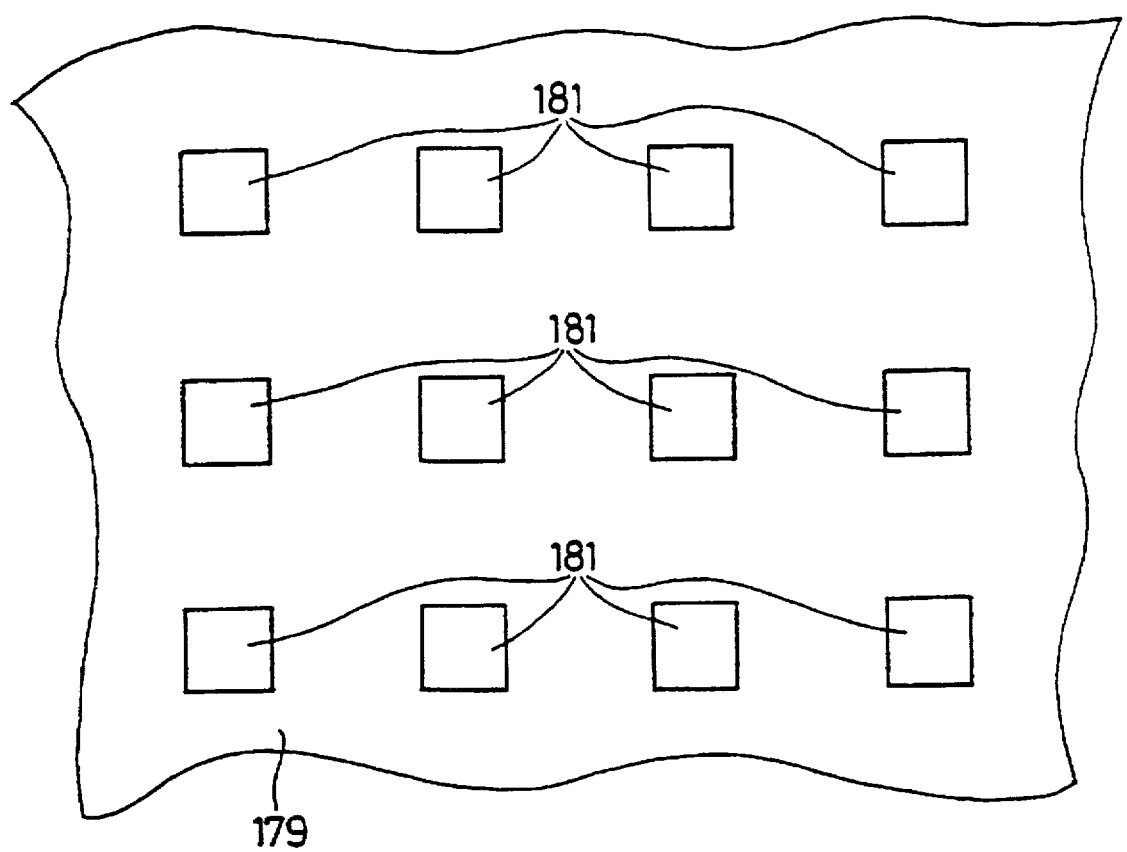
FIG. 33 is a plan view showing a photomask 179 used for the production of the deflecting device 131.

After the mixture material is introduced, ultraviolet light 174 is applied to the cell through the transmission substrate 10 via a photomask 179 shown in FIG. 33. A plurality of windows 181 are formed in the photomask 179. The windows 181 are arranged in a matrix form at predetermined intervals in parallel with two orthogonal directions. The ultraviolet light 174 is allowed to be incident on the cell via the windows 181 to separate the phases of the liquid crystal material and the polymer material. As a result, the polymer material in the mixture material is hardened at portions corresponding to the windows 181, thereby forming polymer columns 183 arranged in a matrix form in the space of the cell. The portion in which the polymer columns 183 are not formed becomes a liquid crystal area filled with the liquid crystal material. As a result, the variable refractive index substance layer 137 is formed as the liquid crystal layer. After the variable refractive index substance layer 137 is formed, the opposite substrate 171 and the release layer 172 are removed from the isotropic refractive index substance layer 135. By completing the above-mentioned process, the first substrate member shown in FIG. 31E is formed.

Figure 32A:
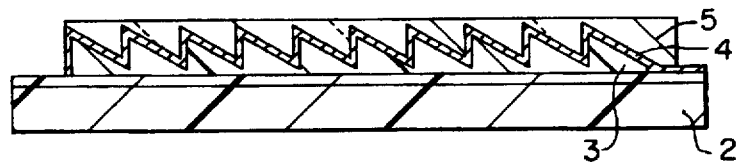
FIGS. 32A to 32D are sectional views showing the method for producing the deflecting device 131 in accordance with the ninth embodiment step by step.

The tilting means 3 is then formed on the surface 2a of the insulating substrate 2 by using the metal mold explained in FIGS. 5 and 6. The angle δ of each triangular prism of the tilting means 3 should preferably be a half (θ/2) the incident angle θ1 of the incident light incident on the variable refractive index substance layer 137. A reflecting electrode 4 is formed over the surface of the tilting means 3. These components are equal to those of the deflecting device 1 according to the first embodiment. Furthermore, on the reflecting electrode 4, an isotropic refractive index substance layer 5 is formed. This condition is shown in FIG. 32A. The isotropic refractive index substance layer 5 is made of a polymer material having a refractive index of about 1.5. A mixture material: trimethylolpropant acrylate and isobonyl acrylate, at a weight ratio of 2:17 is used as the polymer material.

Figure 32B:
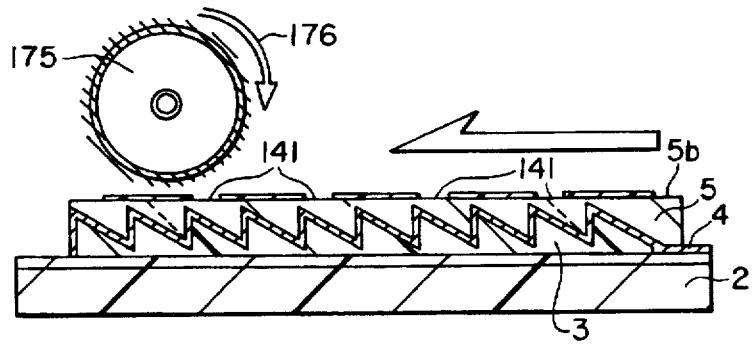

Next, an orientation film 141 is formed on the surface 5b of the isotropic refractive index substance layer 5 of the insulating substrate 2, and an orientation film 142 is formed on the surface 135b of the isotropic refractive index substance layer 135 of the first substrate member. This state is shown in FIG. 32B. The method for forming the orientation films 141 and 142 is the same as the method for forming the orientation films 143 and 144. The orientation treatment direction of the orientation film 142 is nearly perpendicular to that of the orientation film 143. Consequently, the substrate member 13a is formed.

Figure 32C:
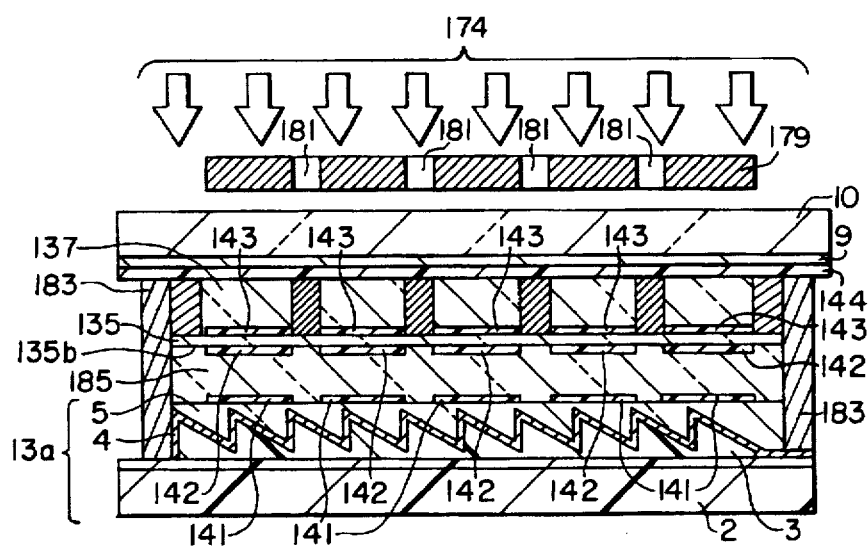
Figure 32D:
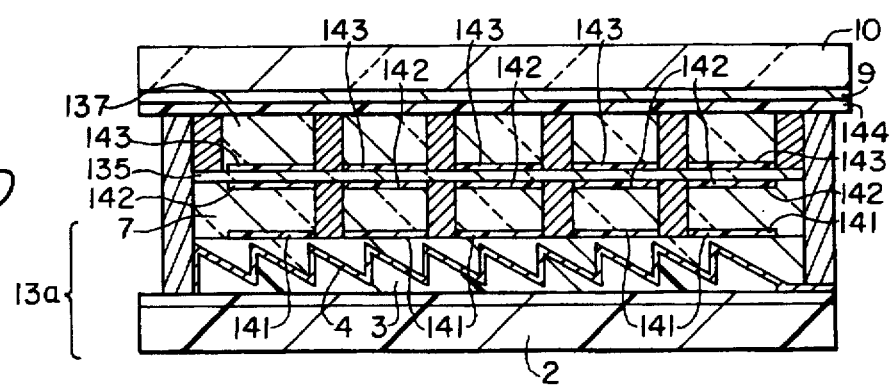

The first substrate member is then overlapped with the substrate member 13a so that the surfaces formed with the orientation films 142 and 141 face opposite to each other and so that the orientation treatment direction of the orientation films 141 and 142 is perpendicular to that of the orientation films 143 and 144. By using these substrate members and by taking the same method as the above-mentioned cell forming method, a cell having a space between the orientation films 141 and 142 via an adhesion layer 183 is formed. The above-mentioned mixture material 185 of the liquid material and the polymer material is introduced into the space of the cell while the liquid crystal material is phase-shifted isotropically. This state is shown in FIG. 32C. Furthermore, the polymer material in the mixture material 185 is hardened by applying ultraviolet light through the transmission substrate 10 via the photomask 179 to form polymer columns 186. Consequently, the isotropic refractive index substance layer 7 is formed.

By undergoing the above-mentioned production process, a liquid crystal cell shown in FIG. 32C is formed. The prism 12 having the structure shown in FIG. 2 is disposed on the side of the transmission substrate 10 of the liquid crystal cell. Consequently, the deflecting device 131 is formed.

In the embodiment, other methods may be used for forming each component on condition that the methods can provide desired shape and characteristics. For example, the tilting means 3 and the reflecting electrode 4 may have the structures shown in FIG. 18. It is preferable that the angle of the base of each triangular prism of the tilting means 8 is a half (θ/2) of the incident angle θ1 of the incident light. Instead of the rubbing method, the oblique deposition method may be used as the orientation treatment method for the orientation films 141 through 144. Furthermore, in the embodiment, after the isotropic refractive index substance layers 5 and 135 and the variable refractive index substance layers 7 and 137 are formed between the substrates 2 and 10 of the deflecting device 1, the prism 12 is attached by adhesion. However, the isotropic refractive index substance layers or variable refractive index substance layers may be formed directly on the prism 12, instead of the substrate 10.

Furthermore, materials other than those described above may be used for the liquid crystal material and the polymer material, provided that the materials offers the same effects on the incident light. For example, an optically active substance (chiral material) may be included in the liquid crystal material. Instead of the photopolymerization material, a thermopolymerization material may be used as the polymer material. As to the method of hardening the polymer material, a method suitable for the material is used.

Moreover, the isotropic refractive index substance layer and the variable refractive index substance layer mentioned above may each be provided in number of two or more between the substrates 2 and 10. In this case, the refractive index substance layers may be formed on substrates other than the components of the deflecting device 131, like the isotropic refractive index substance layer 135 and the variable refractive index substance layer 137, and the refractive index substance layers may be formed away from the refractive index substance layers. The refractive index substance layers made in this way may be overlapped to form the deflecting device. In addition, the deflecting device may be formed by repeating the method used for the isotropic refractive index substance layer 5 and the variable refractive index substance layer 7 so as to overlap the refractive index substance layers in sequence. Besides, each variable refractive index substance layer may have a structure with no polymer columns.

Next, a tenth embodiment of the invention is described below. The embodiment is almost the same as the first embodiment except that instead of a nematic liquid crystal, a surface stabilized ferroelectric liquid crystal (SSF-LC) with a released SmC helical structure is introduced to the variable refractive index substance layer 7 according to the first embodiment.

By introducing the surface stabilized ferroelectric liquid crystal, the spacer interposed between the substrate members 13 and 14 is implemented by glass beads having a grain diameter of 2 μm in the tenth embodiment. In the case of the first embodiment, the spacer is implemented by glass beans having a grain diameter of 10 μm. A liquid crystal marketed under the trade name of ZLI-4237 and made by Merck Inc. (having a phase transfer series of I→Ch→SA→SC*, a cone angle 50°, Δn≈0.13) is introduced between the substrate members 13 and 14 at 80° C. (I-phase) by vacuum degassing, and the introduction port is sealed. The liquid crystal is heated up to 90° C. and then cooled gradually to form the variable refractive index substance layer 7.

Figure 34:
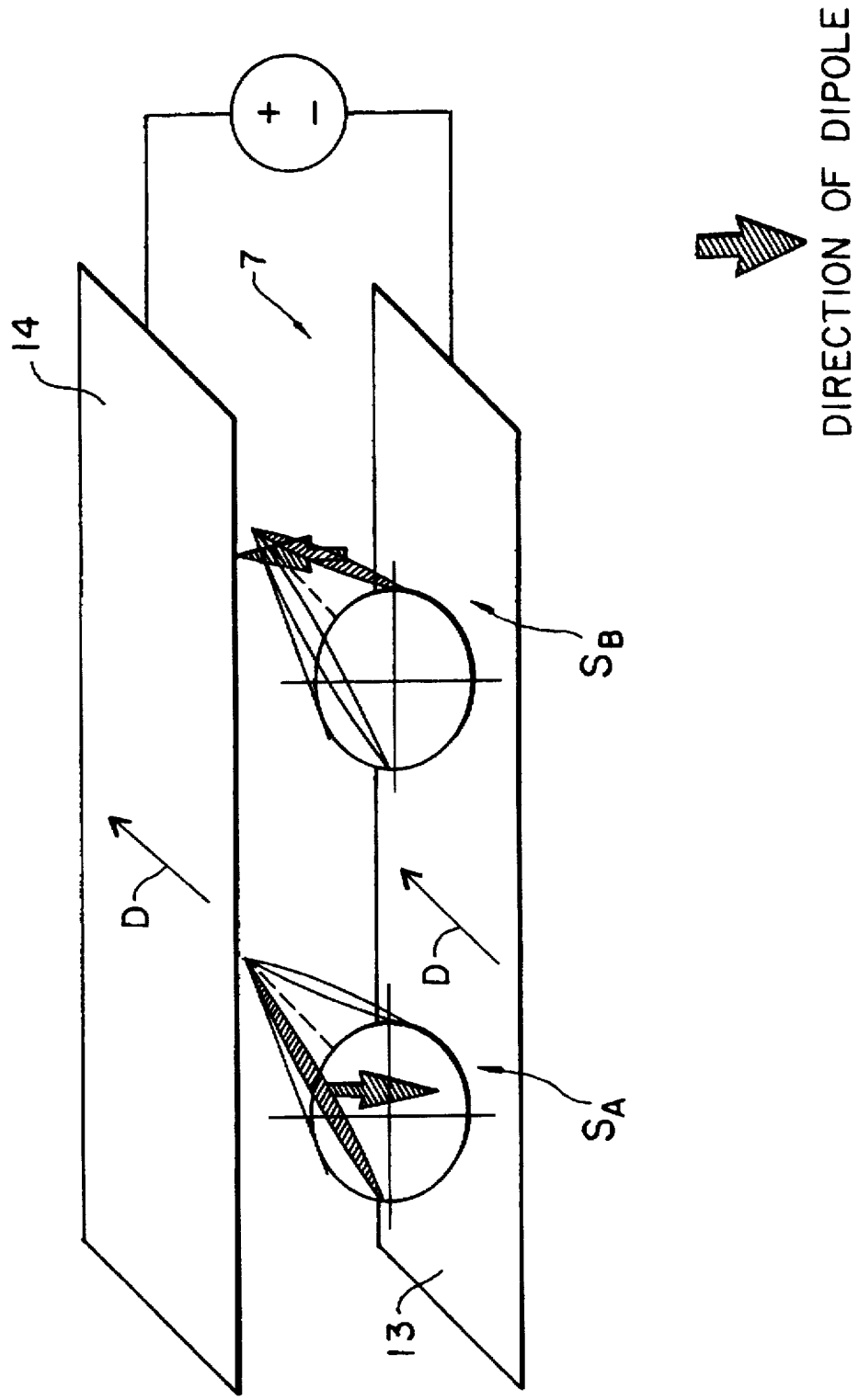
FIG. 34 is a schematic view showing a change in the orientation of liquid crystal molecules when a drive voltage is applied to a deflecting device in accordance with a tenth embodiment of the invention.

FIG. 34 is a schematic view showing a change in the orientation of the liquid crystal molecules of the variable refractive index substance layer 7 depending on the voltage applied between the substrate members 13 and 14. The arrow D shown in FIG. 34 indicates the orientation treatment direction of the orientation film 6 of the substrate member 13 and the orientation film 8 of the substrate member 14.

As shown in FIG. 34, the orientation of the liquid crystal molecules in the SSF-LC mode is switched between two stable states $S_A$ and $S_B$ so that the direction of the applied electric field is opposite to the direction of the dipole of the liquid crystal molecules. In states other than the stable states $S_A$ and $S_B$, the liquid crystal molecules are not oriented stably.

The operation principle of the above-mentioned liquid crystal cell is described below referring to FIGS. 35A to 35C and FIG. 7. The basic operation principle shown in FIG. 7 was described in the explanation of the first embodiment. Since the orientation film 6 is interposed between the variable refractive index substance layer 7 used as a first layer and the isotropic refractive index substance layer 5 used as a second layer in actual practice, it is thought that various effects such as refraction may be caused at the time of the reflection or transmission of light at the interface. However, since the refractive index of the orientation film 6 is nearly equal to that of the variable refractive index substance layer 7 in general, it is thought that the refraction by the orientation film 6 can be neglected.

Figure 35A:
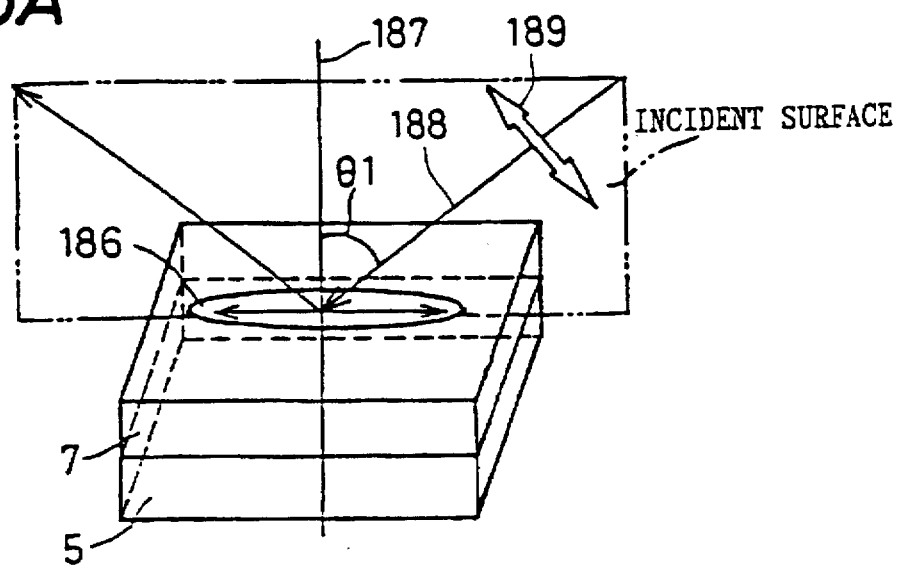
FIG. 35A and 35B are schematic views showing a condition wherein polarized light is allowed to be incident on the variable refractive index substance layer when the liquid crystal molecules of the above-mentioned deflecting device are in one stable state $S_A$ of two stable states in the bistable mode.
Figure 35B:
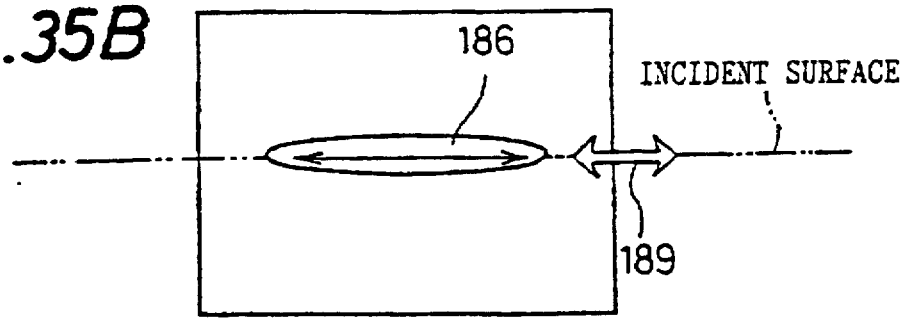

FIG. 35A and 35B are schematic views showing a condition in which incident light 188 is allowed to be incident on the variable refractive index substance layer 7 when the liquid crystal molecules 186 of the variable refractive index substance layer 7 is in one stable state $S_A$ of two stable states in the bistable mode; FIG. 35A is a perspective view taken from a diagonally upper position above the variable refractive index substance layer 7; FIG. 35B is a plane view taken in the normal direction above the variable refractive index substance layer 7; and FIG. 35C is a perspective view showing the path of the incident light 188 being at the other stable state $S_B$ wherein the liquid crystal molecules 186 are in the other stable state.

The incident light 188 is linear polarized light which has been polarized by a deflecting device such as a polarizing plate (not shown) and is allowed to be incident on the variable refractive index substance layer 7 at incident angle θ1. The incident angle θ1 is an angle formed between the normal line 187 of the variable refractive index substance layer 7 and the incident light 188 on the incident plane. The vibration direction of the incident light 188 is the direction designated by the arrow 189 in FIGS. 35A and 35B. The direction is perpendicular to the traveling direction of the incident light 188 and included in the incident plane. The orientation state of the liquid crystal molecule 186 of the variable refractive index substance layer 7 is the stable state $S_A$ shown in FIG. 35A and 35B, and both the vibration direction 189 of the incident light 188 and the major axis direction of the liquid crystal molecule 186 are included in the incident plane. At this time, the incident light 188 passes through the variable refractive index substance layer 7 which uses the abnormal light component (ne) of the anisotropic refractive index of the liquid crystal molecule 186 as the refractive index thereof.

Figure 35C:
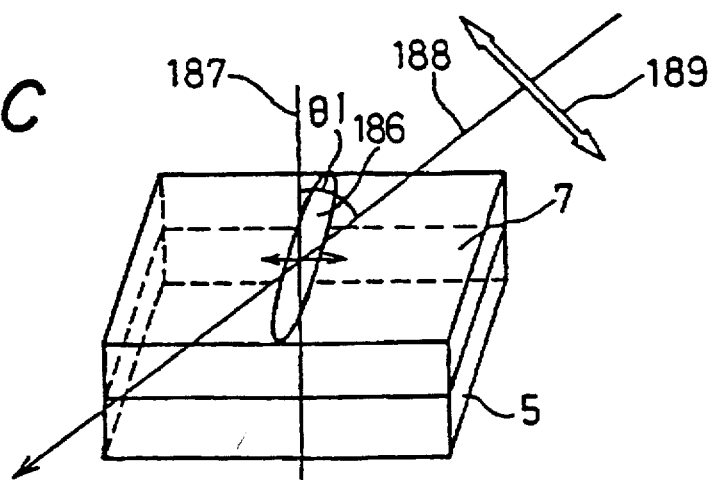
FIG. 35C is a perspective view showing an optical path of incident light in the case where the liquid crystal molecules are in the other stable state $S_B$ of the two stable states in the bistable mode.

In addition, when the liquid crystal molecule 186 of the variable refractive index substance layer 7 is at the stable state $S_B$ as shown in FIG. 35C, the incident light 188 passes through the variable refractive index substance layer 7 which uses the normal light component (no) of the anisotropic refractive index of the liquid crystal molecule 186 as the refractive index thereof. When the refractive index of the isotropic refractive index substance layer 5 is n1, and the critical angle of the incident light 188 incident on the interface between the isotropic refractive index substance layer 5 and the variable refractive index substance layer 7 is θc, the relationships described below are established among them:

ne≦n1/sinθc no=n1

θ1θc

Note that the abnormal light component ne of the anisotropic refractive index corresponds to N2, the normal light component no of the anisotropic refractive index corresponds to Ne, and the refractive index n1 of the isotropic refractive index substance layer 5 corresponds to N.

In other words, when the liquid crystal molecule 186 is at the stable state $S_A$ shown in FIGS. 35A and 35B, the incident light 188 passes through the variable refractive index substance layer 7 having the refractive index ne and is allowed to be incident on the isotropic refractive index substance layer 5 having the refractive index n1. Since this state satisfies the total reflection conditions in Fresnel's formula at this time, the incident light 188 is totally reflected by the interface between the variable refractive index substance layer 7 and the isotropic refractive index substance layer 5 as shown in FIGS. 35A and 35B.

On the other hand, when a voltage is applied to the variable refractive index substance layer 7 and the orientation of the liquid crystal molecule 186 is changed to the stable state $S_B$ as shown in FIG. 35C, the incident light 188 passes through the variable refractive index substance layer 7 having the refractive index no and then is allowed to be incident on the isotropic refractive index substance layer 5 having the refractive index n1. Since the relationship of n1=no has been established at this time as described above, the incident light 188 passes through the interface between the variable refractive index substance layer 7 and the isotropic refractive index substance layer 5 without undergoing any actions at the interface as shown in FIG. 35C.

As described above, by applying a drive voltage to the variable refractive index substance layer 7 and by switching the orientation of the liquid crystal molecule 186 to either of the stable states $S_A$ and $S_B$, only the reflected component 16 or the transmitted component 17 is delivered, whereby the incident light 188 can be modulated so as to be reflected or pass through.

When the orientation is between the stable states $S_A$ and $S_B$, light having an intensity of I·sin φ, namely part of the incident light passes through the variable refractive index substance layer 7 having the refractive index no and is allowed to be incident on the isotropic refractive index substance layer 5 without receiving any actions at the interface between the variable refractive index substance layer 7 and the isotropic refractive index substance layer 5, wherein the intensity of the incident light 188 is designated by I and the angle formed between the vibration direction 189 of the incident light and the major axis of the liquid crystal molecule 186 is designated by φ. In other words, both the reflected component 16 and the transmitted component 17 shown in FIG. 7 are delivered at this time. Accordingly, when the angle φ can be changed linearly, gray-scale display is possible. This matter will be described later in the explanation of an eleventh embodiment.

When the orientation of the liquid crystal molecule 186 is changed in a plane being parallel with the interface between the variable refractive index substance layer 7 and the isotropic refractive index substance layer 5, the following effects can be obtained. (a) The display mode wherein the orientation of the liquid crystal molecule is changed in a plane parallel with the interface is generally known as a mode in which a wide viewing angle can be obtained. This shows that the margin for the expansion of the incident light is wide. (b) Regarding the orientation anchoring energy due to the orientation film, the anchoring force for the change in orientation in a plane parallel with the orientation film is smaller than the anchoring force for a change in orientation in the normal direction of the orientation film, whereby a low voltage operation is possible.

To detect the intensity of the outgoing light from the deflecting device 1, a measuring instrument having the same structure as that used for the first embodiment shown in FIG. 14 is used. This embodiment uses a surface stabilized ferroelectric liquid crystal for the variable refractive index substance layer 7.

Figure 36:
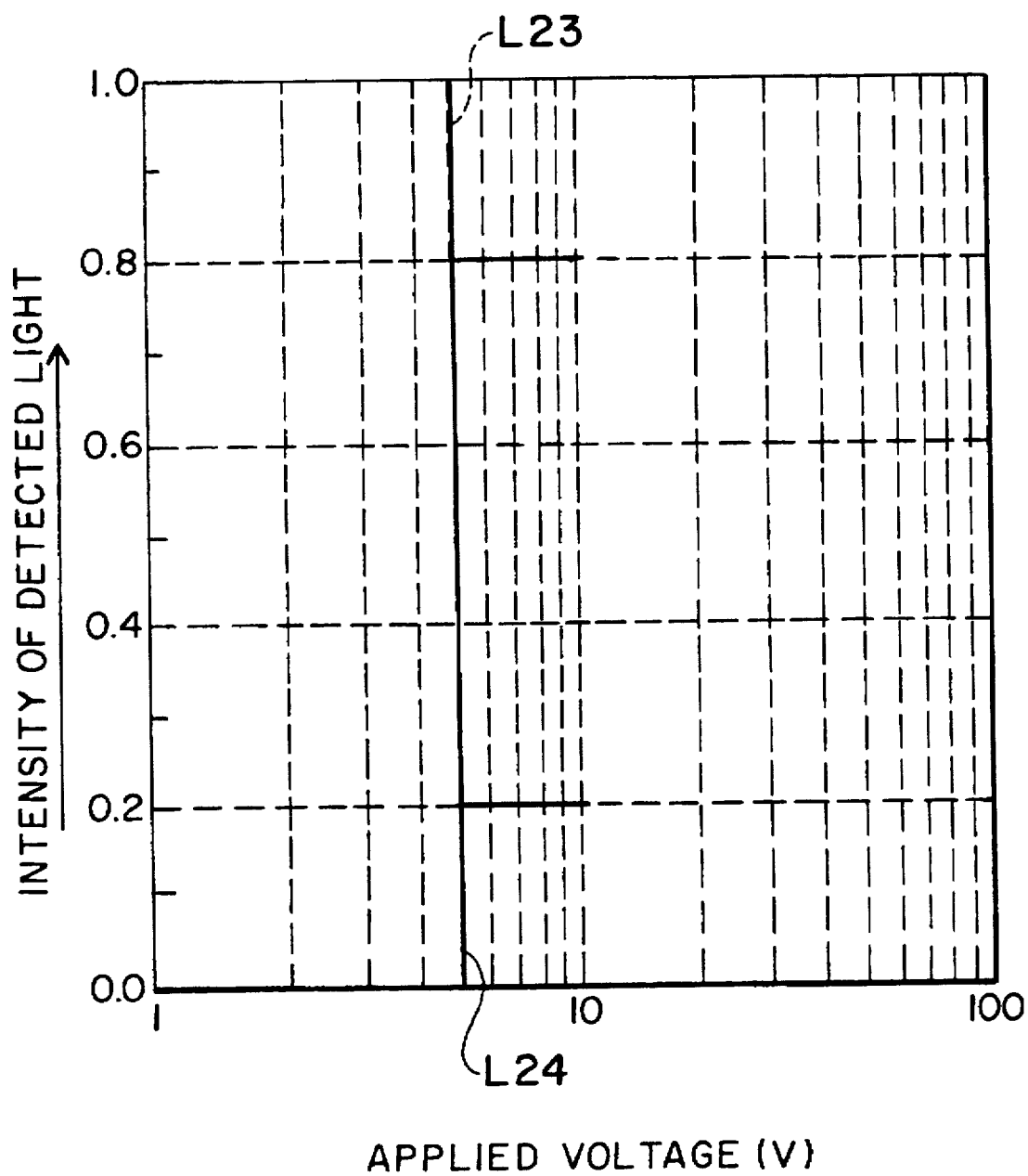
FIG. 36 is a graph showing optical characteristics measured by using a measurement system shown in FIG. 14.

FIG. 36 is a graph showing a relationship between the applied voltage and the intensities of the outgoing light beams 36 and 37 from the deflecting device 1. Curve L23 shows the intensity (the reflectivity at the interface between the isotropic refractive index substance layer 5 and the variable refractive index substance layer 7) of the ON-state light detected by the detector 33. Curve L24 shows the light intensity (the transmittance at the interface between the isotropic refractive index substance layer 5 and the variable refractive index substance layer 7) of the OFF-state light detected by the detector 34.

In other words, in the applied voltage range of 1 to 5 V, the polarized light incident on the deflecting device 1 via the polarizing plate 31 is totally reflected and detected as the ON-state light, and the reflectivity lowers abruptly at the applied voltage of about 5 V. In the applied voltage range of 5 to 10 V, the ON-state light detected by the detector 33 amounts to 20% of the polarized incident light. The OFF-state light is not detected by the detector 34 in the applied voltage range of 1 to 5 V, and the transmittance increases abruptly at the applied voltage of 5V, and about 80% of the polarized incident light is detected by the detector 34 in the applied voltage range of 5 to 10V. Accordingly, it can be seen that a sufficiently high ON/OFF ratio for an optical switch can be obtained at a drive voltage lower than 10V in both the ON-state light and the OFF-state light. Consequently, the deflecting device 1 can deliver modulated light having a high contrast ratio at low drive voltage.

Furthermore, in the embodiment, the substrate member 14 and the prism 12 can be formed as separate members so that the prism 12 can function as the transmission substrate 10 of the substrate 14. Although the cone angle in the embodiment is set to 50°, it is most preferable that the angle is about 90°. The reason for this setting is described below referring to FIGS. 87A through 37C.

It is assumed that the orientation of the liquid crystal molecule 186 of the variable refractive index substance layer 7 is parallel with the vibration direction of the polarized incident light. In other words, it is assumed that the traveling direction of the polarized incident light is the positive direction along the z axis shown in the figure, and the vibration direction of the polarized light is the x axis direction. The light intensity of the polarized light is represented by I. The state of the liquid crystal molecule 186 at this time is called "initial state" for convenience. The orientation of the liquid crystal molecule 186 is changed in the x-y plane in the figure. At this time, the polarized incident light passes through the variable refractive index substance layer 7 having the refractive index ne and enters the isotropic refractive index substance layer 5 having the refractive index n1.

At this time, the following relationships represented by formulae (19) to (21) are established among the refractive indices ne, n1 and no, and the incident light is totally reflected by the interface between the variable refractive index substance layer 7 and the isotropic refractive index substance layer 5.

$$ne \leq n1/\sin \theta c \quad (19)$$

$$no = n1 \quad (20)$$

$$\theta 1 \leq \theta c \quad (21)$$

Figure 37A:
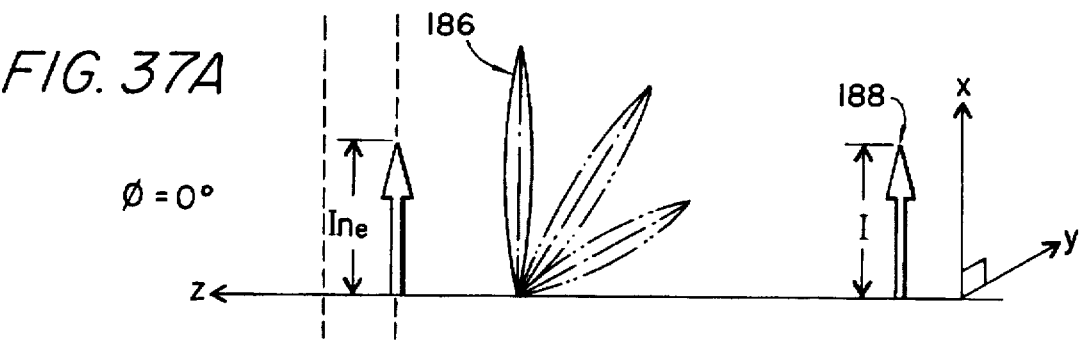
FIG. 37A is a schematic view showing an intensity of light (abnormal light component) passing through the variable refractive index substance layer when the orientation of the liquid crystal molecules is parallel with the vibration direction of polarized incident light.
Figure 37B:
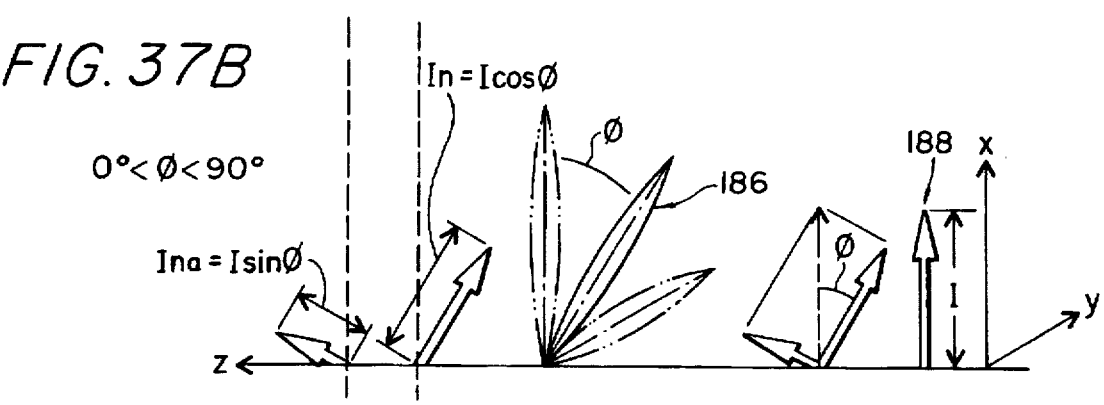
FIG. 37B is a schematic view showing an intensity of light (abnormal and normal light components) passing through the variable refractive index substance layer when the orientation of the liquid crystal molecules is rotated $\phi(0°<\phi<90°)$ from the state shown in FIG. 37A.
Figure 37C:
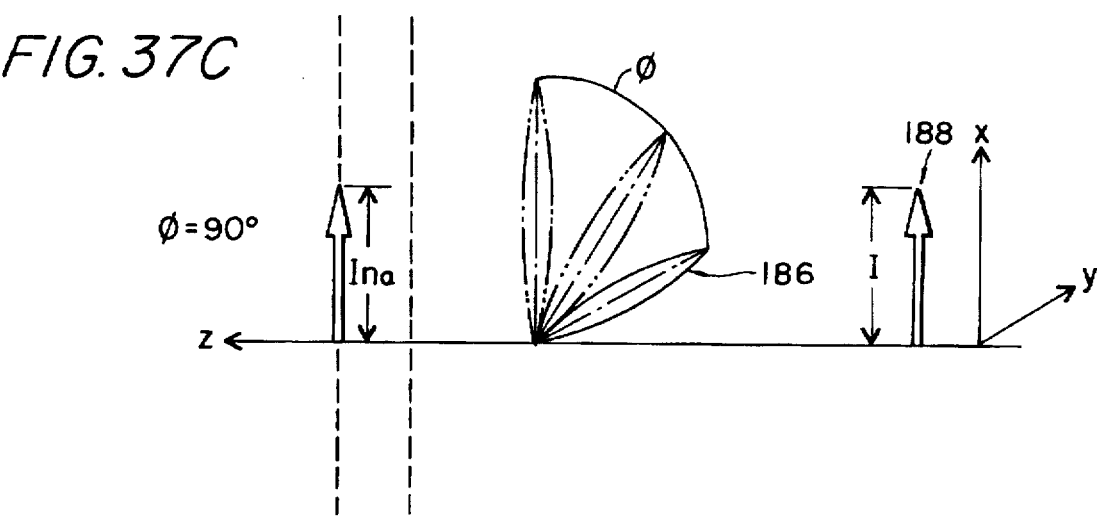
FIG. 37C is a schematic view showing an intensity of light (normal light component) passing through the variable refractive index substance layer when the orientation of the liquid crystal molecules is rotated 90° from the state shown in FIG. 37A.

Next, as shown in FIG. 37B, when the orientation state of the liquid crystal molecule 186 is rotated by angle θ (0°<φ<90°) in the x-y plane from the initial state by applying a voltage, the incident light is split depending on the normal light component no and the abnormal light component ne of the anisotropic refractive index of the liquid crystal molecule 186. In other words, when the optical intensity of the incident light is I, the intensity of the normal light component is Ino, and the optical intensity of the abnormal light component is Ine, these are represented as follows:

$$Ino = I \cdot \sin \phi$$

$$Ine = I \cdot \cos \phi$$

The light is split into these components, and these components pass through the variable refractive index substance layer 7 having the anisotropic refractive index no or he, and enters the isotropic refractive index substance layer 5 having the anisotropic refractive index n1. When it is desired that the state of light is switched between the total reflection state and the total transmission state, it is preferable that Ine=0 or the orientation change angle of the liquid crystal, that is, cone angle φ is 90°. In these conditions, the contract ratio of the modulated light can be improved.

Although the SSF-LC mode is adopted in the embodiment as the bistable liquid crystal display mode, other modes capable of delivering a similar effect can also be used. In addition, some Sm phases have three or more stable states, and such Sm phases can also be used for gray-scale display.

An eleventh embodiment of the invention is described below. The deflecting device 190 is nearly the same as the deflecting device 1 of the first embodiment in structure. However, the deflecting device 190 differs from the deflecting device 1 in that glass bead spacers having a grain diameter of 1.5 µm between the substrate members 13 and 14 and that the substrate members 13 and 14 are disposed opposite to each other so that their orientation treatment directions are parallel and reverse with each other. Although the deflecting device 1 of the first embodiment can be used for monochrome display, the deflecting device 1 cannot be used for gradation display. In the embodiment, the deflecting device 190 which can be driven at low voltage and can offer a continuous gray-scale display is described below.

The eleventh embodiment of the invention is described below referring to FIGS. 38 to 40. The components having functions similar to those of the components described in the explanation of the first embodiment are represented by the same reference numerals, and not the explanation thereof is omitted here. Unlike the SSF-LC, the deflecting device 190 does not have bistability but has the ferroelectric liquid crystal mode having monostability, since the deflecting device 190 comprises the above-mentioned liquid crystal cell (refer to the Preliminary Paper Collection for the 17th Liquid Crystal Discussion Meeting 3F301 (1991)). The direction of the liquid crystal molecules in the above-mentioned monostable mode is a direction along the orientation treatment direction.

FIG. 38 is a schematic view showing a change in the orientation of the liquid crystal molecule at the variable refractive index substance layer 7 of the deflecting device 190 depending on the voltage applied across the substrate members 13 and 14. The arrows $D_1$ and $D_2$ in FIG. 38 show the orientation treatment directions of the orientation film 8 of the substrate member 14 and the orientation film 6 of the substrate member 13, respectively.

When no voltage is applied to the deflecting device 190, the liquid crystal molecule is in a stable state Sc as shown in FIG. 38. When a voltage is applied to the liquid crystal molecule, the orientation changes to state $S_D$ or $S_E$ so that the dipole of the liquid crystal molecule is oriented in the direction reverse to the direction of the electric field just as in the case of the SSF-LC. However, when the applied voltage is turned off, the orientation of the liquid crystal molecule returns immediately to the stable state Sc. In this way, when no voltage is applied, the liquid crystal molecule assumes a monostable mode, and when voltage is applied, the orientation of the liquid crystal molecule changes depending on the applied voltage. The deflecting device 190 of the embodiment can thus attain gradation display when applied to a display unit.

FIG. 39 is a graph showing the transmittance (reflectivity) of light depending on the change in the angle of the orientation of the liquid crystal molecule of the deflecting device 190. Curve L25 shown in FIG. 39 shows the reflectivity of the reflected component totally reflected by the interface between the isotropic refractive index substance layer 5 and the variable refractive index substance layer 7. Curve L26 shows the transmittance of the transmitted component passing through the interface. As obviously shown in FIG. 39, it can be seen that in the deflecting device 190 the transmittance of light changes continuously depending on the angular change in the orientation of the liquid crystal molecule. Consequently, the deflecting device 190 can attain gray-scale display when applied to a display unit.

Figure 40:
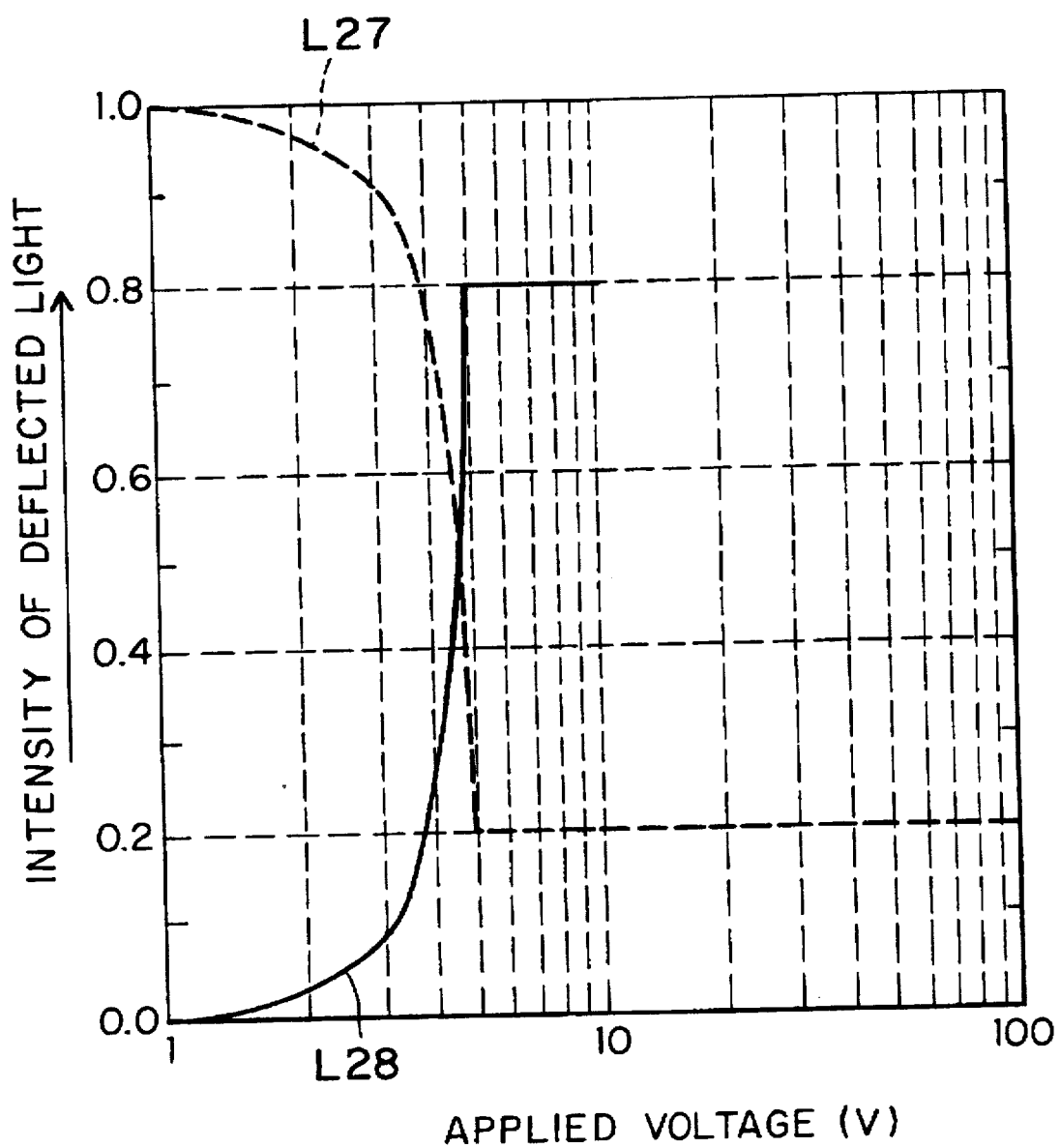
FIG. 40 is a graph showing the reflectivity and transmittance rate of the deflecting device depending on the applied voltage.
Figure 41:
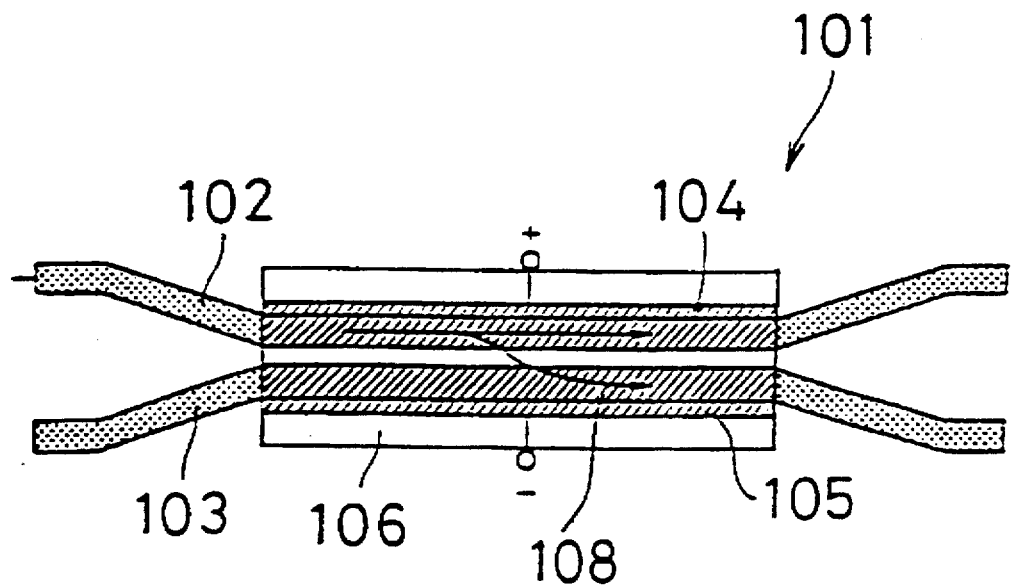
FIG. 41 is a plan view showing a structure of an optical switch 101 in accordance with a prior art.
Figure 42:
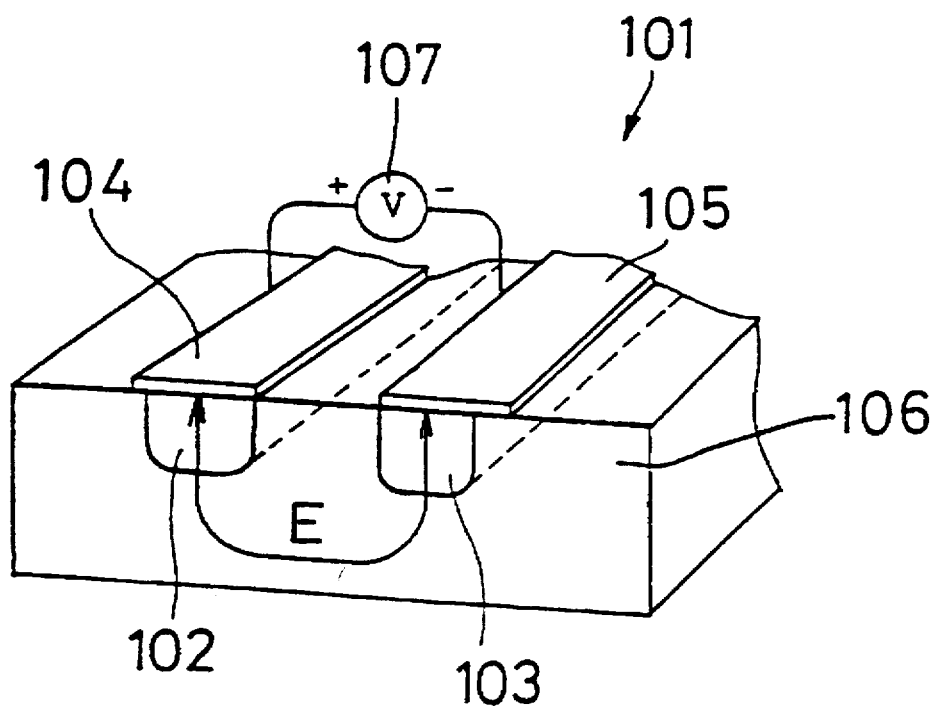
FIG. 42 is a perspective view showing a structure of the optical switch 101.

FIG. 40 is a graph showing the measurement results of the transmittance (reflectivity) depending on applied voltage in the deflecting device 190. Curve L27 in the figure shows the reflectivity of the reflected component totally reflected at the interface between the isotropic refractive index substance layer 5 and the variable refractive index substance layer 7. Curve L28 shows the transmittance of the transmitted component passed through the interface. As obviously shown in the figure, it can be seen that in the deflecting device 190 the transmittance (reflectivity) of light changes continuously depending on the applied voltage in the range of about 1 to 5 V. When the applied voltage is about 5 V, the reflected component decreases abruptly, and the transmitted component increases abruptly. In other words, the deflecting device 190 can offer modulated light having a high contrast ratio at a relatively low drive voltage of 1 to 10 V, and can attain a continuous modulation of gray levels.

Although a structure, wherein a ferroelectric liquid crystal being set to have a single stable state by the orientation control method is used as the variable refractive index substance layer 7, is taken as an example in the embodiment, other structures can also be used, provided that similar effects can be obtained. For example, it is possible to use such a method as disclosed at the Liquid Crystal Discussion Meeting in 1995, that is, a method wherein the bistable characteristic of the SSF-LC is diminished by mixing a liquid crystal polymer into the ferroelectric liquid crystal. Furthermore, a structure using an anti-ferroelectric liquid crystal can also be used and can offer similar effects.

In addition, a twelfth embodiment of the invention is described below. In the fourth embodiment, a nematic liquid crystal is introduced into the variable refractive index substance layer 7 of the deflecting device 51 shown in FIG. 19. The twelfth embodiment is nearly the same as the fourth embodiment except hat a surface stabilized ferroelectric liquid crystal is introduced. By introducing the surface stabilized ferroelectric liquid crystal, the variable refractive index substance layer 7 can be formed in the same way as that of the tenth embodiment. The embodiment can offer effects similar to those of the fourth embodiment.

The structure attained by using the deflecting device 51 of the embodiment, wherein a surface stabilized ferroelectric liquid crystal is introduced into the variable refractive index substance layer 7 as the deflecting device 1 shown in FIGS. 21 and 22, can also be included in the scope of the invention. By using the deflecting device 51, the embodiment can attain effects similar to those attained by the fifth and sixth embodiments.

In the ninth embodiment, a nematic liquid crystal is introduced into the variable refractive index substance layers 7 and 137 of the deflecting device 131 shown in FIG. 26. However, the deflecting device 131 into which a surface stabilized ferroelectric liquid crystal is introduced can also be included in the scope of the invention. By using the deflecting device 131 into which the surface stabilized ferroelectric liquid crystal having been introduced, the embodiment can offer effects similar to those of the ninth embodiment.

The invention may be embodied in other specific forms without departing from the spirit or essential characteristics thereof. The present embodiments are therefore to be considered in all respects as illustrative and not restrictive, the scope of the invention being shown by the appended claims rather than by the foregoing description and all changes which come within the meaning and the range of equivalency of the claims are therefore intended to be embraced therein.

What is claimed is:

1. A deflecting device comprising:
   an isotropic refractive index substance layer made of a light transmitting substance having a constant refractive index regardless of energy supplied from the outside;
   a variable refractive index substance layer made of a light transmitting substance whose refractive index changes depending on the energy supplied from the outside;
   a pair of energy transfer means with at least the variable refractive index substance layer interposed therebetween, for applying energy to the variable refractive index substance layer;
   a light reflecting layer having a tilted reflecting surface for reflecting light which has passed through the isotropic refractive index substance layer and the variable refractive index substance layer; and
   light guiding means disposed on an outermost portion of the deflecting device on the light incident side.

2. The deflecting device of claim 1, wherein the light reflecting layer also serves as either one of the pair of energy transfer means.

3. The deflecting device of claim 1, wherein either one of the pair of energy transfer means comes into contact with one surface of the variable refractive index substance layer, and the other energy transfer means comes into contact with the other surface, namely the opposite surface, of the variable refractive index substance layer.

4. The deflecting device of claim 1, wherein the light reflecting layer and either one of the pair of energy transfer means are electrically connected to each other.

5. The deflecting device of claim 1, wherein a plurality of isotropic and variable refractive index substance layers are both provided, and disposed in parallel to the energy transfer means.

6. The deflecting device of claim 5, wherein at least two of the optical axes of the plurality of variable refractive index substance layers are perpendicular to each other.

7. The deflecting device of claim 5, wherein at least one isotropic refractive index substance layer is disposed among the plurality of variable refractive index substance layers.

8. The deflecting device of claim 1, wherein the tilting angle $\delta$ of the tilted reflecting surface of the light reflecting layer and the incident angle $\theta 1$ formed between the incident light and the normal line of the interface between the isotropic and variable refractive index substance layers satisfy the following relationship:

$$\theta\frac{1}{2} \leq \delta \leq \theta 1.$$

9. The deflecting device of claim 1, wherein in the case where the refractive index of either one of the isotropic and variable refractive index substance layers is set to n2, and the refractive index of the other of the isotropic and variable refractive index substance layers is set to n1, when the one of the refractive index substance layers is implemented by the isotropic refractive index substance layer and the other of the refractive index substance layers is implemented by the variable refractive index substance layer made of a uniaxial light transmitting substance having a normal refractive index no and an abnormal refractive index ne, the refractive indices n1, n2, no and ne satisfy the following relationships:

$no \leq n1 \leq ne$ $no \leq n2 \leq ne$ $\theta 1 \geq \arcsin(n2/ne)$; and when the one of the refractive index substance layers is implemented by the variable refractive index substance layer made of a uniaxial light transmitting substance having the normal refractive index no and the abnormal refractive index ne, and the other refractive index substance layer is implemented by the isotropic refractive index substance layer, the refractive indices n1, n2, no and ne satisfy the following relationships:

no≦n2≦ne no≦n1sin θ1 ne≧n1.

10. The deflecting device of claim 1, wherein in the case where the refractive index of either one of the isotropic and variable refractive index substance layers is set to n2, and the refractive index of the other of the isotropic and variable refractive index substance layer is set to n1, when the one of the refractive index substance layers is implemented by the isotropic refractive index substance layer and the other refractive index substance layer is implemented by the variable refractive index substance layer made of the isotropic light transmitting substance having a maximum refractive index nmax and a minimum refractive index nmin.

the refractive indices n1, n2, nmax and nmin satisfy the following relationships:

nmin≦n1≦nmax nmin≦n2≦nmax

θ1≦arcsin(n2/nmax); and when the one of the refractive index substance layers is implemented by the variable refractive index substance layer made of the isotropic light transmitting substance having a maximum refractive index nmax and a minimum refractive index nmin, and the other refractive index substance layer is implemented by the isotropic refractive index substance layer, the refractive indices n1, n2, nmax and nmin satisfy the following relationships;

nmin≦n2≦nmax nmin≦n1sin 1 nmax≧n1.

11. The deflecting device of claim 1, wherein the light guiding means comprises a prism having at least a first surface disposed nearly parallel with the interface between the isotropic and variable refractive index substance layers and a second surface intersecting with the first surface so as to guide light incident on the second surface in an angle range of ±20° with respect to the normal direction of the second surface to the isotropic and variable refractive index substance layers.

12. The deflecting device of claim 11, wherein the angle formed between the first and second surfaces of the prism is set in the range of 50° or more to less than 90°.

13. The deflecting device of claim 11, wherein the projection area of the second surface projected to the first surface by the incident light from the second surface of the prism is larger than an actual switching area contributing to switching.

14. The deflecting device of claim 11, wherein the prism has a third surface which is disposed outside the first surface in parallel with the first surface and has an area larger than an actual switching area contributing to switching.

15. The deflecting device of claim 1, wherein the variable refractive index substance layer is made of a liquid crystal.

16. The deflecting device of claim 15, wherein the liquid crystal molecules forming the variable refractive index substance layer are oriented irregularly.

17. The deflecting device of claim 15, wherein the deflecting device includes a polarizing means for polarizing the light to the light guiding means, either of the ordinary and extraordinary light components of the anisotropic refractive index of the liquid crystal molecules and the vibration direction of the polarized light incident on the liquid crystal molecules from the polarizing means are included in the same plane in a predetermined orientation state the liquid crystal molecules constituting the above-mentioned variable refractive index substance layer can take, and the following relationships are satisfied;

$N_1 \geq N/\sin \theta c$ $N_2 = N$ $\theta 1 \leq \theta c$ wherein $N_1$ represents one of the ordinary and extraordinary light components included in the same plane as that of the vibration direction of the polarized light, $N_2$ represents the other component, N represents the refractive index of the isotropic refractive index substance layer, θ1 represents the incident angle of the polarized light to the variable refractive index substance layer, and θc represents the critical angle at the interface between the variable and isotropic refractive index substance layers.

18. The deflecting device of claim 15, wherein the liquid crystal forming the variable refractive index substance layer comprises a liquid crystal having a bistable mode, and the vibration direction of the polarized light incident on the variable refractive index substance layer and the orientation direction of the liquid crystal molecules in one of two stable states of the bistable mode are included in the same plane.

19. The deflecting device of claim 18, wherein the cone angle of the liquid crystal molecules, formed between two stable states of the bistable mode is about 90°.

20. The deflecting device of claim 15, wherein the liquid crystal forming the variable refractive index substance layer is a monostable mode liquid crystal.

21. The deflecting device of claim 1, wherein a plurality of pixel areas are set which are arranged in a matrix/form, and the pair of energy transfer means are located opposite to each other in each pixel area.

22. The deflecting device of claim 1, further comprising:

a light source for applying light to the light guiding means; and a light receiving means for receiving light going out from the light guiding means.

23. The deflecting device of claim 22, wherein light incident on the light guiding means is non-polarized light.

24. The deflecting device of claim 22, wherein light incident on the light guiding means is polarized light.

25. The deflecting device of claim 1, wherein the light reflecting layer has a shape of a triangular pillar with one side surface of the layer being parallel with the interface between the isotropic and variable refractive index substance layers, a cross section of the light reflecting layer is formed in a shape of an isosceles triangle in a direction perpendicular to the interface between the isotropic and variable refractive index surface layers and to a direction in which the triangular prism extends, and when the tilt angle of the reflecting surface of the light reflecting layer is and the incident angle formed between incident light and the normal direction of the interface is θ1, a relationship of:

θ½≦δ≦θ1 is satisfied.

26. The deflecting device of any one of claims 1 through 20, wherein the deflecting device is provided as a light valve.

* * * * *